US008045840B2

(12) United States Patent
Murata et al.

(10) Patent No.: US 8,045,840 B2
(45) Date of Patent: Oct. 25, 2011

(54) VIDEO-AUDIO RECORDING APPARATUS AND METHOD, AND VIDEO-AUDIO REPRODUCING APPARATUS AND METHOD

(75) Inventors: Hisako Murata, Yokohama (JP); Takuma Suzuki, Yokohama (JP); Sadahiro Yasura, Tokyo-to (JP); Miki Haneishi, Zushi (JP); Katsumi Hasegawa, Yokosuka (JP); Naoko Aizaki, Yokohama (JP); Yoshihisa Fujinami, Yokohama (JP); Masami Takeda, Takasaki (JP); Takayuki Sugahara, Yokosuka (JP)

(73) Assignee: Victor Company of Japan, Limited, Yokohama-Shi (JP)

( * ) Notice: Subject to any disclaimer, the term of this patent is extended or adjusted under 35 U.S.C. 154(b) by 1194 days.

(21) Appl. No.: 11/791,083

(22) PCT Filed: Nov. 18, 2005

(86) PCT No.: PCT/JP2005/021247
§ 371 (c)(1),
(2), (4) Date: May 18, 2007

(87) PCT Pub. No.: WO2006/054698
PCT Pub. Date: May 26, 2006

(65) Prior Publication Data

US 2008/0002948 A1 Jan. 3, 2008

(30) Foreign Application Priority Data

| | | |
|---|---|---|
| Nov. 19, 2004 | (JP) | 2004-335667 |
| Nov. 22, 2004 | (JP) | 2004-337165 |
| Dec. 21, 2004 | (JP) | 2004-369406 |
| May 23, 2005 | (JP) | 2005-149276 |
| Jun. 20, 2005 | (JP) | 2005-178919 |

(51) Int. Cl.

| | |
|---|---|
| ***H04N 9/80*** | (2006.01) |
| ***H04N 5/77*** | (2006.01) |
| ***H04N 5/92*** | (2006.01) |
| ***H04R 5/00*** | (2006.01) |
| ***H04R 3/00*** | (2006.01) |
| ***H04R 5/02*** | (2006.01) |
| ***H04H 40/81*** | (2008.01) |
| ***H04B 15/00*** | (2006.01) |
| ***H02B 1/00*** | (2006.01) |

(52) U.S. Cl. ........ 386/239; 386/224; 386/248; 386/337; 386/338; 386/339; 381/1; 381/11; 381/26; 381/94.1; 381/122; 381/123; 381/309

(58) Field of Classification Search .................. 386/239, 386/248, 337–340; 381/1, 11, 26, 94, 122, 381/123, 309
See application file for complete search history.

(56) References Cited

U.S. PATENT DOCUMENTS 4,523,236 A * 6/1985 Hayashi et al. ............... 386/248
(Continued)

FOREIGN PATENT DOCUMENTS

EP 1 475 967 A1 11/2004
(Continued)

OTHER PUBLICATIONS

Mouchtaris, A., et al., "Inverse Filter Design for Immersive Audio Rendering Over Loudspeakers", *IEE Transaction on Multimedia*, vol. 2, No. 2, pp. 77-87, (Jun. 2000).

*Primary Examiner* — Thai Tran
*Assistant Examiner* — Hung Dang
(74) *Attorney, Agent, or Firm* — The Nath Law Group; Jerald L. Meyer; Jiaxiao Zhang

(57) ABSTRACT

A video-audio recording and reproducing apparatus (101) has a built-in stereo microphone (21*a*, 21*b*) and an external microphone connection terminal (32). The external microphone connection terminal (32) is connected to a binaural microphone (3) to be attached to the ears of a photographer (300). When the binaural microphone (3) is used to collect ambient sounds, an audio signal to be recorded on a recording medium is switched from an audio signal from the built-in stereo microphone (21*a*, 21*b*) to a binaural audio signal from the binaural microphone (3). The photographer (300) puts the binaural microphone (3 (31*a*, 31*b*)) on his or her ears and collects ambient sounds around the photographer (300) including a sound emanating from an object. The object is photographed with a camera unit (11). The recording medium records the binaural audio signal, a photographed video signal, and a binaural flag signal.

10 Claims, 57 Drawing Sheets

U.S. PATENT DOCUMENTS

| | | | | |
|---|---|---|---|---|
| 5,130,812 | A * | 7/1992 | Yamaoka | 386/326 |
| 6,243,476 | B1 | 6/2001 | Gardner | |
| 6,266,084 | B1 | 7/2001 | Sakata | |
| 6,961,433 | B2 * | 11/2005 | Ishii | 381/17 |
| 2002/0101804 | A1 * | 8/2002 | Sawabe et al. | 369/47.24 |
| 2006/0044399 | A1 * | 3/2006 | Fredlund et al. | 348/207.99 |

FOREIGN PATENT DOCUMENTS

| | | | |
|---|---|---|---|
| JP | S54-007601 | | 1/1979 |
| JP | 5-244683 | | 9/1993 |
| JP | 7-312712 | | 11/1995 |
| JP | 7-336793 | | 12/1995 |
| JP | 9-168139 | | 6/1997 |
| JP | 10-70789 | | 3/1998 |
| JP | 11-296998 | | 10/1999 |
| JP | 2001-268504 | | 9/2001 |
| JP | 2001-346298 | | 12/2001 |
| JP | 2002-165300 | | 6/2002 |
| JP | 2002 171482 | | 6/2002 |
| JP | 2004-222131 | | 8/2004 |
| WO | 96/10884 | A1 | 4/1996 |

* cited by examiner (A)

(B)

(A) (B) (C)

Value of B
1 : Binaural flag ON
0 : Binaural flag OFF (A) IMPULSE RESPONSE WAVEFORM (B) FREQUENCY RESPONSE CHARACTERISTIC HEAD TRANSFER FUNCTION hl (t) D=0.5m (A) IMPULSE RESPONSE WAVEFORM (B) FREQUENCY RESPONSE CHARACTERISTIC HEAD TRANSFER FUNCTION hr (t) D=0.5m (A) IMPULSE RESPONSE WAVEFORM (B) FREQUENCY RESPONSE CHARACTERISTIC HEAD TRANSFER FUNCTION hl (t) D=1m (A) IMPULSE RESPONSE WAVEFORM (B) FREQUENCY RESPONSE CHARACTERISTIC HEAD TRANSFER FUNCTION hr(t) D=1m (A) IMPULSE RESPONSE WAVEFORM (B) FREQUENCY RESPONSE CHARACTERISTIC HEAD TRANSFER FUNCTION hl (t) D=2m (A) IMPULSE RESPONSE WAVEFORM (B) FREQUENCY RESPONSE CHARACTERISTIC HEAD TRANSFER FUNCTION hr (t) D=2m

VIDEO-AUDIO RECORDING APPARATUS AND METHOD, AND VIDEO-AUDIO REPRODUCING APPARATUS AND METHOD

TECHNICAL FIELD

The present invention relates to a video-audio recording apparatus and method for recording a video signal obtained by photographing an object and an audio signal obtained by collecting ambient sounds around a photographer including a sound from the object. It also relates to a video-audio reproducing apparatus and method for reproducing video and audio signals recorded on a recording medium. In particular, the present invention relates to a video-audio recording apparatus and method, as well as a video-audio reproducing apparatus and method, capable of reproducing realistic sounds together with photographed pictures.

BACKGROUND ART

Video-audio recording and reproducing apparatuses (so-called video cameras) are popular to record video signals obtained by photographing objects and audio signals obtained by collecting ambient sounds around photographers including sounds from the objects. Such video-audio recording and reproducing apparatuses have stereo microphones to record stereo sounds. The sizes of the video-audio recording and reproducing apparatuses are reducing in recent years, to raise a problem that stereo microphones installed on the size-reduced video-audio recording and reproducing apparatus hardly record realistic sounds. There is a need to provide a video-audio recording and reproducing apparatus capable of recording lifelike sounds.

A pamphlet of International Publication No. 96/10884 discloses a video-audio recording and reproducing apparatus that arranges an ear structure on each side of the body of a video-audio recording and reproducing apparatus, to record a video signal obtained by photographing an object and sounds binaurally collected from around a photographer.

According to the disclosure of the above-mentioned document, the video-audio recording and reproducing apparatus having binaural microphones on the apparatus body is incapable of recording realistic sounds unless the width of the apparatus body, i.e., a distance between the left and right microphones is close to the width of a human head. The bodies of recently marketed audio-video recording and reproducing apparatuses are compact by virtue of improvements in high-density recording technology, digital signal recording technology, and video compressing technology. Accordingly, installing binaural microphones on a video-audio recording and reproducing apparatus proper is improper to provide the expected effect. In addition, the shape of the apparatus greatly differs from that of a human head, and therefore, it is presumed that the effect disclosed in the above-mentioned document is difficult to attain.

DISCLOSURE OF INVENTION

In consideration of these problems, an object of the present invention is to provide a video-audio recording apparatus and method, as well as a video-audio reproducing apparatus and method, capable of reproducing photographed images with lifelike sounds without regard to the size and shape of the apparatus.

Another object of the present invention is to provide a video-audio recording apparatus and method, as well as a video-audio reproducing apparatus and method, capable of reproducing realistic sounds simultaneously with the image of an object that is zoomed in.

Still another object of the present invention is to provide a video-audio reproducing apparatus and method capable of reproducing realistic sounds substantially without inconsistency even when the sounds are binaurally recorded by one person and reproduced signals thereof are heard by another person, i.e., one can always hear vivid sounds without regard to a person who picks up the sounds and images.

In order to accomplish the objects, the present invention provides a video-audio recording apparatus for recording a video signal obtained by photographing an object and an audio signal obtained by collecting ambient sounds around a photographer including a sound from the object. The video-audio recording apparatus includes a camera unit to photograph the object, a switching unit to switch a binaural microphone attached to the ears of the photographer and a microphone other than the binaural microphone from one to the other as a microphone to collect the ambient sounds, a video processor to process the video signal provided by the camera unit, an audio processor to process the audio signal provided by the microphone that collects the ambient sounds, a flag generator to generate, when the switching unit chooses the binaural microphone as a microphone to collect the ambient sounds, a binaural flag signal indicating that an ambient sound collecting mode is a binaural mode, and a recorder to record, on a recording medium, the video signal processed in the video processor, the audio signal processed in the audio processor, and the binaural flag signal.

The present invention is capable of reproducing lifelike sounds together with photographed images without regard to the size and shape of the apparatus proper. When an object is photographed by zooming in on the object, the present invention can reproduce realistic sounds in connection with the image of the object that is zoomed in. Even when a person who watches and hears the reproduced signals is different from a person who conducts binaural recording, i.e., even when an optional photographer photographs an object and an optional viewer sees and hears photographed images, the present invention can provide realistic sounds without inconsistency.

The video-audio recording apparatus may include a built-in microphone incorporated in the apparatus, an external microphone connection terminal, a setting unit to set, as an external microphone connected to the external microphone connection terminal, the binaural microphone or a microphone other than the binaural microphone, a connection detector to detect whether or not the external microphone is connected to the external microphone connection terminal, a switch to switch an audio signal provided by the built-in microphone and an audio signal provided by the external microphone from one to the other as an audio signal supplied to the audio processor, and a controller to establish the binaural mode when the setting unit sets the binaural microphone as the external microphone and when the connection detector detects that the external microphone is connected to the external microphone connection terminal. In the binaural mode, the controller controls the switch so that an audio signal from the external microphone is supplied through the switch to the audio processor, as well as controlling the flag generator so that the flag generator generates the binaural flag signal.

The apparatus may include a display to display the video signal provided by the camera unit and a display controller to display, in the binaural mode, a binaural mark indicative of the binaural mode on the display.

The camera unit may have a zoom function to photograph an enlarged image of the object, and the apparatus may include an audio zoom processor to amplify an audio signal provided by the binaural microphone according to an enlargement factor of the camera unit.

The camera unit may have a zoom function to photograph an enlarged image of the object. The apparatus may include an audio zoom processor having a transfer function memory to store head transfer functions for a plurality of distances between a virtual sound source and a listener, each head transfer function being used to form, in the vicinity of the listener, a virtual sound source representative of the sound source of an audio signal collected with the binaural microphone, a function selector to select one of the plurality of head transfer functions stored in the transfer function memory according to an enlargement factor of the camera unit, and a convolution unit to carry out a convolution operation on the audio signal collected with the binaural microphone according to the head transfer function selected by the function selector.

In order to accomplish the above-mentioned objects, the present invention provides a video-audio recording method of recording a video signal obtained by photographing an object and an audio signal obtained by collecting ambient sounds around a photographer including a sound from the object. The method includes a photographing step of photographing the object, a switching step of switching a binaural microphone attached to the ears of the photographer and a microphone other than the binaural microphone from one to the other as a microphone to collect the ambient sounds, a video processing step of processing the video signal from the object, an audio processing step of processing the audio signal provided by the microphone that collects the ambient sounds, a flag generating step of generating, when the switching step chooses the binaural microphone as a microphone to collect the ambient sounds, a binaural flag signal indicating that an ambient sound collecting mode is a binaural mode, and a recording step of recording, on a recording medium, the video signal processed in the video processing step, the audio signal processed in the audio processing step, and the binaural flag signal.

In order to accomplish the above-mentioned objects, the present invention provides a video-audio reproducing apparatus for reproducing a recording medium that stores a video signal obtained by photographing an object and an audio signal obtained by collecting ambient sounds around a photographer including a sound from the object. The apparatus includes a reproducer to reproduce a record signal recorded on the recording medium, a separator to separate the video signal and audio signal from the record signal reproduced by the reproducer, a video processor to process the video signal separated by the separator, an audio processor to process the audio signal separated by the separator, a flag taker to take a binaural flag signal from the recording medium if the recording medium has the binaural flag signal indicating that a binaural microphone attached to the ears of the photographer has been used as a microphone to collect the ambient sounds, and a crosstalk canceler to process, if the flag taker takes the binaural flag signal, the audio signal so as to cancel a crosstalk signal that may occur when the audio signal processed in the audio processor is output through a speaker. The crosstalk canceler has a filter to carry out a convolution operation on the audio signal according to a predetermined filter characteristic that is based on a head transfer function measured from an audio signal produced by collecting a calibration signal with a pair of microphones attached to a cylindrical structure.

The present invention also provides a video-audio reproducing method of reproducing a recording medium that stores a video signal obtained by photographing an object and an audio signal obtained by collecting ambient sounds around a photographer including a sound from the object. The method includes a reproducing step of reproducing a record signal recorded on the recording medium, a separating step of separating the video signal and audio signal from the record signal reproduced in the reproducing step, a video processing step of processing the video signal separated in the separating step, an audio processing step of processing the audio signal separated in the separating step, a flag taking step of taking a binaural flag signal from the recording medium if the recording medium has the binaural flag signal indicating that a binaural microphone attached to the ears of the photographer has been used as a microphone to collect the ambient sounds, and a crosstalk canceling step of processing, if the flag taking step takes the binaural flag signal, the audio signal so as to cancel a crosstalk signal that may occur when the audio signal processed in the audio processing step is output through a speaker. The crosstalk canceling step is a step of carrying out a convolution operation on the audio signal according to a predetermined filter characteristic that is based on a head transfer function measured from an audio signal produced by collecting a calibration signal with a pair of microphones attached to a cylindrical structure.

BEST MODE FOR CARRYING OUT THE INVENTION

Video-audio recording apparatuses and methods, as well as video-audio reproducing apparatuses and methods according to embodiments of the present invention will be explained with reference to the drawings.

First Embodiment

Figure 1:
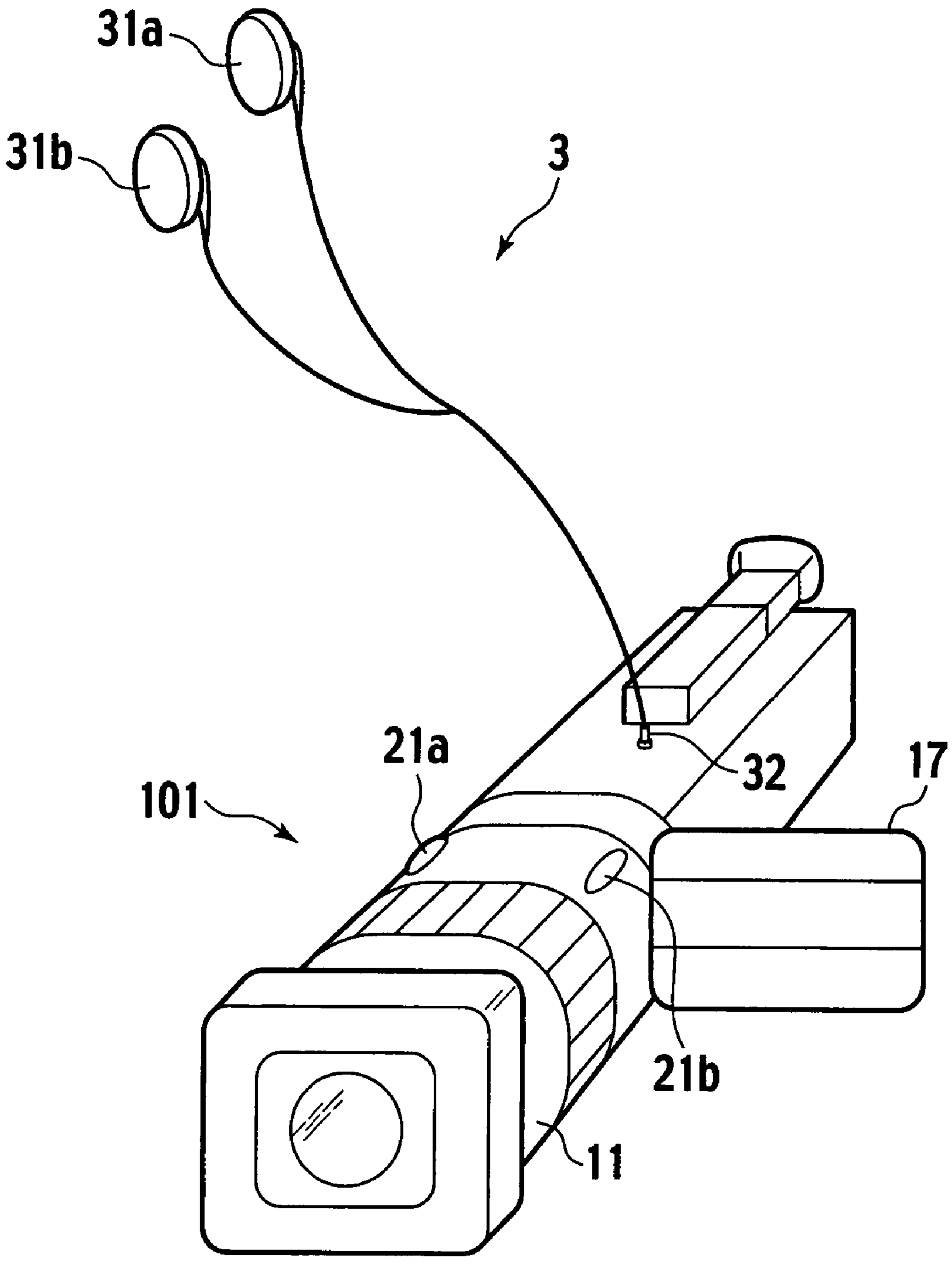
FIG. 1 is an external perspective view showing a video-audio recording and reproducing apparatus according to a first embodiment of the present invention.

FIG. 1 is a perspective view showing an external configuration example of a video-audio recording and reproducing apparatus 101 according to the first embodiment of the present invention.

The video-audio recording and reproducing apparatus 101 shown in FIG. 1 has a camera unit 11, a display 17, built-in stereo microphones 21*a* and 21*b*, and an external microphone connection terminal 32. To the external microphone connection terminal 32, an earphone-type binaural microphone 3 having omnidirectional left and right microphones 31*a* and 31*b* is removably connected. The drawing shows a state that the binaural microphone 3 is connected to the external microphone connection terminal 32. The microphones 31*a* and 31*b* incorporate diaphragms. As will be explained later in detail, the video-audio recording and reproducing apparatus 101 is capable of selectively conducting photographing (sound recording) with the built-in microphones 21*a* and 21*b* and photographing (sound recording) with the binaural microphone 3. Photographing means not only taking images of an object but also collecting ambient sounds around a photographer including a sound from an object in addition to taking images of the object.

Figure 2:
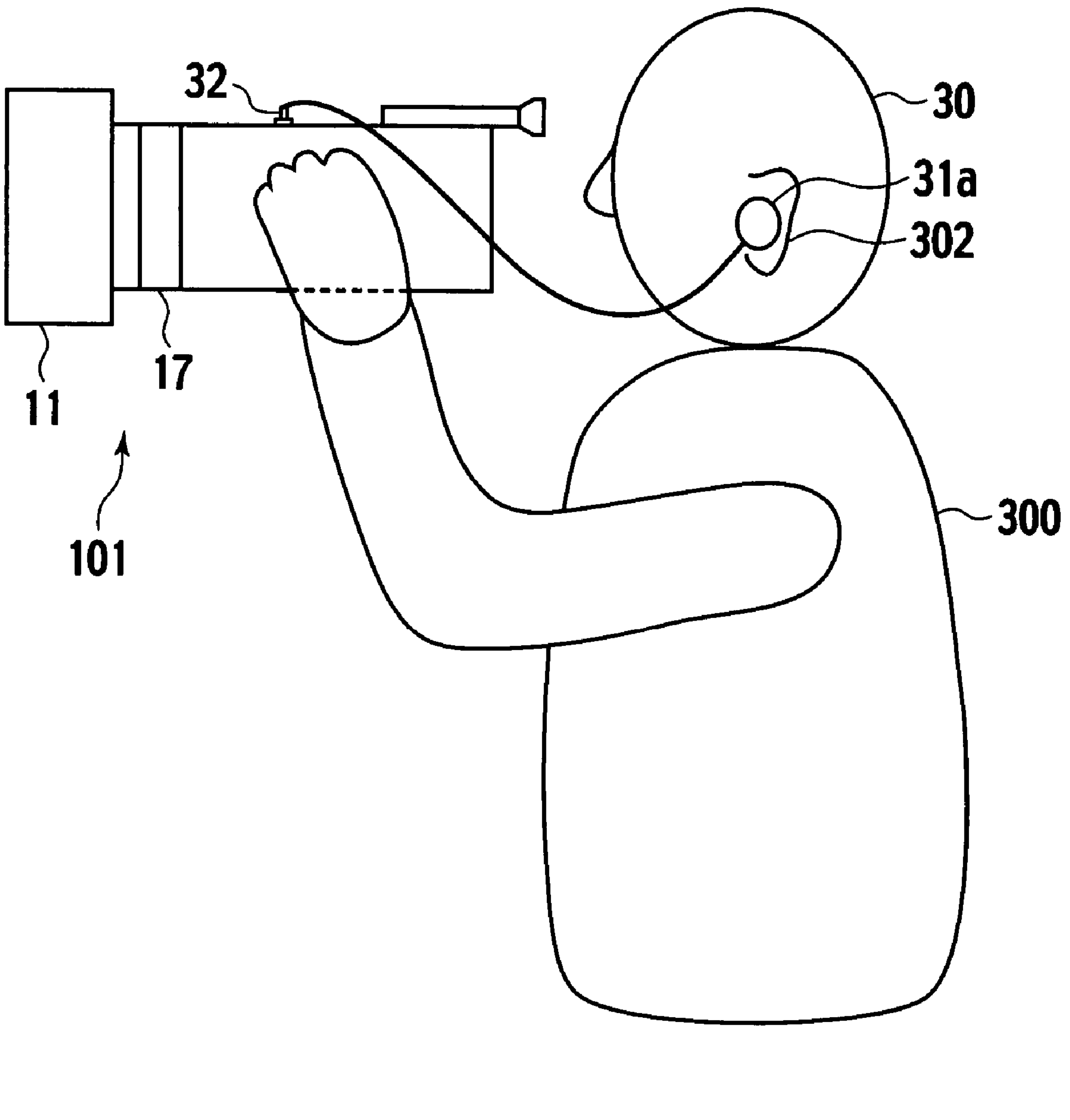
FIG. 2 is a view showing a state of photographing an object with the video-audio recording and reproducing apparatus according to the first embodiment of the present invention.

FIG. 2 shows a state that a photographer 300 is photographing an object (not shown) with the video-audio recording and reproducing apparatus 101. To photograph an object while collecting sounds with the binaural microphone 3, the photographer 300 puts the left and right microphones 31*a* and 31*b* on the left and right ears as shown in FIG. 2. With a binaural audio characteristic determined by a positional relationship between the head 30 of the photographer 300 and the microphones 31*a* and 31*b*, the ambient sounds of the photographer 300 including a sound from the object are collected. The photographer 300 watches a monitored image of the object displayed on the display 17 and photographs the object with the camera unit 11 while collecting the ambient sounds with the binaural microphone 3. As will be explained later in detail, a video signal from the camera unit 11 and an audio signal from the binaural microphone 3 are recorded on a recording medium (not shown). As will be explained later in detail, the video signal recorded on the recording medium is reproducible with realistic sounds as if a viewer is present in the same photographing environment as that in which the photographer 300 has been.

Figure 3:
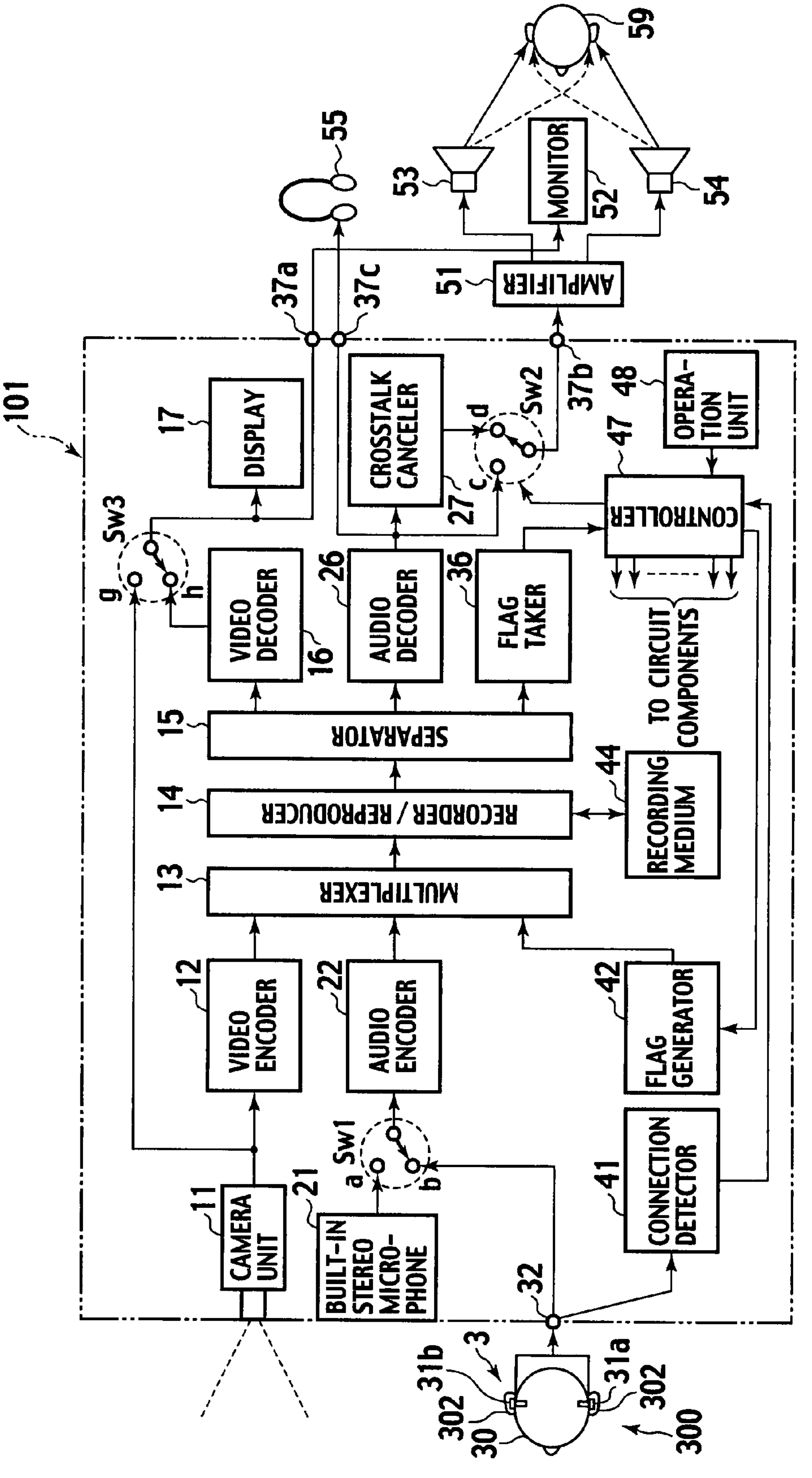
FIG. 3 is a block diagram showing an internal configuration example of the video-audio recording and reproducing apparatus according to the first embodiment of the present invention.

FIG. 3 is a block diagram showing a concrete internal configuration example of the video-audio recording and reproducing apparatus 101.

The video-audio recording and reproducing apparatus 101 has the camera unit 11, a video encoder 12, a multiplexer 13, a recorder/reproducer 14, a separator 15, a video decoder 16, the display 17, the built-in stereo microphone 21 (21 collectively represents 21*a* and 21*b*), an audio encoder 22, an audio decoder 26, a crosstalk canceler 27, the external microphone connection terminal 32, a flag taker 36, a video output terminal 37*a*, an audio output terminal 37*b*, a connection detector 41, a flag generator 42, a recording medium 44, a controller 47, an operation unit 48, and switches Sw1, Sw2, and Sw3. The recording medium 44 may be a removable recording medium such as a disk-like recording medium and a tape cassette, or it may be a recording medium preset in the video-audio recording and reproducing apparatus 101, such as a hard disk.

To the video output terminal 37*a*, a monitor 52 such as a television receiver is connected. To the audio output terminal 37*b*, speakers 53 and 54 are connected through an amplifier 51. The speakers 53 and 54 emit sounds that are heard by a viewer 59. For convenience, FIG. 3 shows both the photographer 300 and viewer 59. Needless to say, it is usual that photographing by the photographer 300 and watching and hearing reproduced pictures and sounds by the viewer 59 are separately carried out.

<Recording Operation>

A recording operation of the video-audio recording and reproducing apparatus 101 will be explained.

Figure 4:
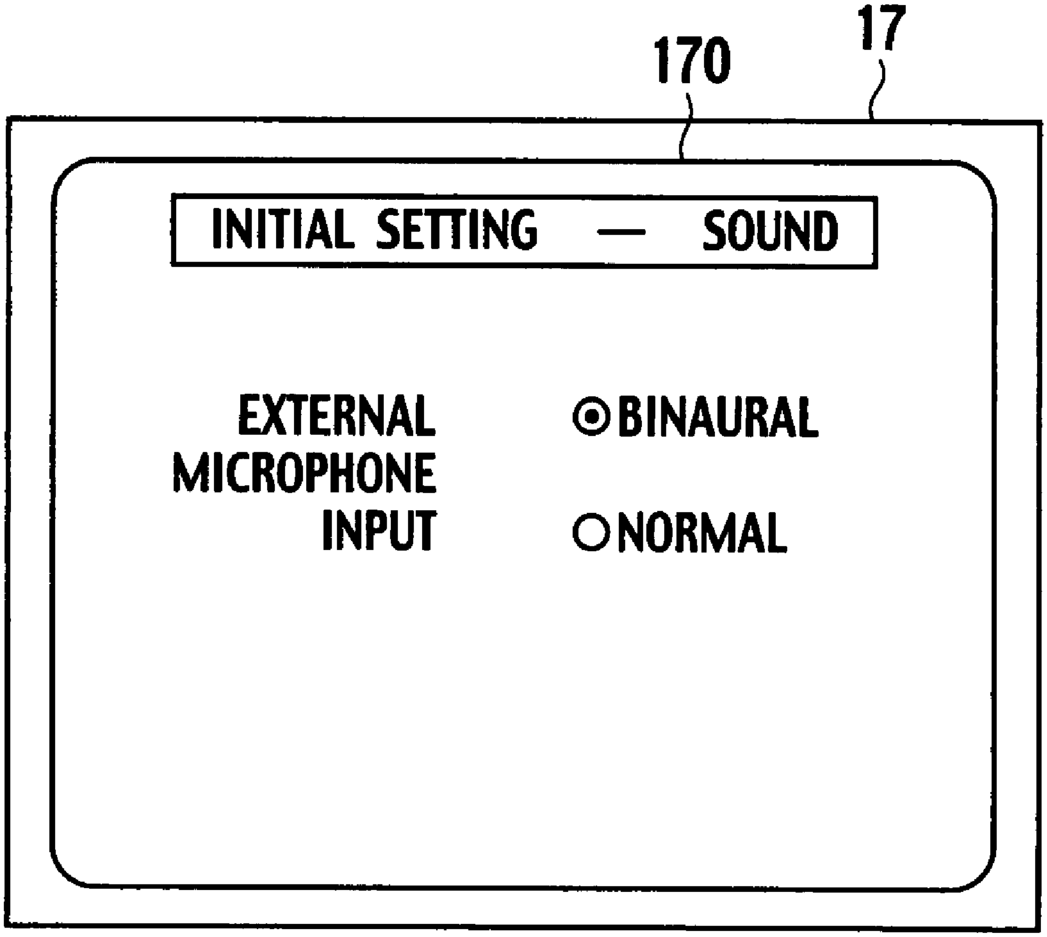
FIG. 4 is a view showing a display screen for the initial setting of an audio mode in a video-audio recording and reproducing apparatus according to each embodiment of the present invention.

First, the photographer 300 manipulates the operation unit 48 to display an initial setting image (window) for an audio mode. Then, the controller 47 displays on the display 17 an initial setting image 170 shown in FIG. 4. To the external microphone connection terminal 32, any one of the binaural microphone 3 explained in FIGS. 1 and 2 and a standard external microphone is connectable as an external microphone. When collecting sounds with the binaural microphone 300, the photographer 300 manipulates the operation unit 48 to select "Binaural" as shown in FIG. 4, and when collecting sounds with a normal external microphone, "Normal." The controller 47 serves as a setting unit to set the binaural microphone 3 or a microphone other than the binaural microphone as an external microphone connected to the external microphone connection terminal 32. If "Binaural" is selected as an external microphone input and if the connection detector 41 detects that an external microphone plug is inserted in the external microphone connection terminal 32, the controller 47 controls circuit components so that the video-audio recording and reproducing apparatus 101 may carry out a recording operation suitable for photographing with the use of the binaural microphone 3. An audio mode of collecting ambient sounds with the binaural microphone 3 and recording an audio signal of the collected sounds is referred to as a binaural mode. An audio mode of collecting ambient sounds with the use of the built-in stereo microphone 21 or a normal external microphone and recording an audio signal of the collected sounds is referred to as a normal mode.

A plug of the binaural microphone 3 may have a different shape from a normal external microphone, and the external microphone connection terminal 32 may be an exclusive connection terminal only for the binaural microphone 3. In this case, the audio mode initial setting mentioned above can be omitted.

In FIG. 3, when detecting that an external microphone is connected to the external microphone connection terminal 32, the connection detector 41 supplies a detection signal to the controller 47. Receiving the detection signal indicating that an external microphone is connected with "Binaural" setting, the controller 47 changes the switch Sw1 from a terminal a for receiving an audio signal from the built-in stereo microphone 21 to a terminal b for receiving an audio signal from the binaural microphone 3. As a result, an audio signal from the binaural microphone 3 is supplied to the audio encoder 22. The switch Sw1 serves as a switching unit to use the binaural microphone attached to the ears 302 of the photographer 300 or a microphone other than the binaural microphone.

In addition, the controller 47 controls the flag generator 42 to generate and issue flag information (binaural flag signal) indicative of the binaural mode. The binaural flag signal is supplied to the multiplexer 13.

Figure 5:
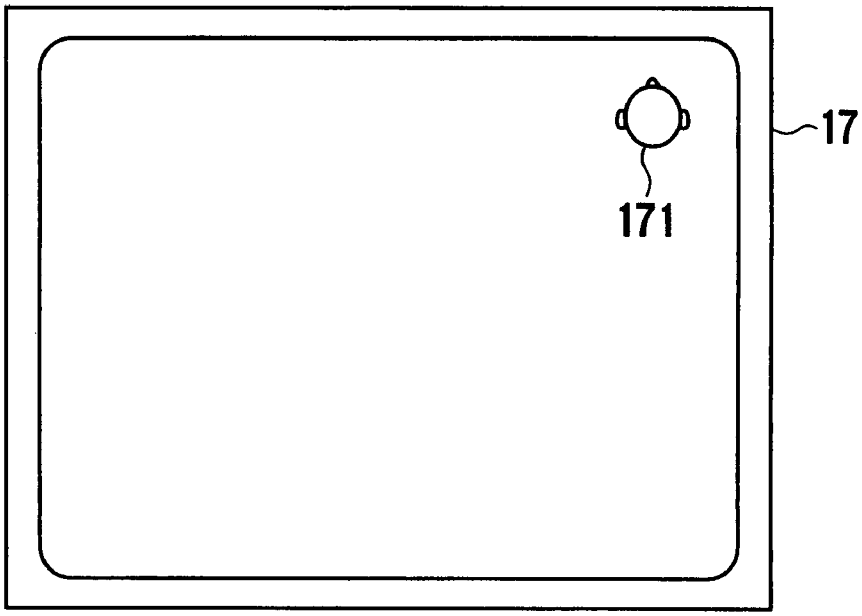
FIG. 5 is a view showing display examples of a binaural microphone in a video-audio recording and reproducing apparatus according to each embodiment of the present invention.
Figure 5:
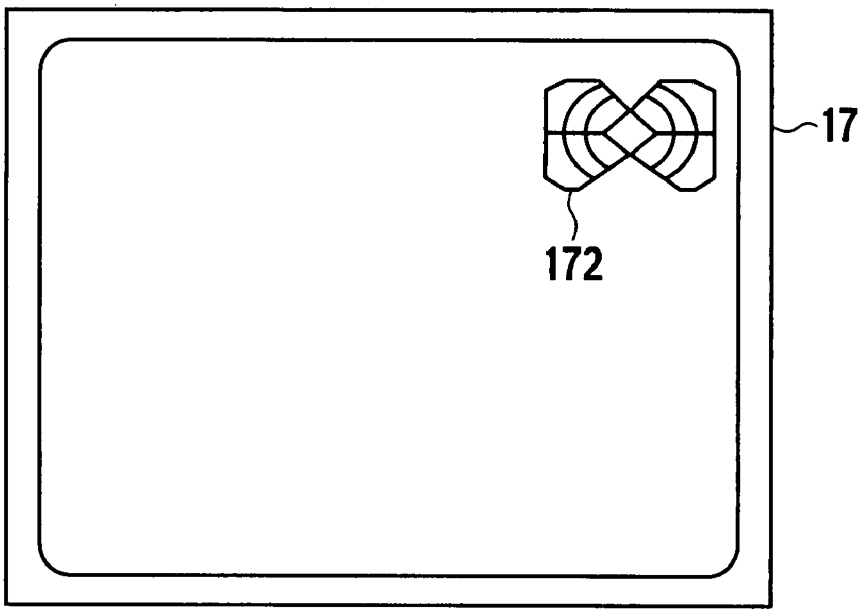

When the binaural mode is set, the controller 47 preferably displays a mark indicative of the binaural mode on the display 17. FIG. 5 shows examples of the mark. The mark 171 shown in FIG. 5(A) indicates a model of the photographer 300 wearing the binaural microphone 3. The mark 172 shown in FIG. 5(B) is a model of a speaker reproducing binaural sounds. Any one of the marks of FIGS. 5(A) and 5(B) can be used as a mark indicative of the binaural mode. Naturally, any other mark is usable. The mark is displayed on the display 17 over a picture photographed with the camera unit 11 after the above-mentioned initial setting or when the binaural microphone 3 is connected to the external microphone connection terminal 32. With the mark displayed, the photographer 300 can confirm whether or not the binaural mode is active when using the binaural microphone 3. When the audio mode is the binaural mode, the controller 47 serves as a display controller to display the binaural mark (171, 172) indicative of the binaural mode on the display 17.

The photographer 300 puts the left and right microphones 31*a* and 31*b* of the binaural microphone 3 on the left and right ears 302 and photographs an object with the camera unit 11. The camera unit 11 outputs a video signal that is supplied to the video encoder (video processor) 12 and a terminal g of the switch Sw3. When the video-audio recording and reproducing apparatus 101 is carrying out photographing (recording), the switch Sw3 is switched to the terminal g, so that the video signal from the camera unit 11 is supplied to the display 17 to display an image of the object. At the same time, based on a positional relationship between the head 30 of the photographer 300 and the microphones 31*a* and 31*b*, the microphones 31*a* and 31*b* provide an audio signal of binaurally collected sounds with the object being in a median plane direction. The audio signal is passed through the switch Sw1 to the audio encoder (audio processor) 22.

An assumption is made that the recording medium 44 is a DV cassette. The video encoder 12 carries out A/D conversion on the input video signal and encodes the same according to a DV compression method into an encoded video signal. The audio encoder 22 carries out A/D conversion on the input audio signal and rearranges data positions of the non-compressed audio signal by shuffling, thereby forming an encoded audio signal.

The multiplexer 13 time-division-multiplexes the encoded video signal, encoded audio signal, and binaural flag signal according to a signal format stipulated in consumer digital VCR specifications into a multiplexed signal. The multiplexed signal from the multiplexer 13 is supplied to the recorder/reproducer 14. The recorder/reproducer 14 records the multiplexed signal on the recording medium 44 according to a recording format stipulated in the consumer digital VCR specifications. The details of a recording method of the binaural flag signal will be explained later.

Modifications of the binaural microphone 3 will be explained.

<Modifications of Binaural Microphone 3>

Figure 6:
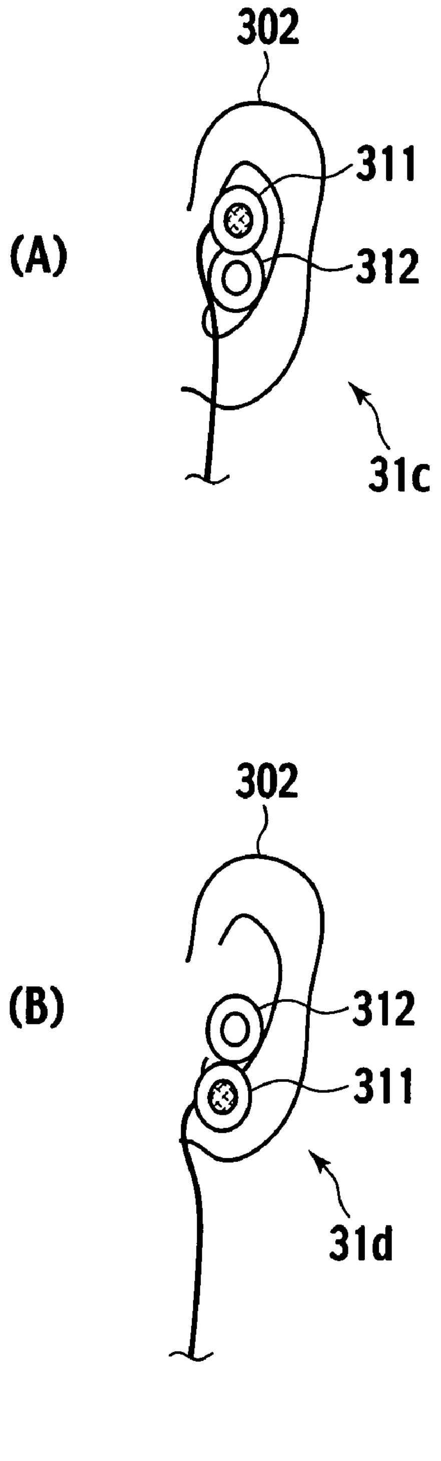
FIG. 6 is a view showing modifications of a binaural microphone used with a video-audio recording and reproducing apparatus according to each embodiment of the present invention.

FIG. 6(A) shows a microphone 31*c* as a first modification of the microphone 31*a* or 31*b*, and FIG. 6(B) shows a microphone 31*d* as a second modification of the microphone 31*a* or 31*b*. The microphone 31*c* shown in FIG. 6(A) includes a microphone holder 312 inserted in the ear 302 of the photographer 300 and a microphone housing 311 connected to an upper part of the microphone holder 312, to house a microphone unit such as a diaphragm. Making the binaural microphone 3 as the microphone 31*c* having the separated microphone housing 311 and microphone holder 312 results in enabling the photographer 300 to clearly hear external sounds even with the binaural microphone 3. The microphone 31*d* shown in FIG. 6(B) has a microphone holder 312 and a microphone housing 311 connected to a lower part of the microphone holder 312. The microphone 31*d* provides the same effect as the microphone 31*c*.

Figure 7:
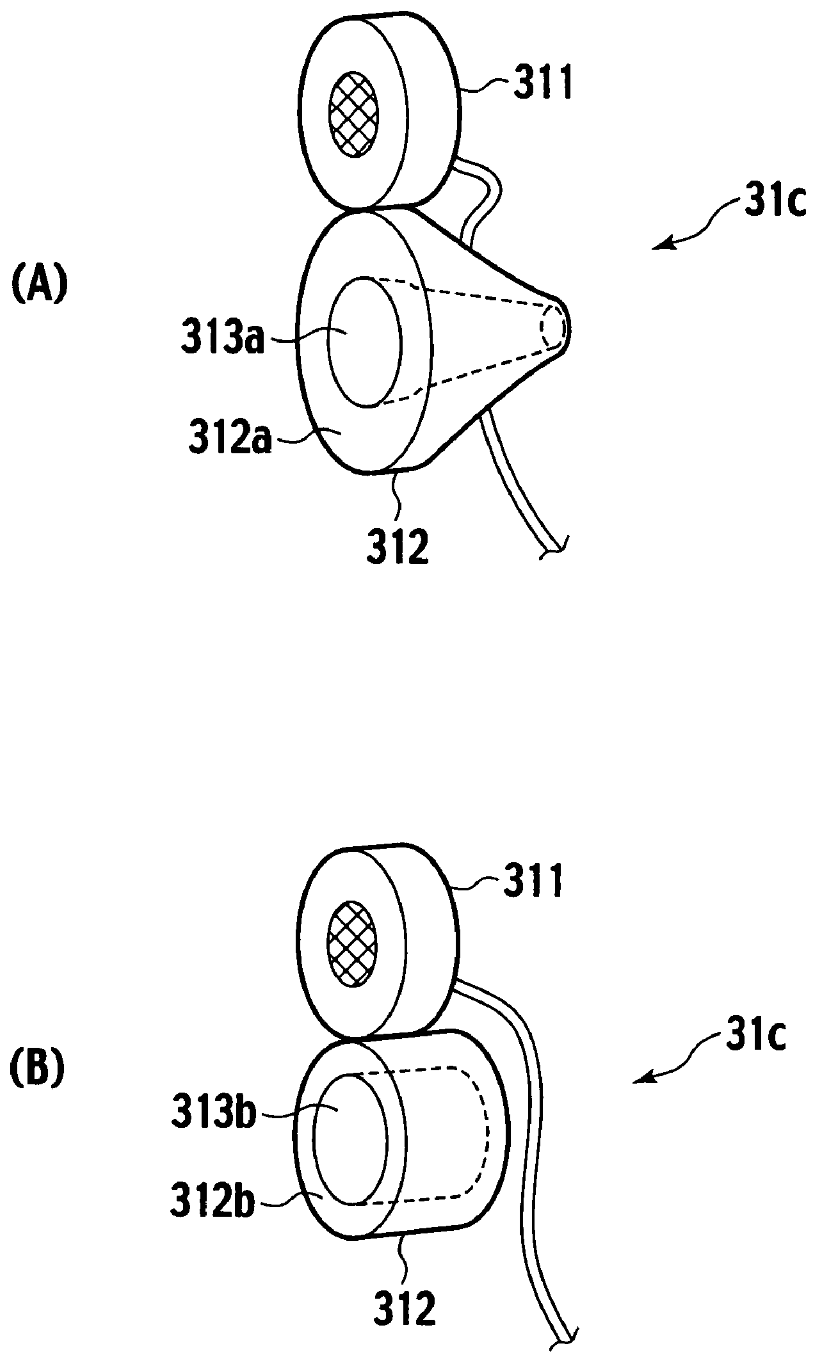
FIG. 7 is a view showing modifications of a binaural microphone used with a video-audio recording and reproducing apparatus according to each embodiment of the present invention.

FIG. 7 shows perspective views of concrete configuration examples of the microphone holder 312. These examples are based on the microphone 31*c* of FIG. 6(A) with the microphone housing 311 being arranged on the microphone holder 312. The microphone holder 312 shown in FIG. 7(A) has a holder body 312*a* provided with a tapered sound hole 313*a* whose diameter decreases toward the inside of the ear 302. The microphone holder 312 shown in FIG. 7(B) has a holder body 312*b* provided with a cylindrical sound hole 313*b*. The holder body 312*a* of FIG. 7(A) is easy to insert into the ear 302 of the photographer 300, and the holder body 312*b* of FIG. 7(B) is characterized by a small attenuation of external sounds when used.

Figure 8:
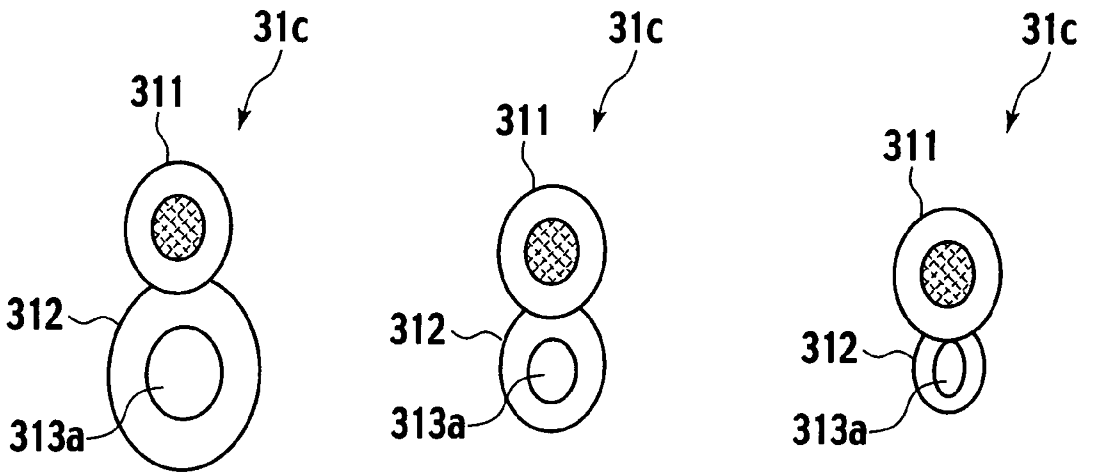
FIG. 8 is a view showing modifications of a binaural microphone used with a video-audio recording and reproducing apparatus according to each embodiment of the present invention.

FIG. 8 shows examples of different external shapes of the microphone holder 312 of the microphone 31*c* of FIG. 6(A). In FIG. 8, (A) is a microphone holder 312 having a large external shape, (B) is a microphone holder 312 having a medium external shape, and (C) is a microphone holder 312 having a small external shape. By preparing different sizes for the microphone holder 312, the photographer 300 can select one that is suitable for the ear 302 of the photographer. In FIGS. 8(A) to (C), the shapes and sizes of the microphone housings 311 (microphone unit) are the same, and also, the sensitivities and response frequency characteristics of the microphone units are the same.

<Binaural Flag Signal Recording>

To discriminate binaural sounds collected by the binaural microphone 3 put on the photographer 300 from stereo sounds collected with the built-in stereo microphone 21, a binaural flag signal is recorded together with binaural sounds on the recording medium 44 during the collection of binaural sounds. The binaural flag signal is generated by the flag generator 42.

The details of a method of recording a binaural flag signal will be explained on an assumption that the recording medium 44 is a DV cassette.

Figure 9:
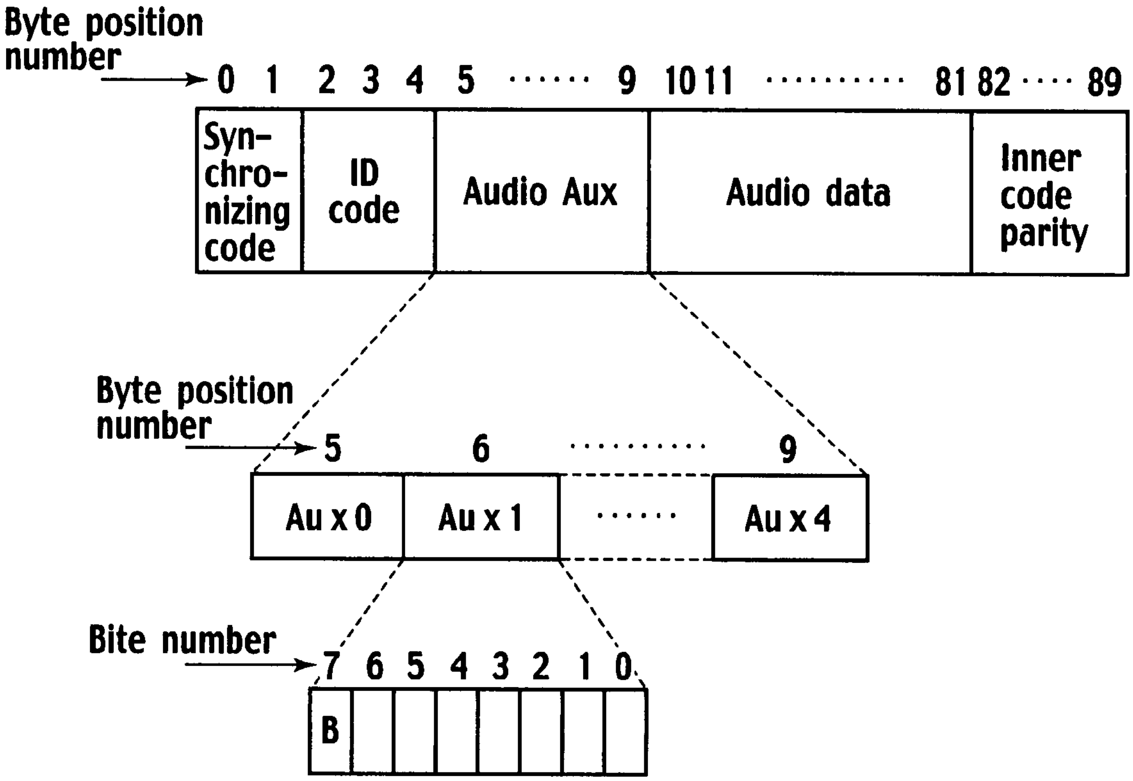
FIG. 9 is a view showing an example of a description format for a binaural flag signal in a video-audio recording and reproducing apparatus according to each embodiment of the present invention.

FIG. 9 shows a data format used to record audio data on a DV cassette. Among audio data of 0th to 89th bytes to be recorded, the 0th and 1st bytes record a synchronization code, the 2nd to 4th bytes an ID (identification) code, the 5th to 9th bytes audio auxiliary data (AUX), the 10th to 81st bytes audio data, and the 82nd to 89th bytes inner code parity data for error data detection and correction. The flag generator 42 provides, for example, a binaural flag signal of 1 representative of the binaural mode and a binaural signal of 0 representative of a non-binaural mode (normal mode). The multiplexer 13 generates a signal having the data format shown in FIG. 9.

The details of a method of recording a binaural flag signal when the recording medium 44 is a recording disk will be explained. The recording disk may be a disk using a red laser beam for recording and reproducing, such as a DVD-RAM, DVD-RW, and SVD-R, or a disk using a blue laser beam for recording and reproducing, such as a Blue-ray Disc and HD-DVD. Here, the binaural flag signal is multiplexed according to a DVD video standard generally adopted for these recording disks.

A first method of multiplexing a binaural flag signal according to the DVD video standard is a method of multiplexing a binaural flag signal in a DVD-video zone based on the DVD video standard.

Figure 10:
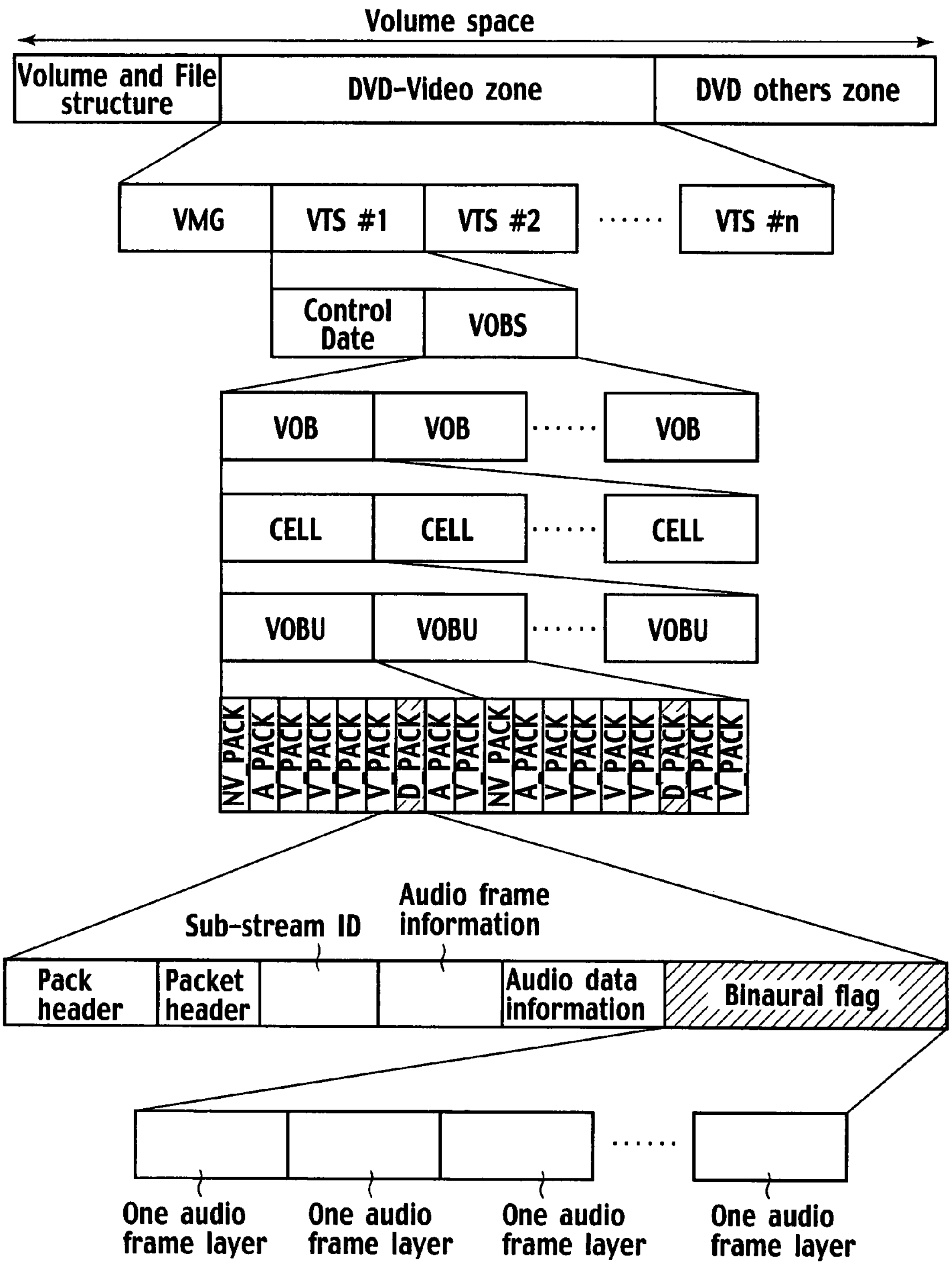
FIG. 10 is a view showing another example of a description format for a binaural flag signal in a video-audio recording and reproducing apparatus according to each embodiment of the present invention.

As shown in FIG. 10, a volume space according to the DVD standard consists of a volume and file structure, a DVD-video zone, and a DVD others zone. The DVD-video zone includes a VMG (Video Manager) and VTS (Video Title Set) #1 to #n. Here, n is a predetermined integer equal to or larger than 2. Each VTS includes control data and VOBS (Video Object Set). The VOBS includes a plurality of VOBs (Video Objects). The VOB includes a plurality of CELLs. The CELL includes a plurality of VOBUs (Video Object Units). The VOBU includes a navigation pack (NV_PACK), an audio pack (A_PACK), and video packs (V_PACKs). According to this embodiment, the VOBU is provided with a data pack (D_PACK) containing a binaural flag signal.

The data pack (D_PACK) includes a pack header, a packet header, a sub-stream ID, audio frame information, audio data information, and a binaural flag signal. The binaural flag signal consists of a plurality of audio frame layers.

In this way, the format based on the DVD-video standard is used to pack information including a binaural flag signal into a data pack (D_PACK), which is MPEG-multiplexed. This keeps compatibility with the DVD-video standard and can specify an audio frame part of an audio signal where a binaural audio signal is present and an audio frame part where a usual stereo sound is present. It is easy, therefore, to identify an audio frame part on which a crosstalk canceling process must be executed.

A second method of multiplexing a binaural flag signal according to the DVD-video standard is a method of multiplexing a binaural flag signal in the DVD others zone based on the DVD-video standard. The DVD others zone is a zone to record auxiliary data related to video and audio data proper and is also a user data recording zone.

Figure 11:
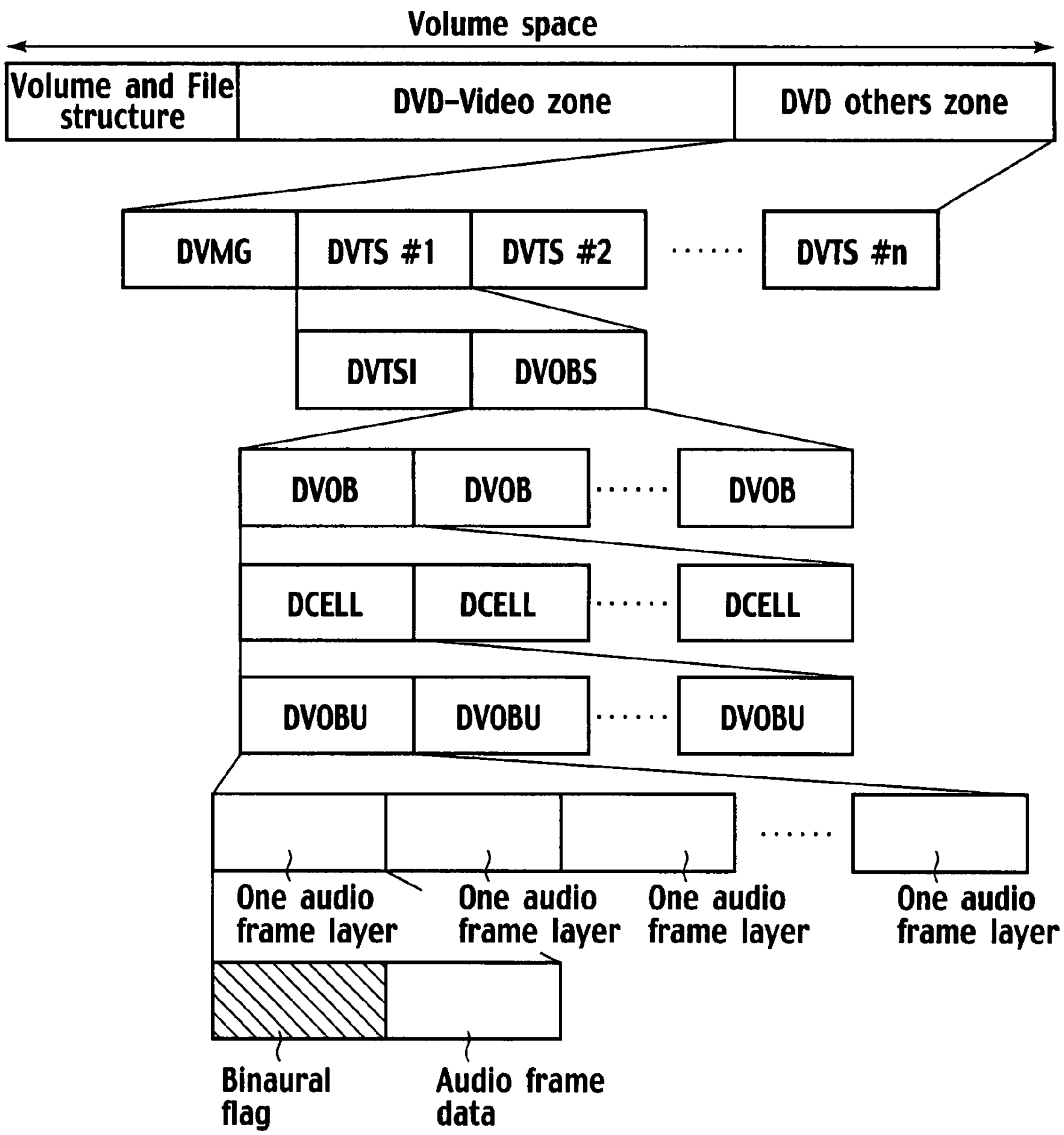
FIG. 11 is a view showing still another example of a description format for a binaural flag signal in a video-audio recording and reproducing apparatus according to each embodiment of the present invention.

As is apparent from comparison between FIGS. 10 and 11, this embodiment makes the data structure of a user data recording zone in the DVD others zone similar to the data structure of the DVD-video zone. As shown in FIG. 11, the DVD others zone includes information pieces of VMG, VTS, VOBS, VOB, CELL, and VOBU. These information pieces in the DVD others zone shown in FIG. 11 are provided with a prefix of D, to discriminate them from those of FIG. 10.

As shown in FIG. 11, the DVD others zone includes DVMG and DVTS #1 to DVTS #n. Each DVTS includes DVTSI (Video Title Set Information) and DVOBS. The DVOBS includes a plurality of DVOBs. The DVOB includes a plurality of DCELLs. The DCELL includes a plurality of DVOBUs. The DVOBU includes a plurality of audio frame layers. The audio frame layer is a zone to record audio frame data such as encoding parameters for an audio signal. A part of the audio frame layer is used as a binaural flag signal recording zone.

Writing a binaural flag signal in the DVD others zone based on the DVD-video standard can relate an audio signal (a binaural audio signal or a usual stereo audio signal) contained in the DVD-video zone to the binaural flag signal. It secures compatibility with the DVD-video standard and can identify an audio frame part in an audio signal where a binaural audio signal is present and an audio frame part where a usual stereo sound is present. It is easy, therefore, to specify an audio frame part on which a crosstalk canceling process must be carried out.

In the examples of FIGS. 10 and 11, a start button is manipulated to start photographing and a stop button is manipulated to terminate photographing. An audio signal prepared during this period is stored in one or a plurality of audio frame layers, each audio frame layer containing audio mode information. The audio mode information includes a binaural flag signal that is managed as a binaural information packet. Managing a binaural flag signal as a binaural information packet makes it easy to obtain the audio mode information from each audio frame. Even if binaural audio signals and usual stereo audio signals are mixed and recorded on the recording medium 44, the recording medium 44 can be reproduced by properly turning on/off the crosstalk canceler 27 according to an audio mode, as will be explained later in detail. The audio mode information must be recorded whenever photographing is started, more preferably, at predetermined intervals.

Even if the recording medium 44 is, for example, a semiconductor memory, a binaural flag signal recording zone is defined and an audio mode for an audio signal to be recorded is specified, as mentioned above. Then, it is possible to identify a binaurally recorded audio signal, properly turn on/off the crosstalk canceler 27, and reproduce the audio signal.

A binaural data flag may be inserted in user data in a multiplexed layer based on, for example, an MPEG encoding method. For example, consider the use of cellular phones each having a video-audio communication function. A transmitter cellular phone transmits a photographed video signal and an audio signal collected with the binaural microphone 3 to a receiver cellular phone. In this case, a binaural flag signal can be transmitted from the transmitter cellular phone to the receiver cellular phone. Transmitting an audio signal provided with a binaural flag signal enables a realistic binaural sound to be reproduced. In this case, the binaural flag signal is stored at a predetermined location in video and audio packet data transmitted between the cellular phones. When a transmission method based on MPEG-4 is used, a user data recording zone in an elementary stream can be used to transmit a binaural flag signal such as the one shown in FIG. 9. If a transport stream based on the MPEG-4 standard is used, a private data zone (private_data_type) may be used to carry a binaural flag signal.

If video data and audio data are transmitted as file data in the form of an attached file, a file header may carry a binaural flag signal.

Figure 12:
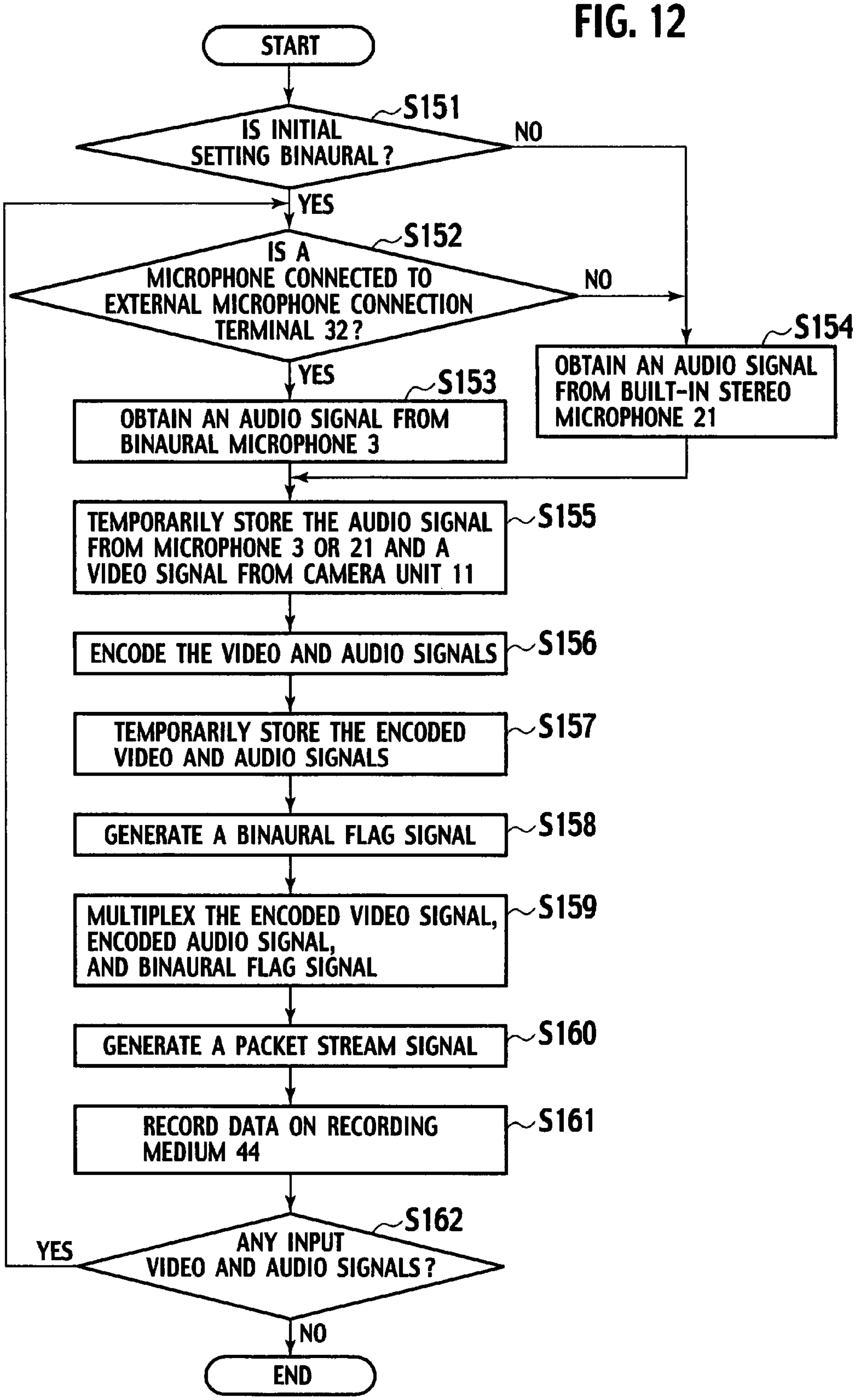
FIG. 12 is a flowchart explaining a recording operation in the video-audio recording and reproducing apparatus according to the first embodiment of the present invention.

A recording operation of the video-audio recording and reproducing apparatus 101 will be explained in detail with reference to a flowchart shown in FIG. 12.

In step S151, the controller 47 determines whether or not the initial setting explained in FIG. 4 is the binaural microphone 3 to be connected as an external microphone to the external microphone connection terminal 32. If step S151 determines that the initial setting is binaural (YES), it advances to step S152. If it is not binaural (NO), the controller 47 changes the switch Sw1 to the terminal a, and in step S154, the video-audio recording and reproducing apparatus 101 acquires an audio signal from the built-in stereo microphone 21. In step S152, the controller 47 determines whether or not the connection detector 41 detects that an external microphone plug is inserted in the external microphone connection terminal 32. If step S152 determines that an external microphone is connected to the external microphone connection terminal 32 (YES), the controller 47 changes the switch Sw1 to the terminal b, and in step S153, the video-audio recording and reproducing apparatus 101 obtains an audio signal from the binaural microphone 3. If step S152 determines that no external microphone is connected to the external microphone connection terminal 32 (NO), the controller 47 changes the switch Sw1 to the terminal a, and in step S154, the video-audio recording and reproducing apparatus 101 obtains an audio signal from the built-in stereo microphone 21.

In step S155, a video signal from the camera unit 11 is temporarily stored in a memory (not shown) of the video encoder 12, and the audio signal from the binaural microphone 3 or built-in stereo microphone 21 is temporarily stored in a memory (not shown) of the audio encoder 22. In step S156, the video encoder 12 encodes the video signal, and the audio encoder 22 encodes the audio signal. In step S157, the encoded video signal is temporarily stored in a buffer (not shown) of the video encoder 12, and the encoded audio signal is temporarily stored in a buffer (not shown) of the audio encoder 22. In step S158, the flag generator 42 generates, if in the binaural mode, a binaural flag signal according to an instruction from the controller 47.

In step S159, the multiplexer 13 multiplexes the encoded video signal, encoded audio signal, and binaural flag signal, and in step S160, generates a packet stream signal. In step S161, the recorder/reproducer 14 records the packet stream signal on the recording medium 44. In step S162, the video encoder 12 and audio encoder 22 determine whether or not there are a video signal and audio signal to be encoded. If there are still video and audio signals to be encoded (YES), it advances to step S152 to repeat the above-mentioned operations. If step S162 determines that there are no video and audio signals to be encoded (NO), the process ends.

<Reproducing Operation>

Returning to FIG. 3, a reproducing operation of the video-audio recording and reproducing apparatus 101 will be explained. In FIG. 3, a reproduce button (not shown) on the operation unit 48 is manipulated. Then, the controller 47 controls the recorder/reproducer 14 to reproduce a multiplexed signal, i.e., a signal recorded on the recording medium 44. The multiplexed signal reproduced by the recorder/reproducer 14 is supplied to the separator 15. The separator 15 separates the multiplexed signal into an encoded video signal, an encoded audio signal, and a binaural flag signal.

The encoded video signal is supplied to the video decoder (video processor) 16, the encoded audio signal is supplied to the audio decoder (audio processor) 26, and the binaural flag signal is supplied to the flag taker 36. The video decoder 16 decodes the encoded video signal into a video signal. In response to the manipulation of the reproduce button, the controller 47 changes the switch Sw3 to a terminal h. The video signal from the video decoder 16 is displayed on the display 17, and at the same time, is supplied through the video output terminal 37*a* to the monitor 52, which displays the video signal. The audio decoder 26 decodes the encoded audio signal into an audio signal. The audio signal is supplied to the crosstalk canceler 27 and a terminal c of the switch Sw2.

When a binaurally collected audio signal is reproduced through the speakers 53 and 54, the left speaker 54 causes a first crosstalk component to be received by the right ear of the viewer 59 and the right speaker 53 causes a second crosstalk component to be received by the left ear of the viewer 59. To cancel the first and second crosstalk components, the crosstalk canceler 27 generates a signal and adds the same to the audio signal, thereby generating a crosstalk-processed signal. The flag taker 36 holds the binaural flag signal provided by the separator 15. The controller 47 changes the switch Sw2 depending on whether or not the flag taker 36 is holding a binaural flag signal. If the flag taker 36 has a binaural flag signal, the switch Sw2 is connected to a terminal d to supply the crosstalk-processed signal from the crosstalk canceler 27 to the audio output terminal 37*b*. If no binaural flag signal is held, the switch Sw2 is connected to the terminal c to supply the audio signal that is not crosstalk-processed from the audio decoder 26 to the audio output terminal 37*b*.

The audio signal that has been output from the audio output terminal 37*b* is amplified through the amplifier 51 and is voiced from the left and right speakers 53 and 54. If the audio signal from the audio output terminal 37*b* is a crosstalk-processed signal from the crosstalk canceler 27, the viewer 59 can watch an image displayed on the monitor 52 and simultaneously hear a lifelike sound that was present around the photographer 300 and was collected during photographing by the photographer 300. At this time, the crosstalk canceler 27 cancels crosstalk components with the use of a head transfer function to be explained later in detail. Accordingly, even if the photographer 300 is different from the viewer 59, or even if an optional photographer 300 conducts photographing and an optional viewer 59 watches the same, the viewer can enjoy realistic sounds substantially without an odd feeling.

The reproducing operation of the video-audio recording and reproducing apparatus 101 will be explained in more detail with reference to a flowchart shown in FIG. 13.

Figure 13:
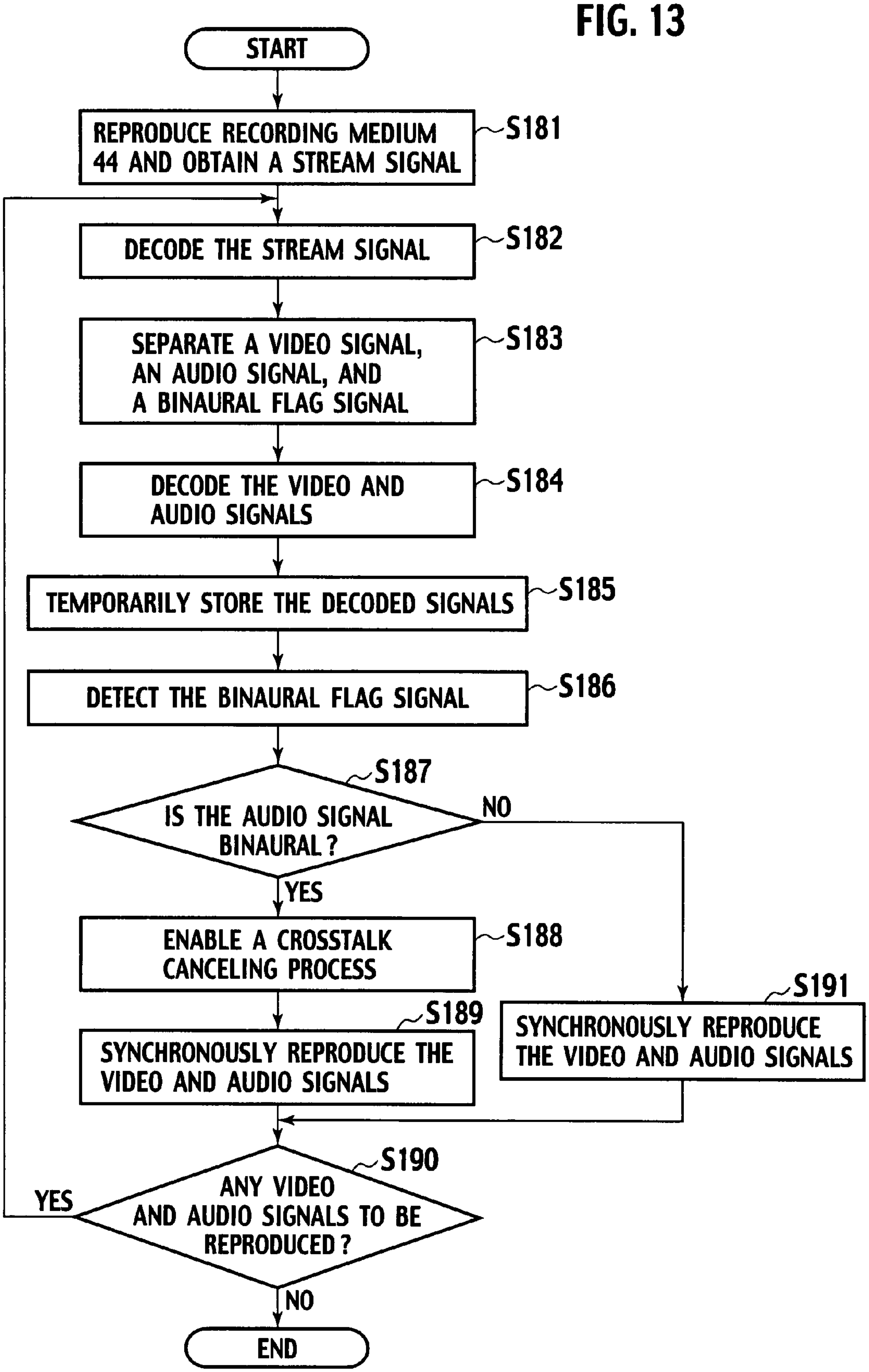
FIG. 13 is a flowchart explaining a reproducing operation in the video-audio recording and reproducing apparatus according to the first embodiment of the present invention.

In step S181 of FIG. 13, the recorder/reproducer 14 reproduces the recording medium 44, to obtain a stream signal based on a multiplexed signal. In step S182, the recorder/reproducer 14 decodes the stream signal into a packet signal. In step S183, the separator 15 separates the packet signal into a video signal, an audio signal, and a binaural flag signal. In step S184, the video decoder 16 decodes the video signal and the audio decoder 26 decodes the audio signal. In step S185, the video decoder 16 and audio decoder 26 temporarily store the decoded video and audio signals in buffers (not shown). In step S186, the flag taker 36 takes the binaural flag signal.

In step S187, the controller 47 determines, according to the binaural flag signal obtained by the flag taker 36, whether or not the reproduced audio signal is a usual stereo audio signal or a binaural audio signal. If step S187 determines that it is a binaural audio signal (YES), step S188 is carried out. If step S187 determines that it is not a binaural audio signal (NO), it advances to step S191 in which the controller 47 changes the switch Sw2 to the terminal c and controls circuit components to synchronously reproduce the video and audio signals.

If it is the binaural mode, the controller 47 changes, in step S188, the switch Sw2 to the terminal d and enables the crosstalk canceling process by the crosstalk canceler 27. In step S189, the controller 47 controls circuit components to synchronously reproduce the video signal and the audio signal that has been crosstalk-canceled by the crosstalk canceler 27. If step S190 determines that there are still video and audio signals to be reproduced (YES), the process returns to step S182 to repeat the above-mentioned operations. If step S190 determines that there are no video and audio signals to be reproduced (NO), the process ends.

<Crosstalk Canceling>

Figure 14:
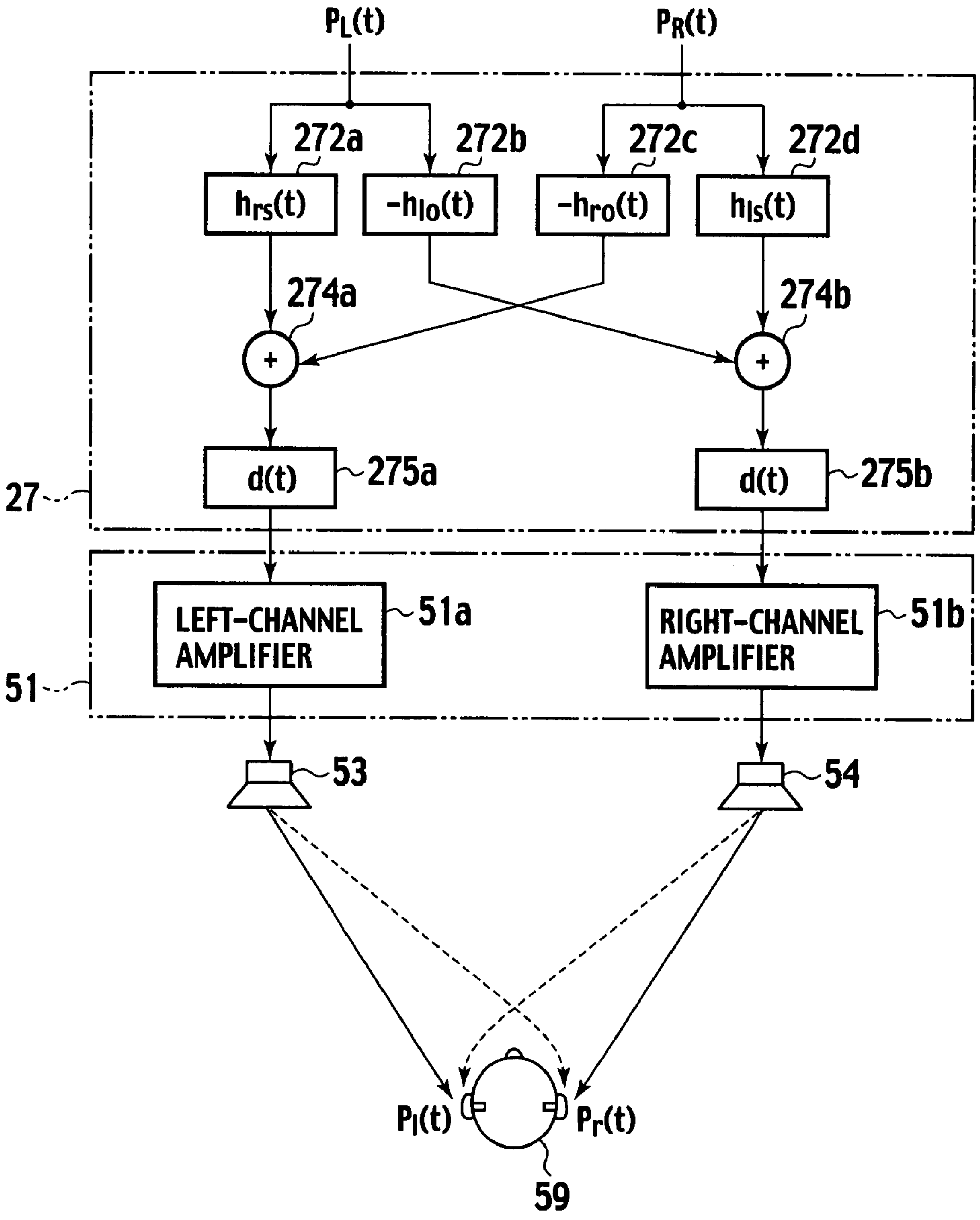
FIG. 14 is a block diagram showing a configuration example of a crosstalk canceler used with a video-audio recording and reproducing apparatus according to each embodiment of the present invention.

A concrete configuration and operation of the crosstalk canceler 27 will be explained with reference to FIG. 14. As shown in FIG. 14, the crosstalk canceler 27 has filters 272*a* to 272*d*, adders 274*a* and 274*b*, and filters 275*a* and 275*b*.

In FIG. 14, a left-channel signal $P_L(t)$ of a binaural audio signal is supplied to the filters 272*a* and 272*b*, and a right-channel signal $P_R(t)$ of the binaural audio signal is supplied to the filters 272*c* and 272*d*. The filters 272*a* to 272*d* store filter characteristics (filter factors) prepared according to head transfer functions $h_{rs}(t)$, $h_{lo}(t)$, $h_{ro}(t)$, and $h_{ls}(t)$ to be explained later. The filters 272*a* and 272*d* have filter characteristics equivalent to the head transfer functions $h_{rs}(t)$ and $h_{ls}(t)$ and the filters 272*b* and 272*c* have filter characteristics equivalent to inversions of the head transfer functions $h_{lo}(t)$ and $h_{ro}(t)$. For convenience, the filter characteristics of the filters 272*a* to 272*d* are expressed as $h_{rs}(t)$, $-h_{lo}(t)$, $-h_{ro}(t)$, and $h_{ls}(t)$, respectively. The filters 272*a* to 272*d* apply the respective filter characteristics to the input signals $P_L(t)$ and $P_R(t)$ and provide outputs.

The adder 274*a* adds output signals from the filters 272*a* and 272*c* to each other, and the filter 275*a* applies a filter characteristic of d(t) to the sum signal. The adder 274*b* adds output signals from the filters 272*b* and 272*d* to each other, and the filter 275*b* applies the filter characteristic d(t) to the sum signal.

The filter characteristic d(t) stored in the filters 275*a* and 275*b* is as follows:

$$d(t)=\{h_{ls}(t)\times h_{rs}(t)-h_{lo}(t)\times h_{ro}(t)\}^{-1} \quad (1)$$

Output signals from the filters 275*a* and 275*b* are crosstalk-processed signals, so that the speakers 53 and 54 may emit crosstalk-canceled sounds. The crosstalk-processed signals from the filters 275*a* and 275*b* are amplified through a left-channel amplifier 51*a* and a right-channel amplifier 51*b* of the amplifier 51, respectively, and are voiced through the speakers 53 and 54.

The signal (sound) voiced from the speaker 53 is received by the left ear of the viewer 59, and part of the voiced signal is received as a first crosstalk signal (indicated with a dotted line) by the right ear of the viewer 59. The crosstalk canceler 27 generates a first crosstalk cancel signal to cancel the first crosstalk signal received by the right ear of the viewer 59 and emits the same from the speaker 54. The first crosstalk cancel signal cancels (attenuates) the first crosstalk signal. Similarly, the signal (sound) voiced from the speaker 54 is received by the right ear of the viewer 59, and part of the voiced signal is received as a second crosstalk signal (indicated with a dotted line) by the left ear of the viewer 59. The crosstalk canceler 27 generates a second crosstalk cancel signal to cancel the second crosstalk signal received by the left ear of the viewer 59 and emits the same from the speaker 53. The second crosstalk cancel signal cancels (attenuates) the second crosstalk signal. As a result, the viewer 59 hears a crosstalk-canceled audio signal Pl(t) by the left ear and a crosstalk-canceled audio signal Pr(t) by the right ear.

<Measurement of Head Transfer Function>

Figure 15:
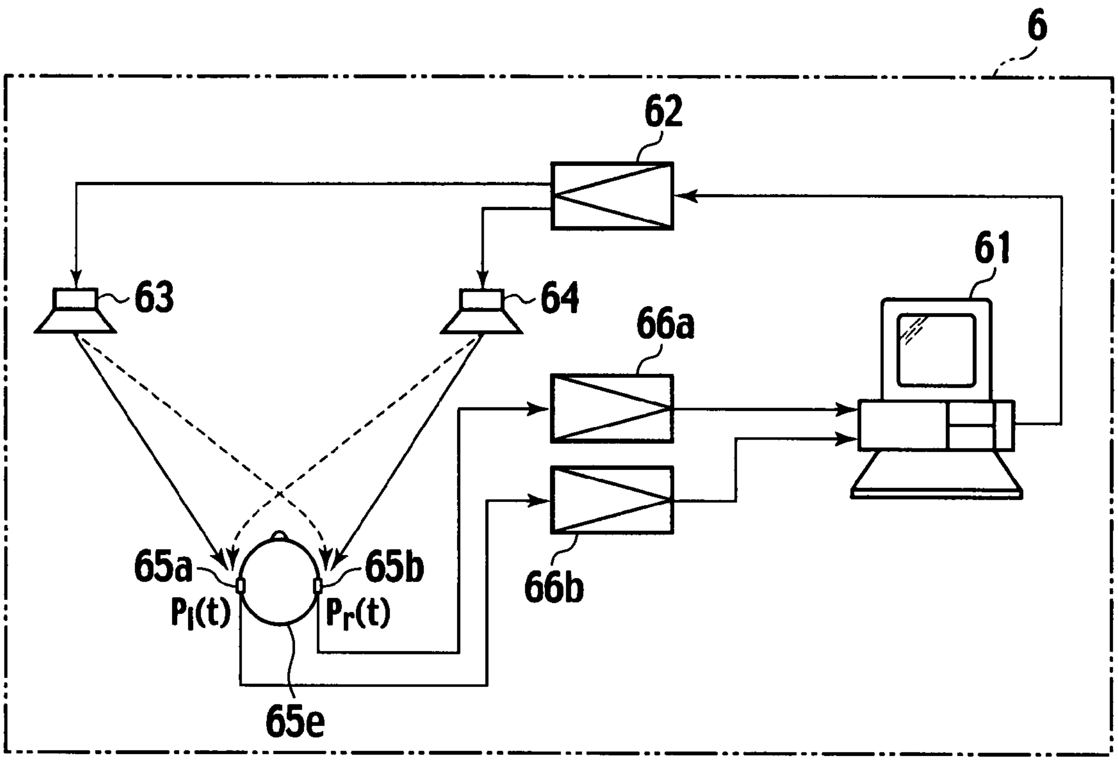
FIG. 15 is a view showing a head transfer function measuring apparatus for finding a head transfer function characteristic used by the crosstalk canceler of a video-audio recording and reproducing apparatus according to each embodiment of the present invention.

With reference to FIG. 15, a head transfer function measuring apparatus 6 for finding the head transfer function characteristics stored in the filters 272*a* to 272*d*, 275*a*, and 275*b* will be explained. In FIG. 15, the head transfer function measuring apparatus 6 has a personal computer 61, an amplifier 62, speakers 63 and 64, microphone units 65*a* and 65*b*, a cylindrical structure 65*e*, and amplifiers 66*a* and 66*b*.

A method of measuring a head transfer function will be explained.

First, the personal computer 61 generates a measurement signal that is, for example, an impulse sound. The measurement signal is amplified through the amplifier 62. The measurement signal emitted from the left speaker 63 is received by the left and right microphone units 65*a* and 65*b*. Left and right signals based on the received sound are amplified through the amplifiers 66*a* and 66*b* and are supplied to the personal computer 61. These signals are head transfer functions $h_{ls}(t)$ and $h_{lo}(t)$ of the signals provided by the left and right microphone units 65*a* and 65*b* attached to the cylindrical structure 65*e* in response to the sound emitted from the speaker 63. The head transfer function $h_{ls}(t)$ is a characteristic related to a signal that is emitted from the left speaker 63 and is received by the left microphone unit 65*a*. The head transfer function $h_{lo}(t)$ is a crosstalk component characteristic related to a signal that is emitted from the left speaker 63 and is received by the right microphone unit 65*b*.

Similarly, the measurement signal emitted from the right speaker 64 is received by the left and right microphone units 65*a* and 65*b*. Left and right signals based on the received sound are amplified through the amplifiers 66*a* and 66*b* and are supplied to the personal computer 61. The personal computer 61 compares the generated measurement signal with the received signals and finds head transfer functions $h_{rs}(t)$ and $h_{ro}(t)$ of the signals provided by the left and right microphone units 65*a* and 65*b* attached to the cylindrical structure 65*e* in response to the sound emitted from the speaker 64. The head transfer function $h_{rs}(t)$ is a characteristic related to a signal that is emitted from the right speaker 64 and is received by the right microphone unit 65*b*. The head transfer function $h_{ro}(t)$ is a crosstalk component characteristic related to a signal that is emitted from the right speaker 64 and is received by the left microphone unit 65*a*.

Figure 16:
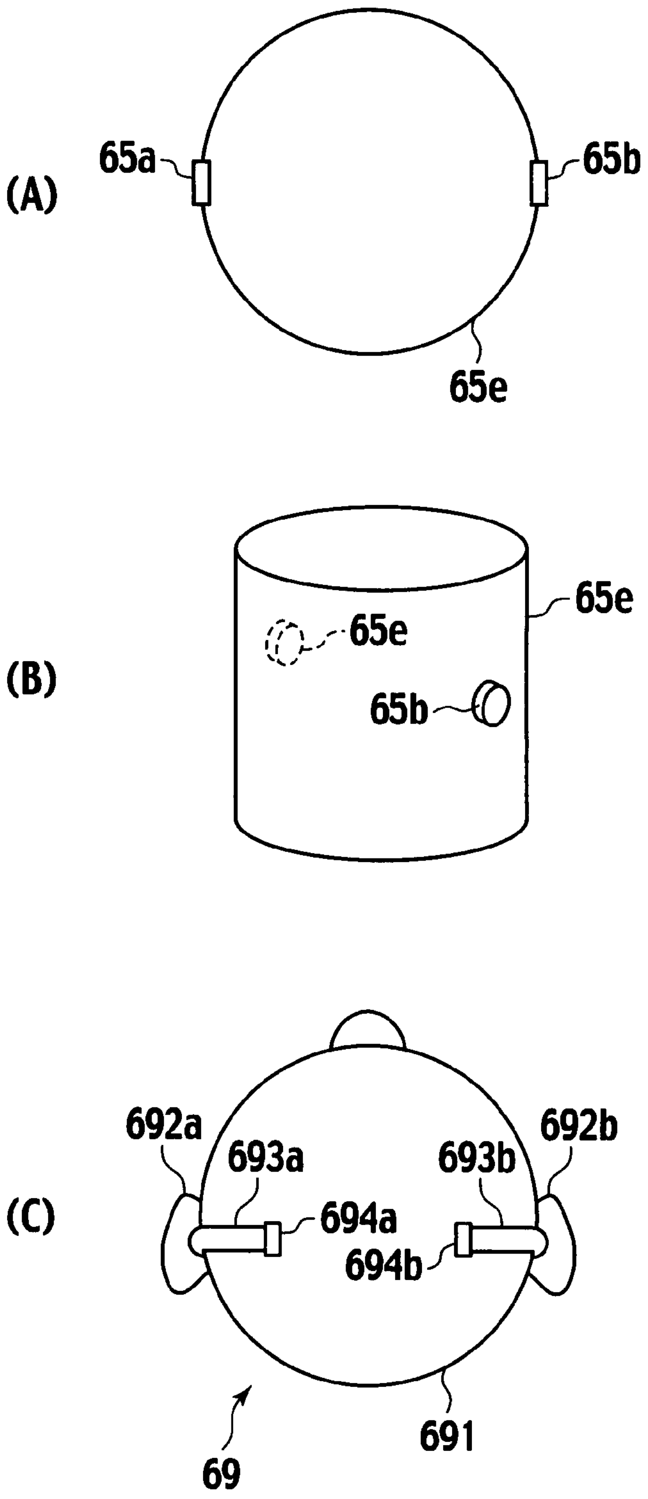
FIG. 16 is a view showing a cylindrical structure with a microphone unit used by the head transfer function measuring apparatus shown in FIG. 15 and a dummy head microphone for comparison.
Figure 17:
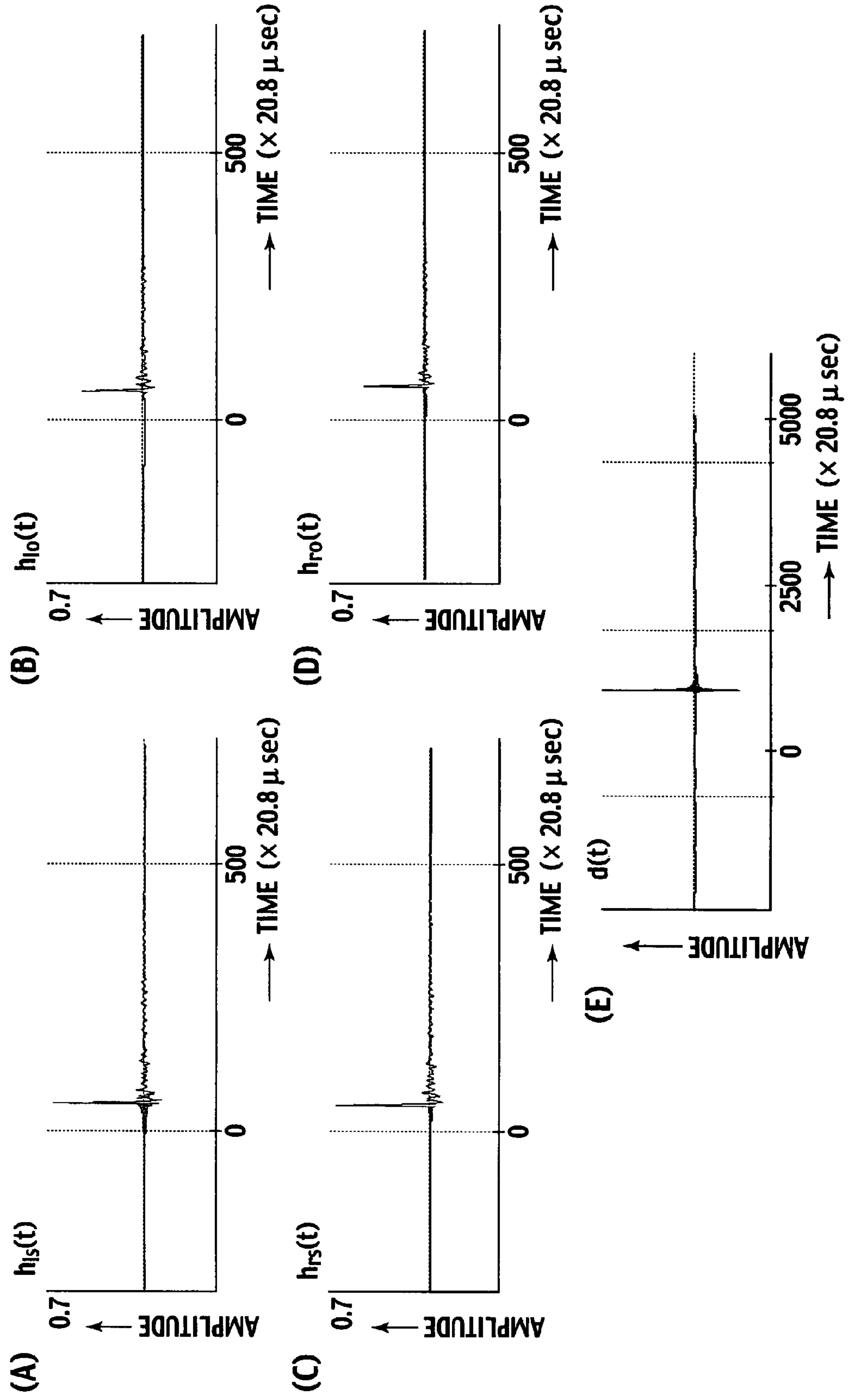
FIG. 17 is a view showing impulse response waveforms measured with the head transfer function measuring apparatus shown in FIG. 15.
Figure 18:
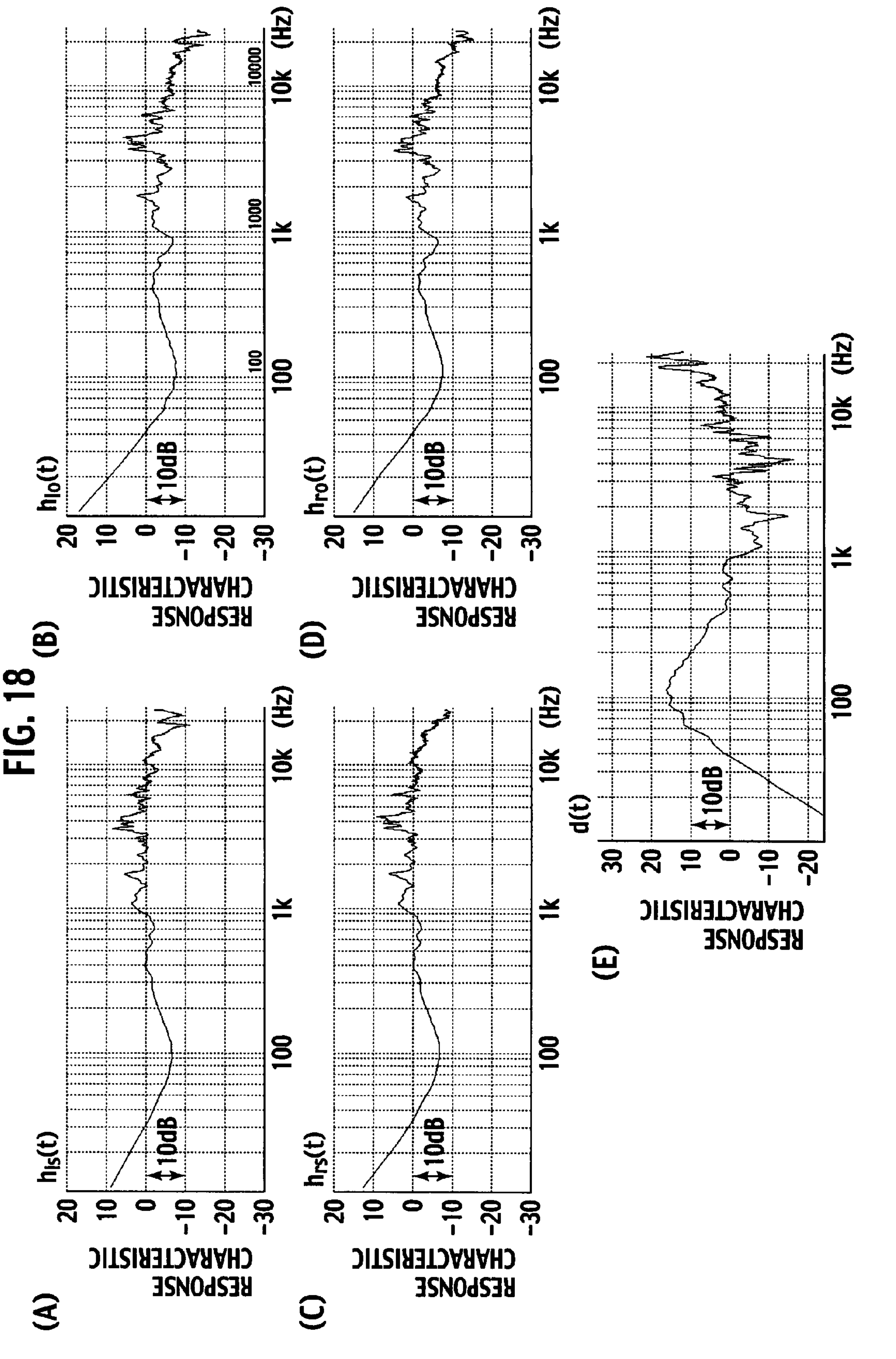
FIG. 18 is a view showing frequency characteristics measured with the head transfer function measuring apparatus shown in FIG. 15.

With reference to FIG. 16, the cylindrical structure 65*e* will be explained. In FIG. 16, (A) is a top view showing the cylindrical structure 65*e*, (B) is a perspective view showing the cylindrical structure 65*e*, and (C) is a sectional view showing a so-called dummy head microphone for comparison.

As shown in FIGS. 16(A) and (B), the microphone units 65*a* and 65*b* are spaced from each other by 180° on the surface of the cylindrical structure 65*e*. As shown in the drawings, the microphone units 65*a* and 65*b* have no auricles nor external auditory canals. Diaphragms (not shown) of the microphone units 65*a* and 65*b* are arranged at locations substantially aligning with the surface of the cylindrical structure 65*e*. On the other hand, the dummy head microphone 69 shown in FIG. 16(C) has auricle members 692*a* and 692*b* and auditory canals 693*a* and 693*b* on each side of an artificial head 691. The microphone units 694*a* and 694*b* are arranged at locations corresponding to the locations of human eardrums, to collect audio signals like the human ears.

The sound receiving characteristics of the microphone units 65*a* and 65*b* attached to the cylindrical structure 65*e* shown in FIGS. 16(A) and (B) are irrelevant to characteristic differences intrinsic to the human auricles and external auditory canals that differ from person to person in size and shape. Accordingly, the microphone units 65*a* and 65*b* are usable to measure head transfer functions. Sound waves emitted from the speakers 63 and 64 are blocked by the cylindrical structure 65*e* and are diffracted along the cylindrical structure 65*e*, to reach the microphone units 65*a* and 65*b*. The microphone units 65*a* and 65*b* measure characteristics that are formed with sound waves directly arriving from the speakers 63 and 64 and sound waves diffracted along the cylindrical structure 65*e*. With the cylindrical structure 65*e*, it is possible to obtain a head transfer function having an average head blocking characteristic. Accordingly, viewers having different head sizes and shapes, i.e., different head blocking characteristics can hear realistic sounds from binaural audio signals without an odd feeling.

FIGS. 17(A) to (D) show impulse response waveforms formed by convoluting head transfer functions $h_{ls}(t)$, $h_{lo}(t)$, $h_{rs}(t)$, and $h_{ro}(t)$ of the cylindrical structure 65*e* measured with the audio signal transfer characteristic measuring apparatus 6 into the impulse sound generated by the audio signal transfer characteristic measuring apparatus 6. FIG. 17(E) shows the filter characteristic d(t) shown in the expression (1). In FIGS. 17(A) to (E), an ordinate indicates the amplitude of a signal voltage normalized with a predetermined output voltage, and an abscissa indicates time expressed with the number of samples when sampling the measurement signal at 48 kHz.

FIGS. 18(A) to (E) show frequency characteristics obtained by Fourier-analyzing the signals shown in FIGS. 17(A) to (E). In FIGS. 18(A) to (E), frequency positions of 100 Hz, 1 kHz, and 10 kHz are indicated with dotted vertical lines. An ordinate indicates a response characteristic with a couple of horizontal dotted lines representing a gain difference of 10 dB.

The filters 272*a* to 272*d* of FIG. 14 are provided with filter characteristics based on the head transfer functions $h_{rs}(t)$, $h_{lo}(t)$, $h_{ro}(t)$, and $h_{ls}(t)$ obtained as mentioned above. As explained above, the filters 272*a* and 272*d* are provided with the filter characteristics corresponding to the head transfer functions $h_{rs}(t)$ and $h_{ls}(t)$, and the filters 272*b* and 272*c* are provided with the filter characteristics corresponding to $-h_{lo}(t)$ and $-h_{ro}(t)$ that are polarity inversions of the head transfer functions $h_{lo}(t)$ and $h_{ro}(t)$.

Figure 19:
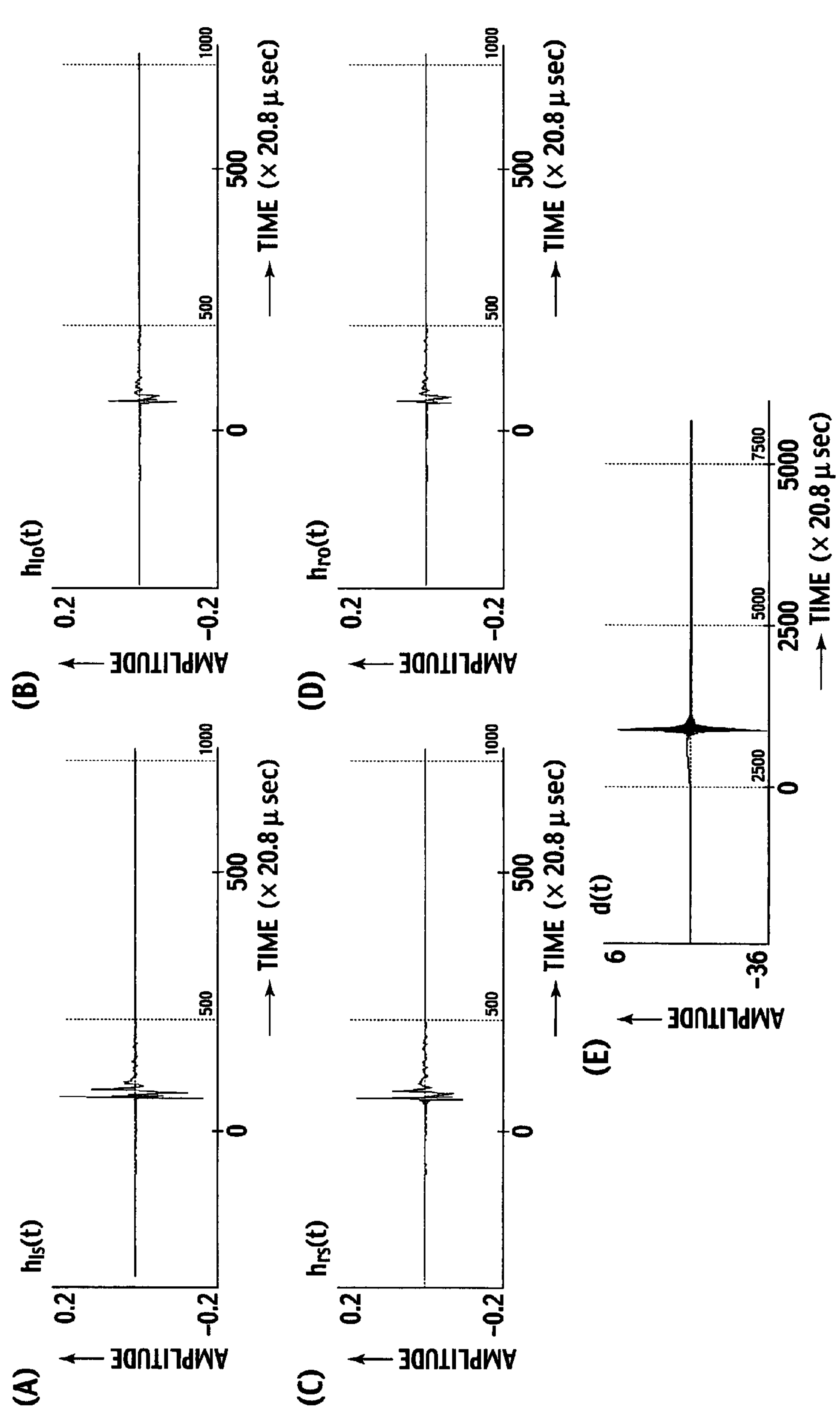
FIG. 19 is a view showing impulse response waveforms measured with the dummy head microphone.
Figure 20:
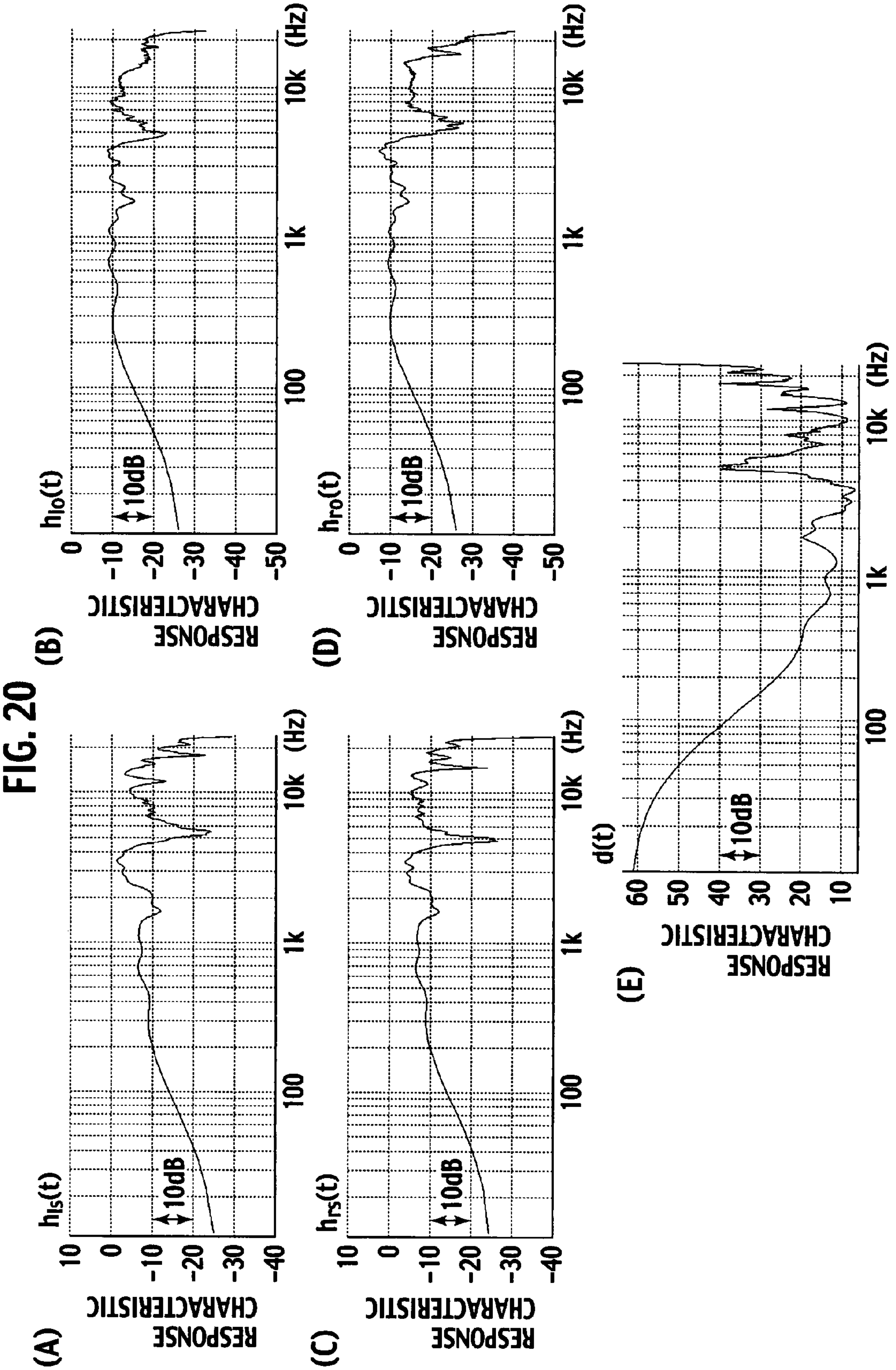
FIG. 20 is a view showing frequency characteristics measured with the dummy head microphone.

For comparison, FIGS. 19 and 20 show characteristics measured with the dummy head microphone 69 shown in FIG. 16(C) instead of the microphone units 65*a* and 65*b* attached to the cylindrical structure 65*e*. The characteristics shown in FIG. 19 are obtained through measurements similar to those of FIG. 17. As is apparent from comparison between FIGS. 17 and 19, the impulse response waveforms measured with the microphone units 65*a* and 65*b* attached to the cylindrical structure 65*e* are more similar to the input impulse measurement signal than the impulse response waveforms measured with the dummy head microphone 69.

FIG. 20 shows frequency response characteristics measured with the dummy head microphone 69. As is apparent from comparison between FIGS. 18 and 20, the characteristics obtained with the microphone units 65*a* and 65*b* attached to the cylindrical structure 65*e* are smaller in frequency characteristic irregularity and are more flat. The response characteristics shown in FIGS. 20(A) to (E) involve augmentation and attenuation from 1.5 to 7 kHz. The response characteristics shown in FIGS. 18(A) to (E) are smaller in augmentation and attenuation. This is because the microphone units 65*a* and 65*b* attached to the cylindrical structure 65*e* involve no characteristic disturbance due to the auricles and external auditory canals. According to the dummy head microphone 69, part of sound waves emitted from the speakers 63 and 64 is reflected by the auricles, and the reflected sound waves are combined with directly arriving sound waves in the same phase to augment, or in the opposite phases to attenuate. Due to the influence of resonance or antiresonance in the external auditory canals, sound waves augment or attenuate at specific frequencies. The microphone units 65*a* and 65*b* attached to the cylindrical structure 65*e* can suppress the adverse effect of the dummy head microphone 69.

The filters 272*a* to 272*d* and filters 275*a* and 275*b* of the crosstalk canceler 27 are provided with filter characteristics (first condition) based on the head transfer functions measured with the microphone units 65*a* and 65*b* attached to the cylindrical structure 65*e*, as well as filter characteristics (second condition) based on the head transfer functions measured with the dummy head microphone 69. Then, comparison hearing tests of them are carried out with a plurality of listeners. Thin and small microphones are inserted into the auditory canals of each listener, and sound receiving characteristics are measured on an assumption that sounds received with the small microphones are the sounds heard by the listener.

Figure 21:
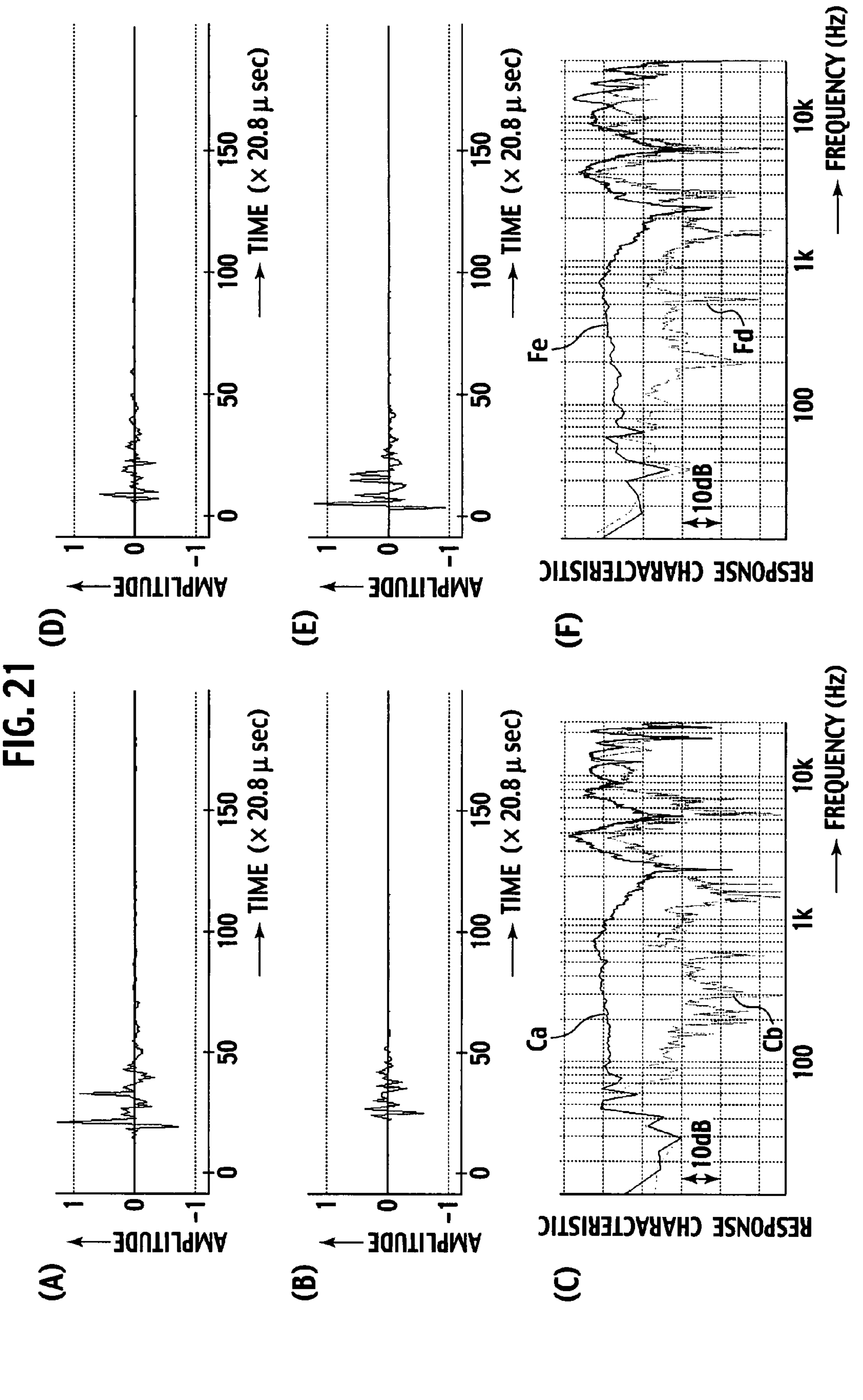
FIG. 21 is a view explaining a crosstalk canceling characteristic achieved with a filter characteristic based on a head transfer function measured with the cylindrical structure provided with a microphone unit.

FIG. 21 shows characteristics measured with a given listener under the first condition. In FIG. 21, (A) shows an impulse response signal waveform received by the small microphone in the left ear of the listener when the speakers 53 and 54 are voiced with a left input signal $P_L(t)$ that is an impulse signal and a right input signal $P_R(t)$ that is a silent signal. (B) shows a crosstalk component waveform received by the small microphone in the right ear of the listener under the same conditions as (A). The impulse response waveform of FIG. 21(A) contains large levels and the waveform of FIG. 21(B) small levels. FIG. 21(C) shows a result of a frequency analysis made on the response waveforms, in which Ca is a response characteristic based on the frequency analysis of the response waveform of (A) and Cb is a response characteristic based on the frequency analysis of the response waveform of (B). From 100 Hz to 2 kHz, a crosstalk canceling effect of 20 dB or over is observable.

Further in FIG. 21, (D) shows a crosstalk component waveform received by the small microphone in the left ear of the listener when the speakers 53 and 54 are voiced with a left input signal $P_L(t)$ that is a silent signal and a right input signal $P_R(t)$ that is an impulse signal. (E) shows an impulse response waveform received by the small microphone in the right ear of the listener under the same conditions as (D). The waveform of FIG. 21(D) contains small levels and the impulse response waveform of FIG. 21(E) large levels. FIG. 21(F) shows a result of a frequency analysis made on the response waveforms, in which Fd is a response characteristic based on the frequency analysis of the response waveform of (D) and Fe is a response characteristic based on the frequency analysis of the response waveform of (E). From 100 Hz to 2 kHz, a crosstalk canceling effect of about 16 dB is observable.

Figure 22:
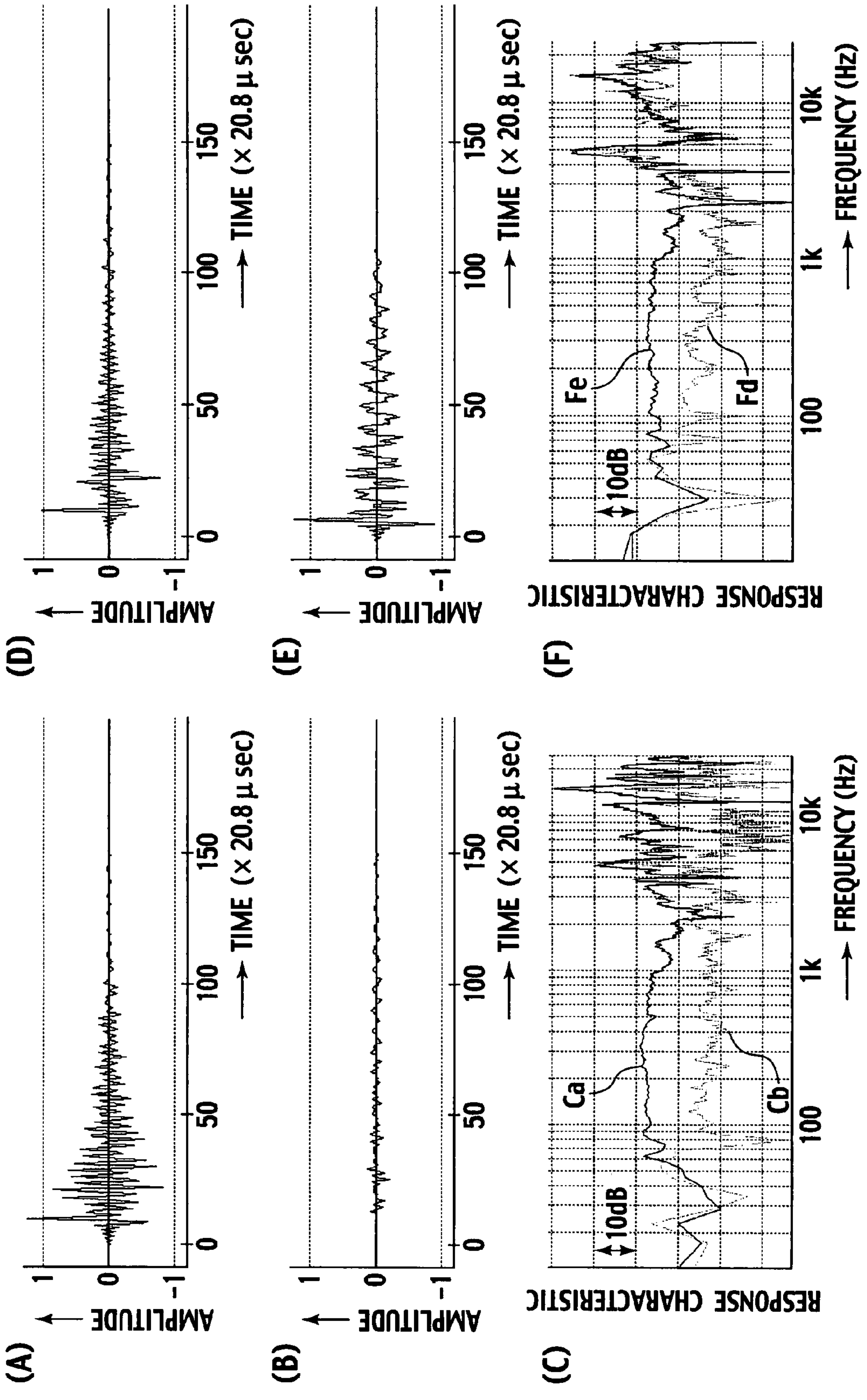
FIG. 22 is a view explaining a crosstalk canceling characteristic achieved with a filter characteristic based on a head transfer function measured with the dummy head microphone.

FIG. 22 shows characteristics measured with the same listener as that of FIG. 21 under the second condition. The measurement conditions are the same as those of FIG. 21. A crosstalk canceling effect of FIG. 22(C) is about 14 dB, and a crosstalk canceling effect of FIG. 22(F) is about 11 dB. It is understood that the effect under the second condition is inferior to that under the first condition.

Figure 23:
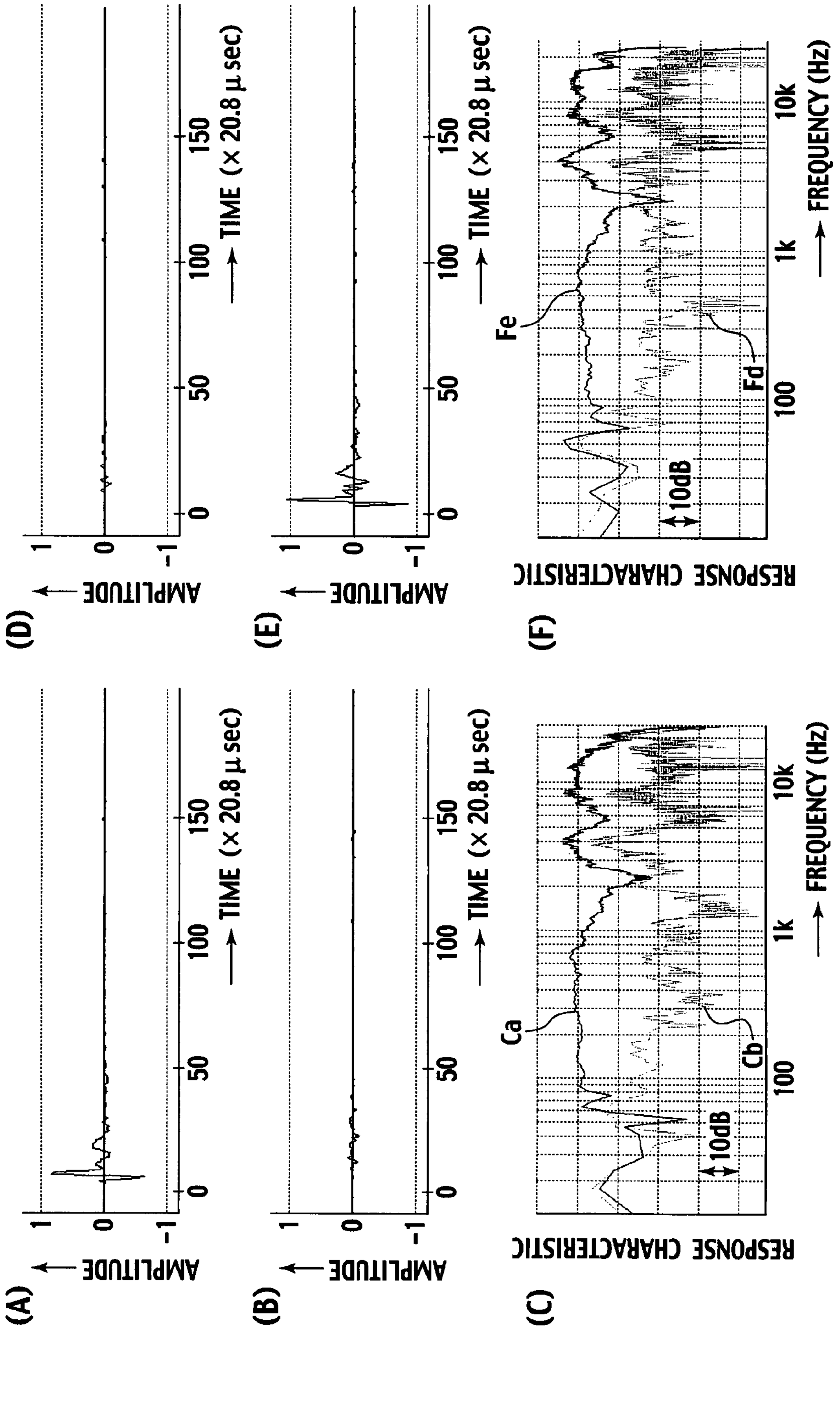
FIG. 23 is a view explaining a crosstalk canceling characteristic achieved with a filter characteristic based on a head transfer function measured with the cylindrical structure provided with a microphone unit.

FIG. 23 shows characteristics measured with a listener different from that of FIGS. 21 and 22 under the first condition and the same measuring conditions as those of FIG. 21. A crosstalk canceling effect of FIG. 23(C) is about 22 dB, and a crosstalk canceling effect of FIG. 23(F) is about 18 dB. Good effect is observed even with the different listener.

Figure 24:
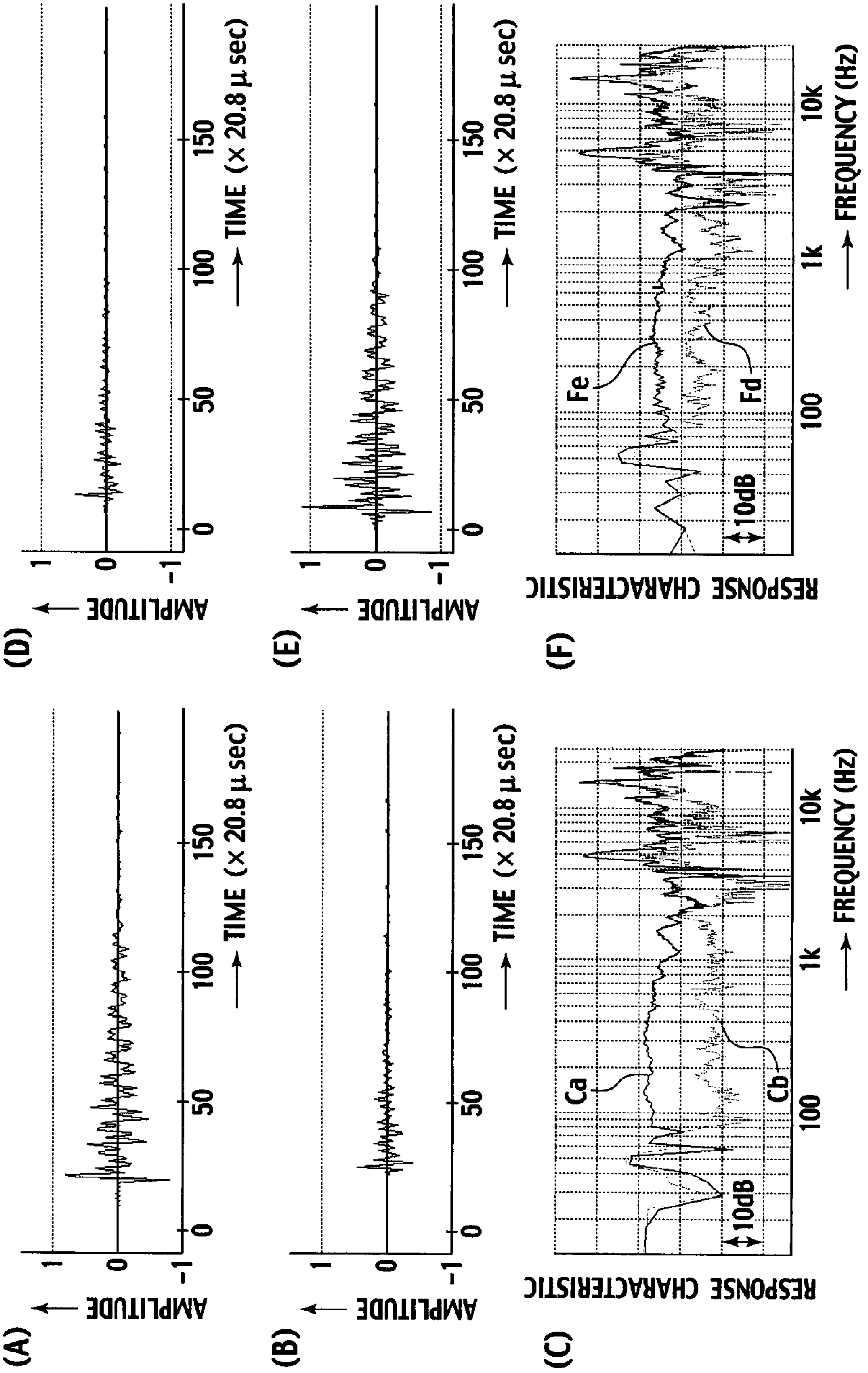
FIG. 24 is a view explaining a crosstalk canceling characteristic achieved with a filter characteristic based on a head transfer function measured with the dummy head microphone.

FIG. 24 shows characteristics measured with the same listener as that of FIG. 23 under the second condition and the same measuring conditions as those of FIG. 22. A crosstalk canceling effect of FIG. 24(C) is about 14 dB, and a crosstalk canceling effect of FIG. 24(F) is about 10 dB. Even with the different listener, the effect of the second condition is inferior to that of the first condition. Similar measurements have been done on different listeners and it has been confirmed that the first and second conditions have provided the above-mentioned effects.

The above-mentioned measurement results clarify the effect of the filter characteristics given to the filters 272*a* to 272*d* and filters 275*a* and 275*b* of the crosstalk canceler 27. Namely, the filter characteristics based on the head transfer functions measured with the microphone units 65*a* and 65*b* attached to the cylindrical structure 65*e* are superior to the filter characteristics based on the head transfer functions measured with the dummy head microphone 69 in canceling a crosstalk component emitted from the left speaker and received by the right ear and a cross talk component emitted from the right speaker and received by the left ear.

The filter characteristics based on the head transfer functions measured with the microphone units 65*a* and 65*b* attached to the cylindrical structure 65*e* involve smaller irregularities in high-frequency characteristics. Namely, using the cylindrical structure 65*e* can suppress large decreases or increases in a specific frequency characteristic, to minimize a sound quality deterioration. As a result, a listener can hear lifelike sounds substantially without an unnatural feeling.

If the filter characteristics given to the filters 272*a* to 272*d* and filters 275*a* and 275*b* of the crosstalk canceler 27 are the filter characteristics based on the head transfer functions measured with the microphone units 65*a* and 65*b* attached to the cylindrical structure 65*e*, crosstalk canceling is carried out in the vicinity of the entrance of each external auditory canal of the listener 69 that is a structure to receive a binaural audio signal. Accordingly, the crosstalk component canceling effectively takes place with respect to a plurality of listeners 69 having different acoustic characteristics at the auricles and external auditory canals thereof.

The cylindrical structure 65*e* may not be a perfect cylinder. It may have a slightly deformed cylindrical shape. It is preferable that the shape has no irregularities that may cause response characteristic changes such as those caused by the auricles and external auditory canals. It is preferable to minimize unevenness in response characteristics when the cylindrical structure 65*e* is provided with the microphone units 65*a* and 65*b*.

The crosstalk canceler 27 is not limited to the configuration shown in FIG. 14. It may be a band-division-type crosstalk canceler that can further reduce a reversed-phase feeling caused in a low band. The band-division-type crosstalk canceler divides a binaural audio signal provided as a full-band signal into a low-band signal and a middle-high-band signal and carries out a crosstalk canceling process only on the middle-high-band binaural audio signal.

Figure 25:
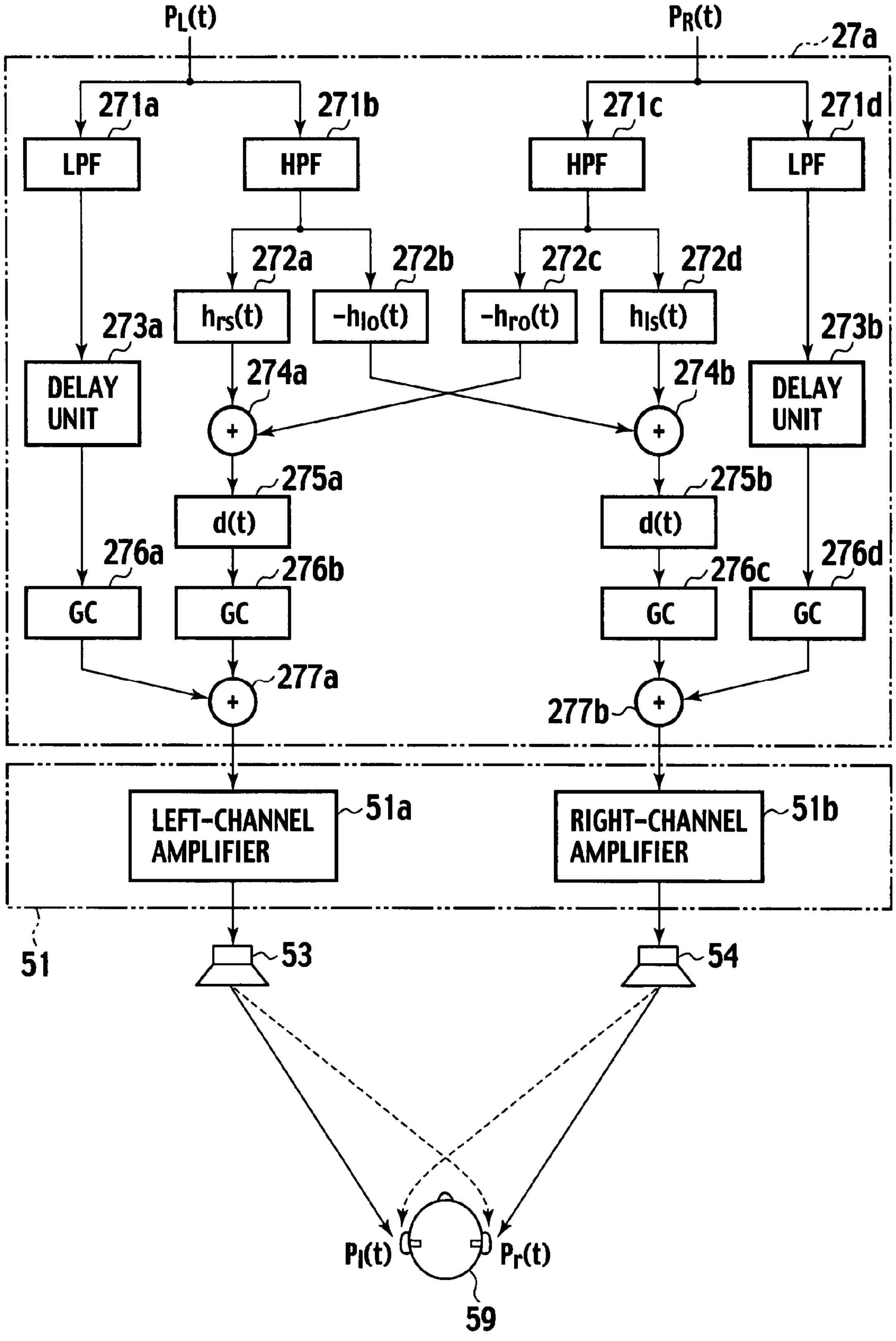
FIG. 25 is a block diagram showing another configuration example of a crosstalk canceler used with a video-audio recording and reproducing apparatus according to each embodiment of the present invention.

FIG. 25 shows a band-division-type crosstalk canceller 27*a*. The structure and operation thereof will be explained. Components having the same functions as those of the crosstalk canceler 27 shown in FIG. 14 are represented with the same marks and the explanations thereof are omitted.

As shown in FIG. 25, the crosstalk canceler 27*a* differs from the crosstalk canceler 27 of FIG. 14 in that it additionally has low-pass filters (LPFs) 271*a* and 271*d*, high-pass filters (HPFs) 271*b* and 271*c*, delay units 273*a* and 273*b*, gain control amplifiers (GCs) 276*a* to 276*d*, and adders 277*a* and 277*b*.

In a binaural audio signal supplied to the crosstalk canceler 27*a*, a left-channel signal $P_L(t)$ is supplied to the LPF 271*a* and HPF 271*b* and a right-channel signal $P_R(t)$ is supplied to the LPF 271*d* and HPF 271*c*. These signals are divided into a low band and a middle-high band. A cut-off frequency of the LPFs 271*a* and 271*d* and HPFs 271*b* and 271*c* is set to about 100 to 200 Hz.

The middle-high-band signals from the HPFs 271*b* and 271*c* are subjected to a crosstalk canceling process in a circuit part consisting of the filters 272*a* to 272*d*, adders 274*a* and 274*b*, and filters 275*a* and 275*b* like the crosstalk canceler 27. The middle-high-band signals after the crosstalk canceling process are supplied to the gain control amplifiers 276*b* and 276*c* to adjust gains.

The low-band signals from the LPFs 271*a* and 271*d* are supplied to the delay units 273*a* and 273*b* and are delayed therein by a time substantially equal to a time necessary for carrying out the crosstalk canceling process on the middle-high-band signals. The low-band signals from the delay units 273*a* and 273*b* are supplied to the gain control amplifiers 276*a* and 276*d* to adjust gains in such a way as to zero a level difference relative to the middle-high-band signals.

The adders 277*a* and 277*b* add the low-band signals and middle-high-band signals from the gain control amplifiers 276*a* to 276*d* to each other. Output signals from the adders 277*a* and 277*b* are crosstalk-processed signals with the crosstalk canceling process carried out only on the middle-high-band signals. The crosstalk-processed signals from the adders 277*a* and 277*b* are amplified by the left-channel amplifier 51*a* and right-channel amplifier 51*b* of the amplifier 51, respectively, and are voiced from the speakers 53 and 54.

According to the structure of FIG. 25, no crosstalk canceling process is carried out on low-band signals, and therefore, reproduced signals have no reversed-phase feeling in a low band.

As explained in FIGS. 21 to 24, the crosstalk canceler 27 shown in FIG. 14 provides an insufficient crosstalk canceling effect under 100 Hz. The low band under 100 Hz is a frequency band that little influences on the position of a sound source. A signal without crosstalk canceling is heard as a reversed-phase signal that provides an odd feeling.

The crosstalk canceler 27*a* shown in FIG. 25 conducts no crosstalk canceling in a low band lower than 100 to 200 Hz, to realize a crosstalk canceler that causes no reversed-phase signal in the low band.

Figure 26:
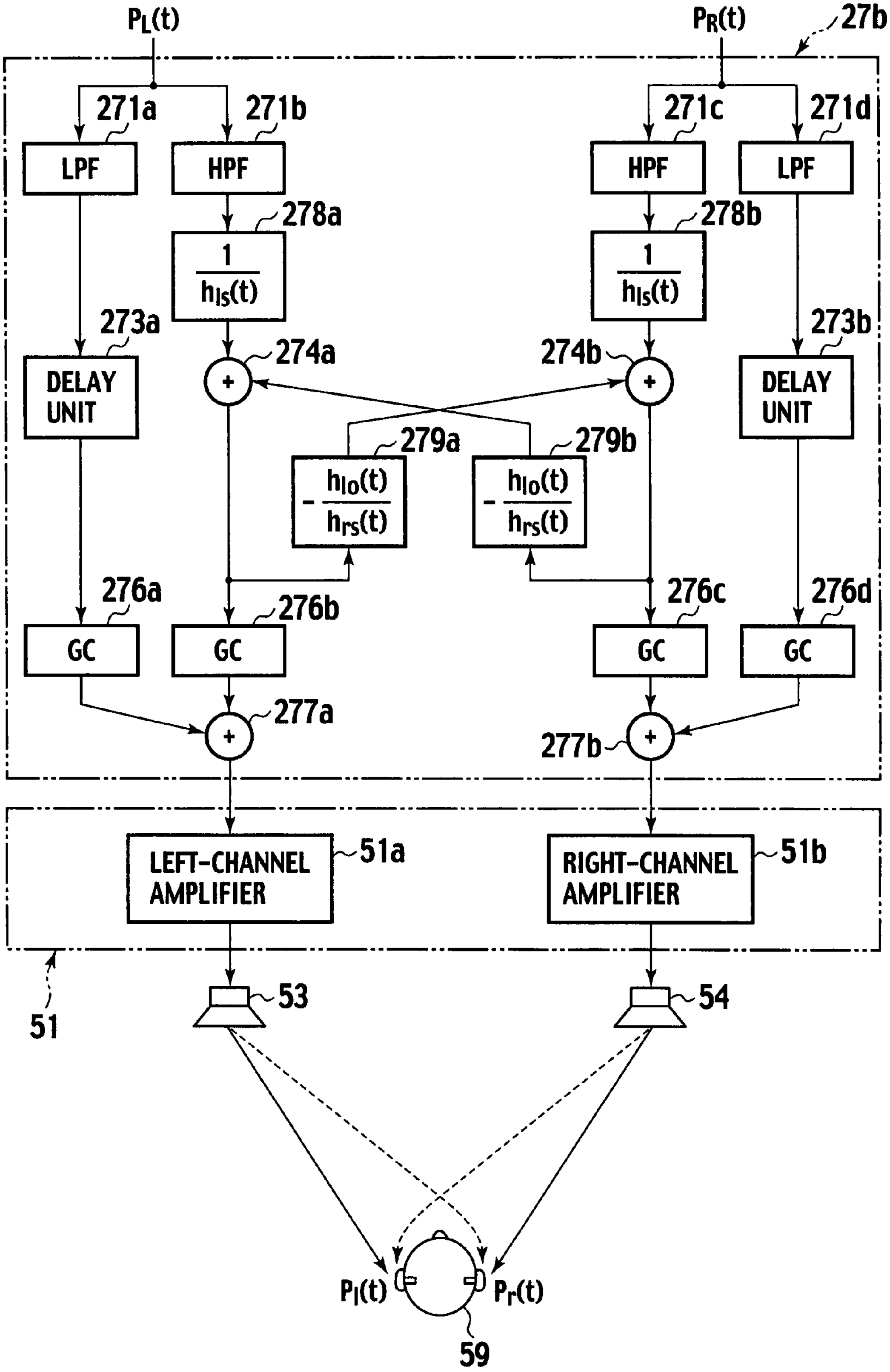
FIG. 26 is a block diagram showing still another configuration example of a crosstalk canceler used with a video-audio recording and reproducing apparatus according to each embodiment of the present invention.

FIG. 26 shows a band-division-type crosstalk canceler 27*b* having a different filter configuration from FIG. 25. The configuration and operation thereof will be explained. Components having the same functions as those of the crosstalk canceler 27*a* shown in FIG. 25 are represented with the same marks and the explanations thereof are omitted.

The crosstalk canceler 27*b* shown in FIG. 26 differs from the crosstalk canceler 27*a* of FIG. 25 in that it has filters 278*a* and 278*b* and filters 279*a* and 279*b* instead of the filters 272*a* to 272*d* and filters 275*a* and 275*b*. In addition, it also differs in a wiring method. The crosstalk canceler 27*a* forms filter characteristics of feed-forward-type FIR (finite impulse response). On the other hand, the crosstalk canceler 27*b* forms filter characteristics of feedback-type FIR.

In FIG. 26, middle-high-band signals from the HPFs 271*b* and 271*c* are subjected to a crosstalk canceling process through the FIR-type filters 278*a*, 278*b*, 279*a*, and 279*b* and adders 274*a* and 274*b*. The filter characteristics obtained by the head transfer function measuring apparatus 6 are stored in storage areas (not shown) in the filters 278*a*, 278*b*, 279*a*, and 279*b*. The filters 278*a*, 278*b*, 279*a*, and 279*b* apply the respective filter characteristics to the input signals and provide output signals. The crosstalk canceler 27*b* provides operation and effect similar to those provided by the crosstalk canceler 27*a* in reducing a strange feeling by preventing the generation of reversed-phase signals in a low band. The crosstalk canceler 27*b* shown in FIG. 26 can reduce the number of filters smaller than the crosstalk canceler 27*a* shown in FIG. 25, to thereby simplify the structure thereof. Instead of the FIR-type filters, IIR (infinite impulse response) type filters may be employed.

In the configuration of FIG. 3, the crosstalk canceler 27 (or 27*a*, 27*b*) is independent of the controller 47. If the controller 47 is a microprocessor provided with a DSP (digital signal processor), the function of the crosstalk canceler 27, 27*a*, or 27*b* may be executed by the controller 47. The crosstalk canceler 27, 27*a*, or 27*b* may be realized not only by hardware but also by software.

<Headphone Reproduction>

In the video-audio recording and reproducing apparatus 101 shown in FIG. 3, an audio signal provided by the audio decoder 26 can be heard through a headphone. When a binaural audio signal is heard with a headphone, the above-mentioned crosstalk components do not occur. When the crosstalk-processed signals from the crosstalk canceler 27 are heard with a headphone, the reversed-phase components of binaural audio signals can be heard by the left and right ears. The reversed-phase components are acoustic signal components that do not occur in nature, and therefore, must be avoided. Accordingly, when binaural audio signals are heard with a headphone, the crosstalk canceling process is not carried out.

For this, as shown in FIG. 3, an audio signal from the audio decoder 26 is supplied to an audio output terminal 37*c* without passing through the crosstalk canceler 27. The audio signal output from the audio output terminal 37*c* is supplied to a headphone 55. The viewer 59 can hear through the speakers 53 and 54 crosstalk-processed signals output from the crosstalk canceler 27 as mentioned above, or can hear through the headphone 55 audio signals not processed with the crosstalk canceler 27.

Figure 27:
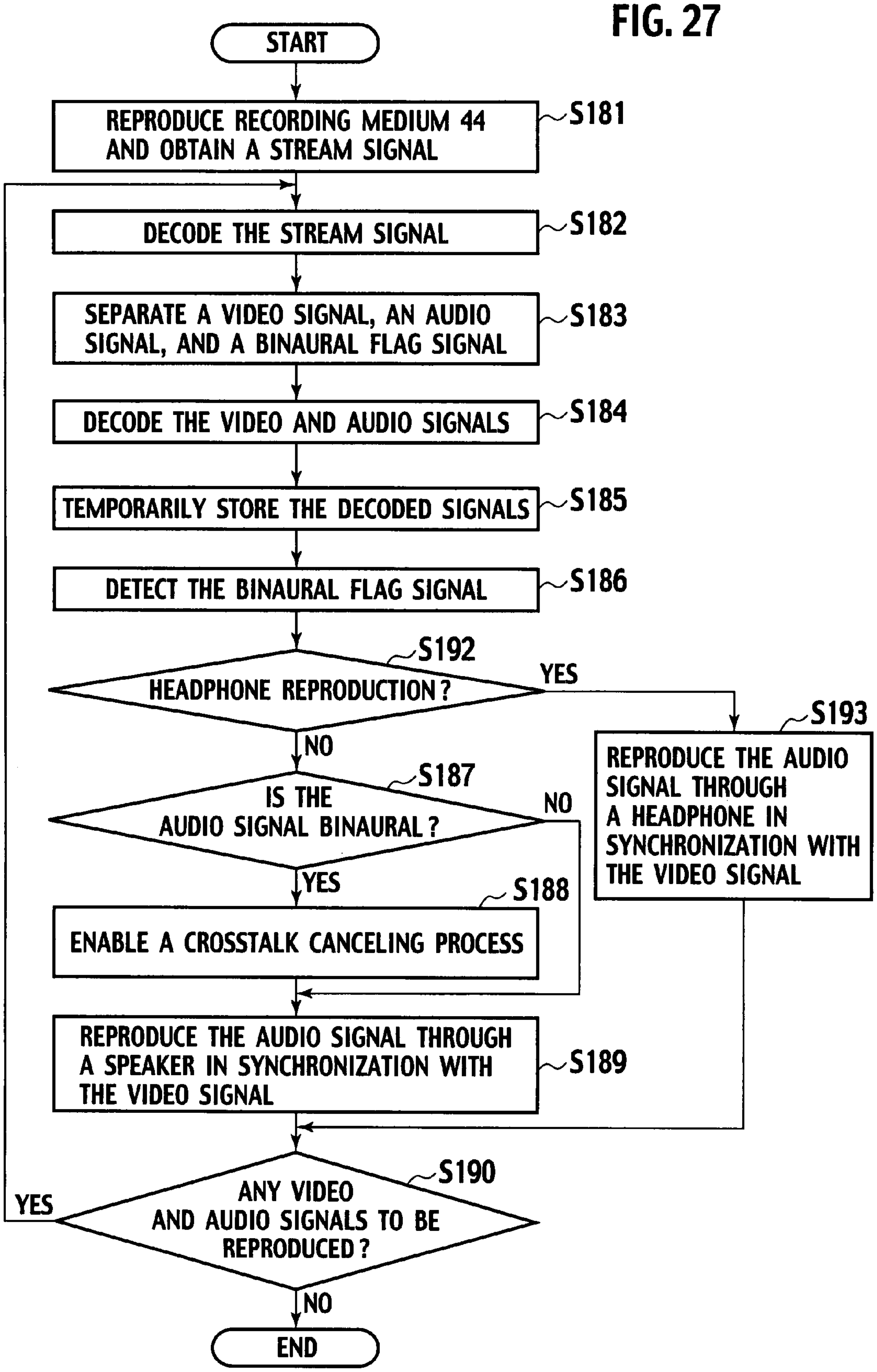
FIG. 27 is a flowchart showing a reproducing operation with a headphone of a video-audio recording and reproducing apparatus according to each embodiment of the present invention.

With reference to FIG. 27, a reproducing procedure of a binaural audio signal through the headphone 55 will be explained. Processes that are the same as those of the flowchart of FIG. 13 are represented with the same marks and the explanations thereof are omitted.

In FIG. 27, steps S181 to S186 are the same as those of FIG. 13. Step S192 determines whether or not reproduction is made through the headphone 55. This may be made by a connection detector (not shown) to detect whether or not a plug is inserted in the audio output terminal 37*c* that is a connection terminal for the headphone 55. If step S192 determines that it is headphone reproduction (YES), step S193 allows the headphone 55 to reproduce, in synchronization with video signals, binaural audio signals that are not crosstalk-processed, and step S190 is carried out. If reproduced audio signals are not binaural audio signals but standard stereo signals, the audio signals from the audio decoder 26 can also be supplied to the headphone 55.

If step S192 determines that it is not headphone reproduction (NO), steps S187 to 190 are carried out like FIG. 13. The process in step S189 is, unlike the reproduction process by the headphone 55 in step S193, to reproduce binaural audio signals through the speakers 53 and 54.

Second Embodiment

The photographer 300 puts the binaural microphone 3 on the left and right ears 302 to collect sounds, photographs an object, and records the sounds and images on the recording medium 44. The viewer 59 can hear the ambient sounds of all directions collected by the photographer 300. A video image photographed with a standard video-audio recording and reproducing apparatus (video camera) is an image of about 60-degree range in front of the camera. In zoom-photographing, the view angle is narrower. When conducting zoom-photographing, it is preferable to enhance sounds from the vicinities of a zoomed-in object. The second embodiment enhances and records sounds from around an object when zooming in on the object.

Figure 28:
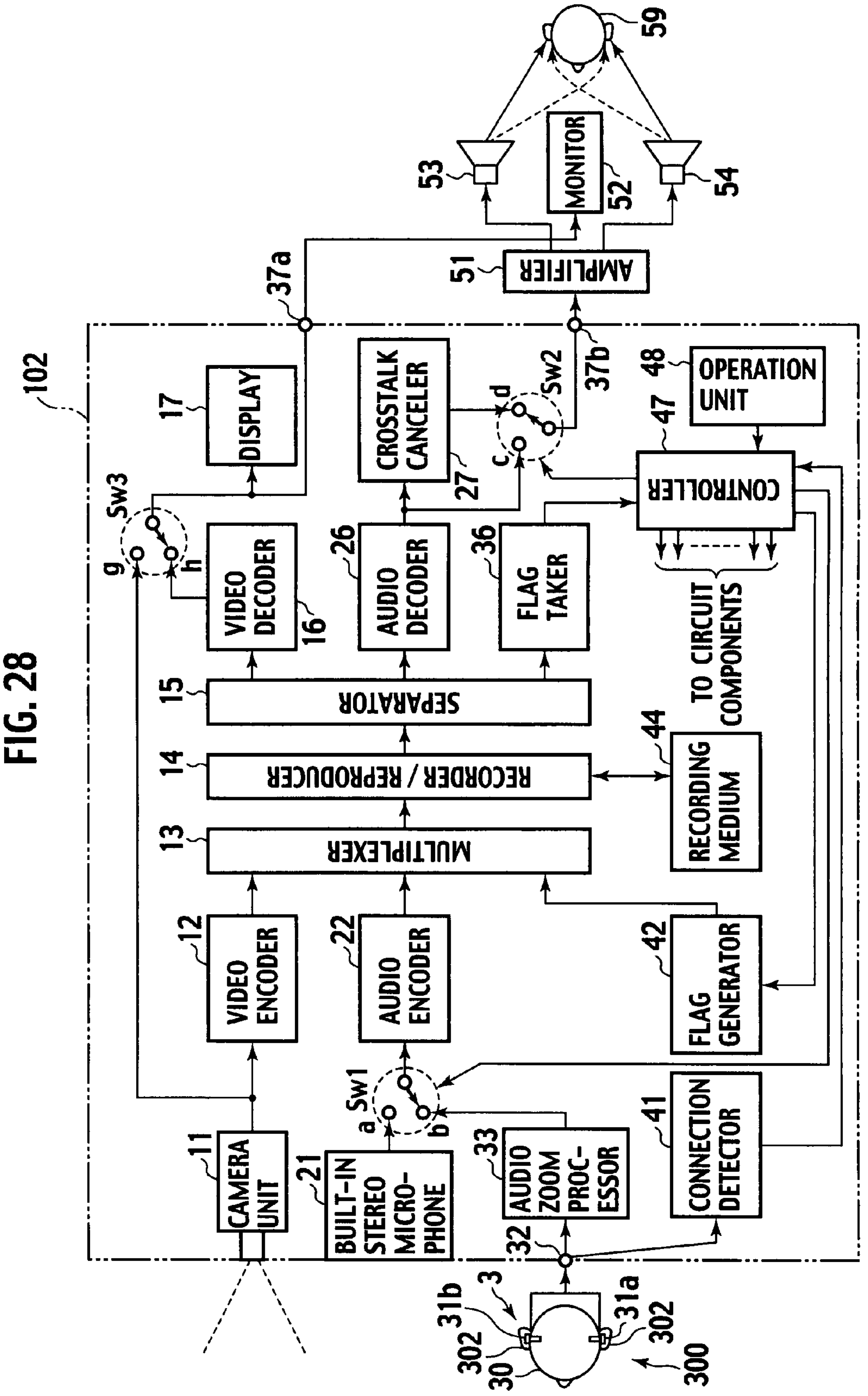
FIG. 28 is a block diagram showing an internal configuration example of a video-audio recording and reproducing apparatus according to a second embodiment of the present invention.

FIG. 28 shows a video-audio recording and reproducing apparatus 102 having an audio zoom processor according to the second embodiment. A configuration and operation of the apparatus will be explained. Components having the same functions as those of the video-audio recording and reproducing apparatus 101 of the first embodiment shown in FIG. 3 are represented with the same marks and the explanations thereof are omitted. The video-audio recording and reproducing apparatus 102 differs from the video-audio recording and reproducing apparatus 101 in that it has the audio zoom processor 33. In FIG. 28, the headphone 55 and the audio output terminal 37*c* serving as a connection terminal for the headphone 55 are omitted.

In FIG. 28, an audio signal input from the binaural microphone 3 through the external microphone connection terminal 32 is supplied to the audio zoom processor 33. The camera unit 11 has a plurality of lenses (not shown), so that one or a plurality of the lenses are moved to change lens-to-lens distances to realize a zoom function of zooming in/out on an object. If the operation unit 48 is manipulated to conduct a zoom-in operation, the controller 47 issues a zoom-in control signal to the camera unit 11, which photographs a zoomed-in image of an object. The zoom-in control signal is also supplied to the audio zoom processor 33, to carry out an audio zoom-up process on an input audio signal.

In response to the zoom-in control signal, the audio zoom processor 33 amplifies, among binaural audio signals, those collected in a median plane of the photographer 300 including those from around the object and generates zoomed-up audio signals. The zoomed-up audio signals are passed through the switch Sw1 to the audio encoder 22. Video signals obtained by zooming in the object are encoded in the video encoder 12, and the zoomed-up audio signals are encoded in the audio encoder 22. The encoded signals are recorded on the recording medium 44 like the first embodiment.

Figure 29:
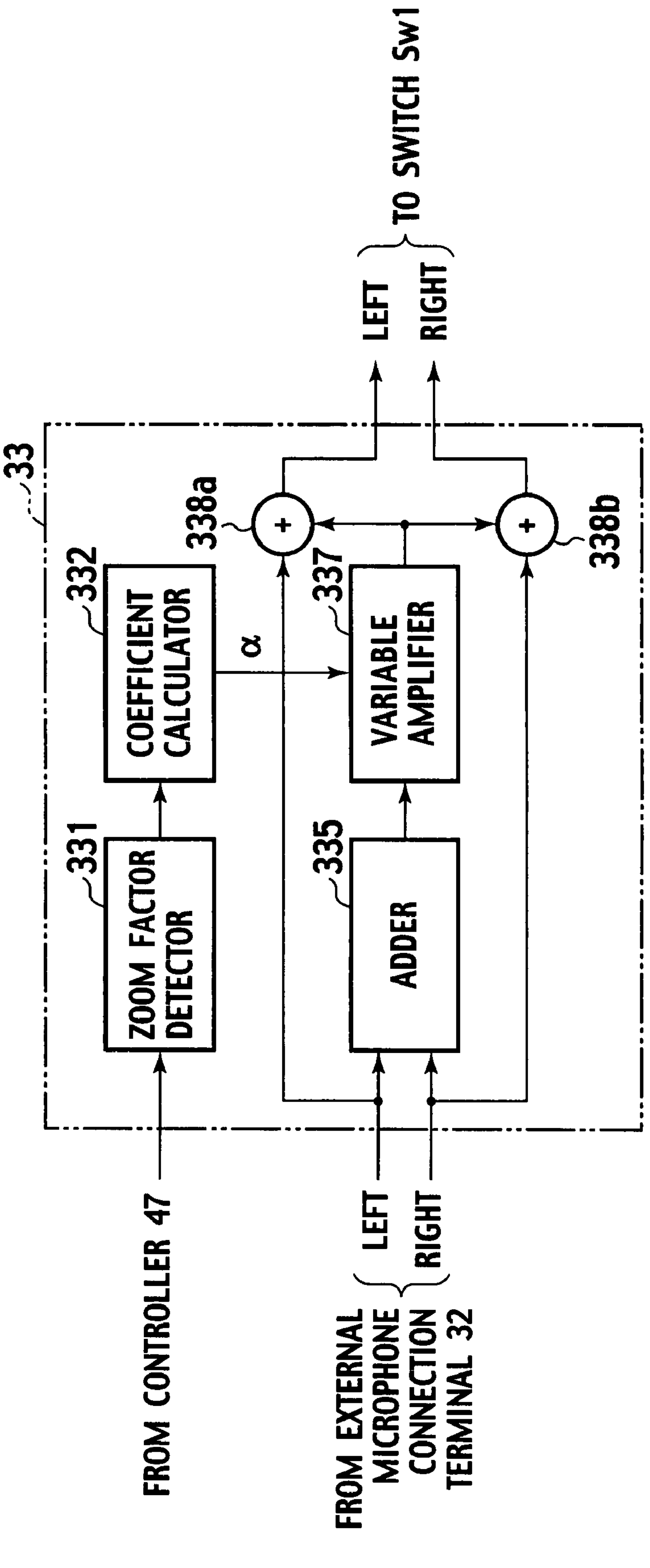
FIG. 29 is a block diagram showing a configuration example of an audio zoom processor in the video-audio recording and reproducing apparatus according to the second embodiment of the present invention.

FIG. 29 shows a concrete configuration example of the audio zoom processor 33. As shown in FIG. 29, the audio zoom processor 33 has a zoom factor detector 331, a coefficient calculator 332, an adder 335, a variable amplifier 337, and adders 338*a* and 338*b*.

In FIG. 29, the zoom factor detector 331 detects a zoom factor based on the zoom-in control signal supplied by the controller 47. The coefficient calculator 332 calculates, according to the detected zoom factor, a coefficient a indicative of an amplification degree applied to sounds emanating from around the object. The adder 335 adds left- and right-channel binaural audio signals from the external microphone connection terminal 32 to each other. The variable amplifier 337 amplifies the output signal of the adder 335 by the coefficient a from the coefficient calculator 332. The adders 338*a* and 338*b* add the left- and right-channel binaural audio signals to the output signal of the variable amplifier 337. When the microphones 31*a* and 31*b* of the binaural microphone 3 are attached to the left and right ears 302 of the photographer 300, the diaphragms in the microphones 31*a* and 31*b* are substantially parallel to each other. Sounds from left and right directions to the photographer 300 may involve reversed-phase components, and therefore, the left and right sounds are partly canceled to attenuate after the adding-up of left and right channels in the adder 335. Consequently, the audio zoom processor 33 provides a zoomed-up audio signal in which sounds collected in the median plane of the photographer 300 are strengthened.

Figure 30:
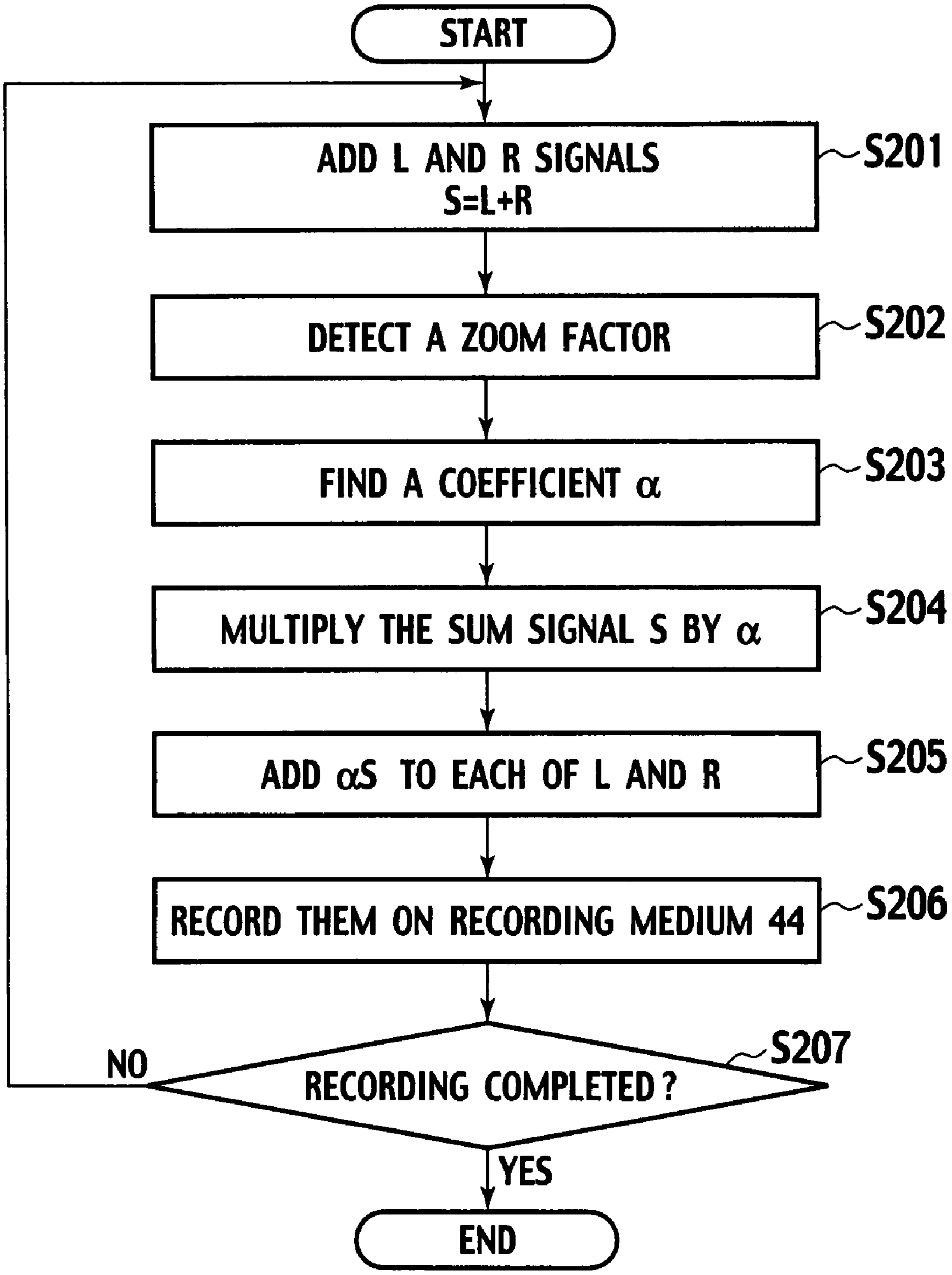
FIG. 30 is a flowchart explaining an audio zoom operation carried out in the video-audio recording and reproducing apparatus according to the second embodiment of the present invention.

With reference to FIG. 30, operation of the video-audio recording and reproducing apparatus 102 including operation of the audio zoom processor 33 will be explained in detail. In step S201 of FIG. 30, the adder 335 adds left and right binaural audio signals from the binaural microphone 3 into a sum signal S. In step S202, the zoom factor detector 331 detects a zoom factor that is obtained by the controller 47 in response to an operation conducted on the operation unit 48. The zoom factor may be found according to a relationship between a voltage applied to a motor for driving the lenses of the camera unit 11 and a time for driving the motor. In step S203, the coefficient calculator 332 calculates a coefficient a indicative of an amplification degree according to the zoom factor. In step S204, the variable amplifier 337 multiplies the output signal of the adder 335 by the coefficient a, to find aS. In step S205, the adders 338*a* and 338*b* add the left- and right-channel binaural audio signals to the output signal (aS) from the variable amplifier 337. In step S206, the zoomed-up audio signals are recorded on the recording medium 44. In step S207, the controller 47 determines whether or not the recording has been completed. If not completed yet (NO), step S201 is repeated. If the recording is completed in step S207 (YES), the process in the audio zoom processor 33 ends.

Figure 31:
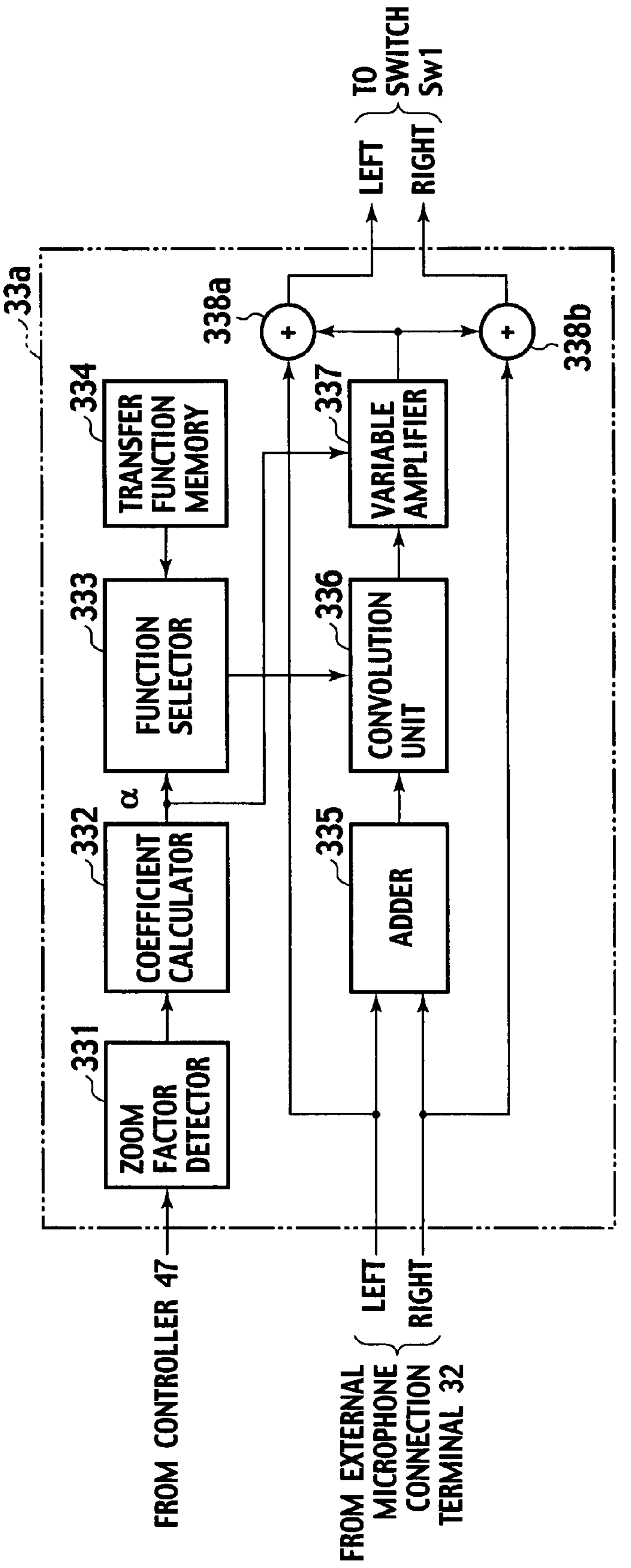
FIG. 31 is a block diagram showing another configuration example of an audio zoom processor in the video-audio recording and reproducing apparatus according to the second embodiment of the present invention.

FIG. 31 shows an audio zoom processor 33*a* as another configuration example of the audio zoom processor 33. When a head transfer function that provides an effect of bringing a sound source closer to a listener is applied to an audio signal from a median plane, the listener feels as if the sound source comes closer to the listener when an object photographed with the camera unit 11 is zoomed in. Namely, the listener can receive more lifelike audio signals. The audio zoom processor 33*a* shown in FIG. 31 is configured to convolute a head transfer function into an audio signal from a median plane, to thereby provide an effect of bringing a sound source closer.

The audio zoom processor 33*a* shown in FIG. 31 differs from the audio zoom processor 33 of FIG. 29 in that it additionally has a function selector 333, a transfer function memory 334, and a convolution unit 336.

In FIG. 31, the transfer function memory 334 stores head transfer functions to form virtual sound sources that are made by virtually positioning a sound source at close positions. The head transfer function is a function to determine the hearing characteristic of a sound emanating from a virtual sound source, the hearing characteristic being determined according to a distance between the virtual sound source and a listener.

The function selector 333 obtains from the transfer function memory 334 a head transfer function corresponding to the position of a sound source that is estimated from a coefficient a calculated by the coefficient calculator 332. The coefficient a in FIG. 29 and the coefficient a in FIG. 31 or in any other drawings are not always the same as one another. However, they are represented with the same mark for the sake of convenience. The convolution unit 336 applies the head transfer function obtained by the function selector 333 to a binaural audio sum signal provided by the adder 335. The variable amplifier 337 amplifies the head-transfer-function-convoluted sum signal by the coefficient a provided by the coefficient calculator 332. The adders 338*a* and 338*b* add the left- and right-channel binaural audio signals to the output signal of the variable amplifier 337. Although this configuration includes the variable amplifier 337, virtually positioning a sound source at a close position is sufficiently effective to omit the variable amplifier 337. The coefficient a used by the function selector 333 to select a head transfer function may differ from the coefficient a serving as an amplification level in the variable amplifier 337.

Figure 32:
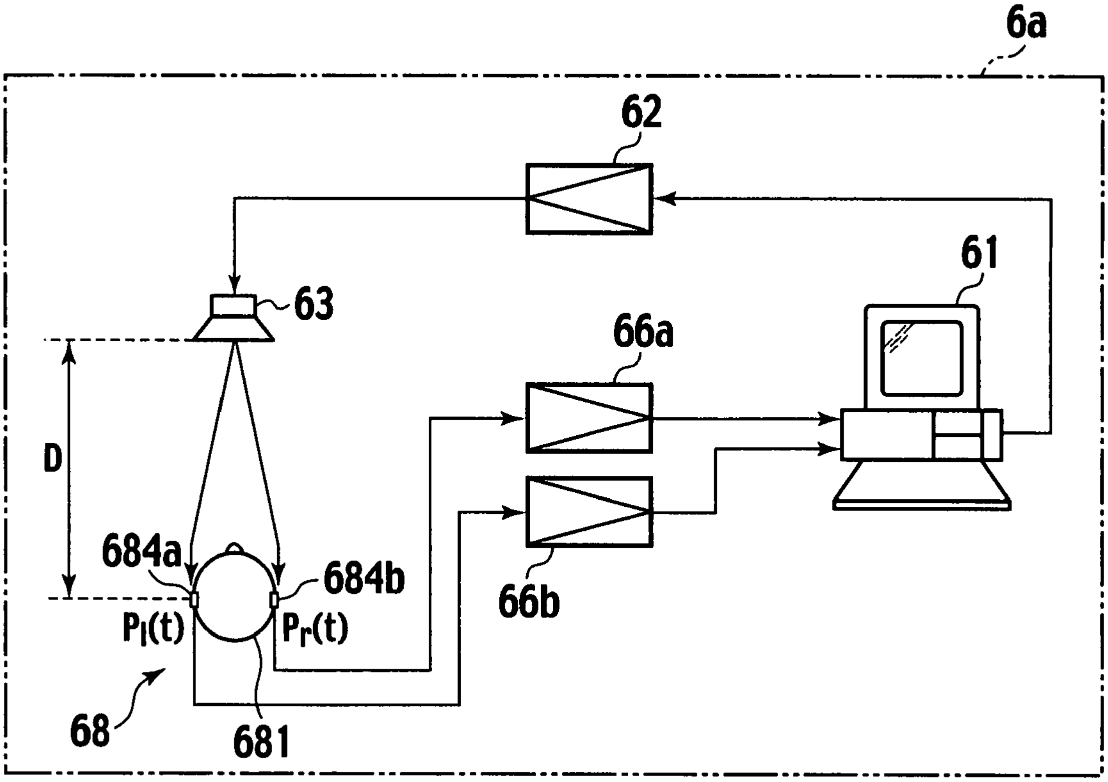
FIG. 32 is a view showing a head transfer function measuring apparatus for finding a head transfer function used by the audio zoom processor of FIG. 31.

With reference to FIG. 32, a method of measuring a head transfer function to form a virtual sound source will be explained.

A head transfer function measuring apparatus 6*a* shown in FIG. 32 includes a personal computer 61, an amplifier 62, a speaker 63, amplifiers 66*a* and 66*b*, and a dummy head microphone 68. The dummy head microphone 68 has an artificial head 681 on which microphone units 684*a* and 684*b* are arranged. The head transfer function measuring apparatus 6*a* differs from the head transfer function measuring apparatus 6 shown in FIG. 15 in that it uses the dummy head microphone 68 instead of the microphone units 65*a* and 65*b* attached to the cylindrical structure 65*e* and arranges in a median plane of the dummy head microphone 68 only one (the speaker 63) of the left and right speakers 63 and 64.

Figure 33:
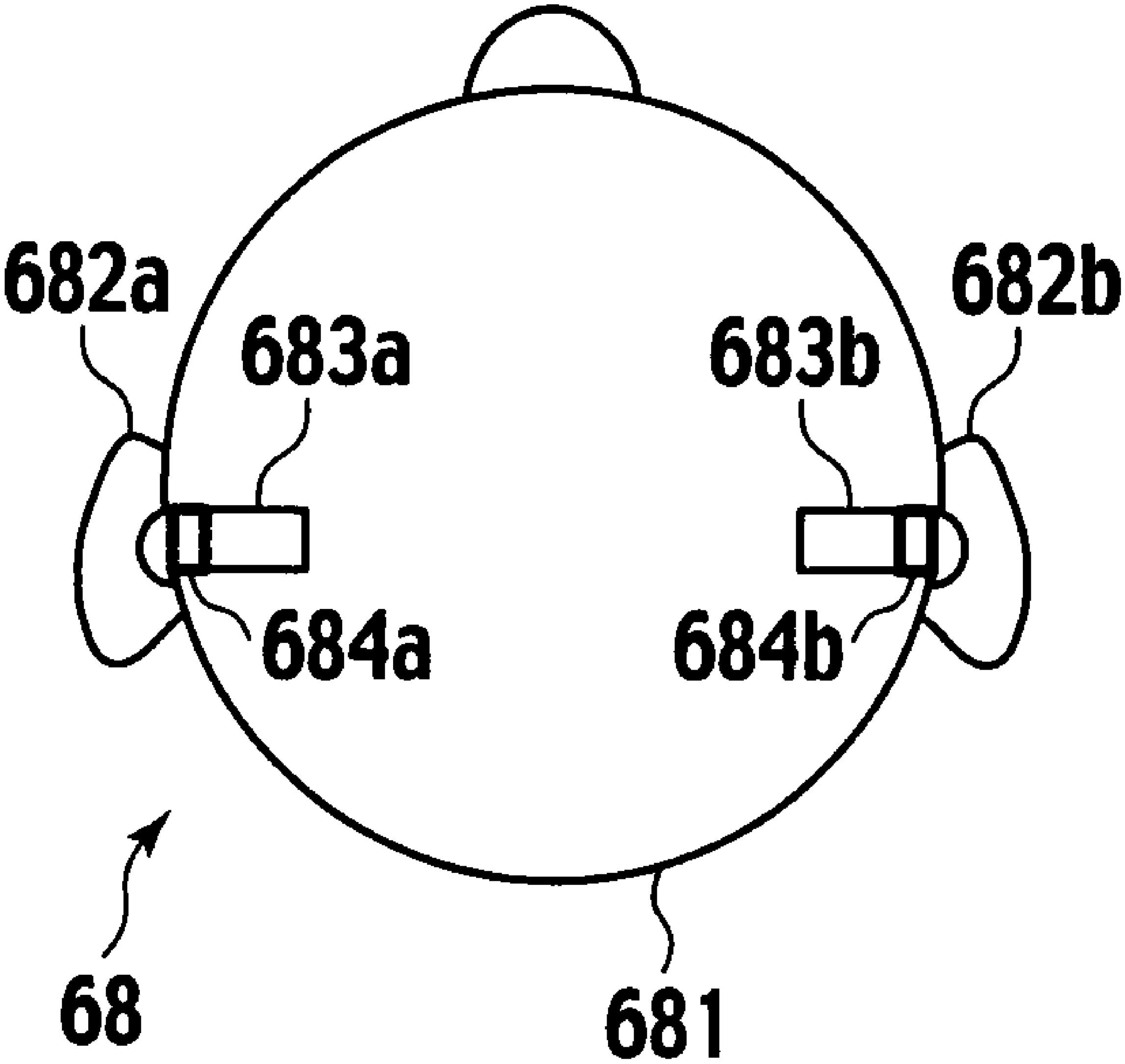
FIG. 33 is a sectional view showing a dummy head microphone used with the head transfer function measuring apparatus of FIG. 32.
Figure 34:
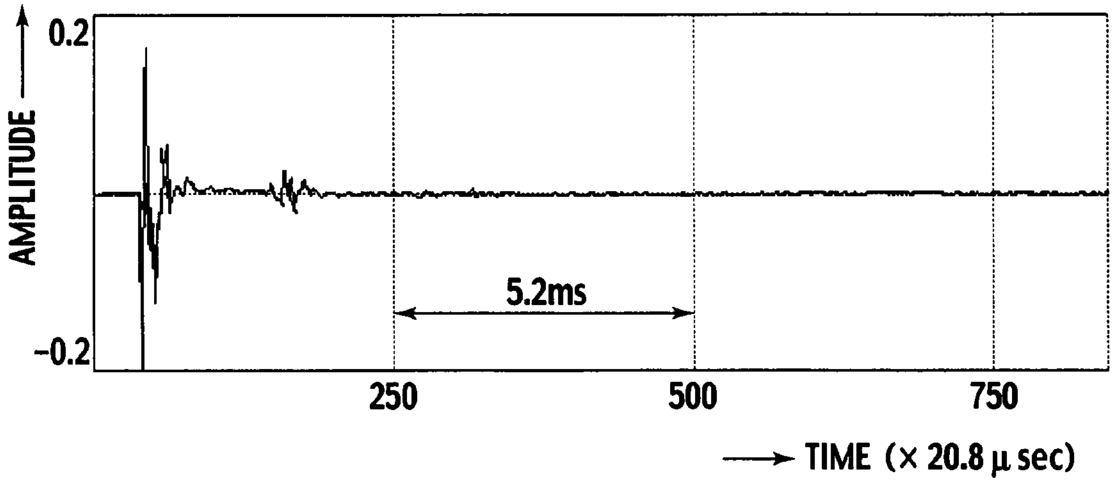
FIG. 34 is a view showing the characteristics of head transfer functions obtained through measurements with the head transfer function measuring apparatus of FIG. 32.
Figure 34:
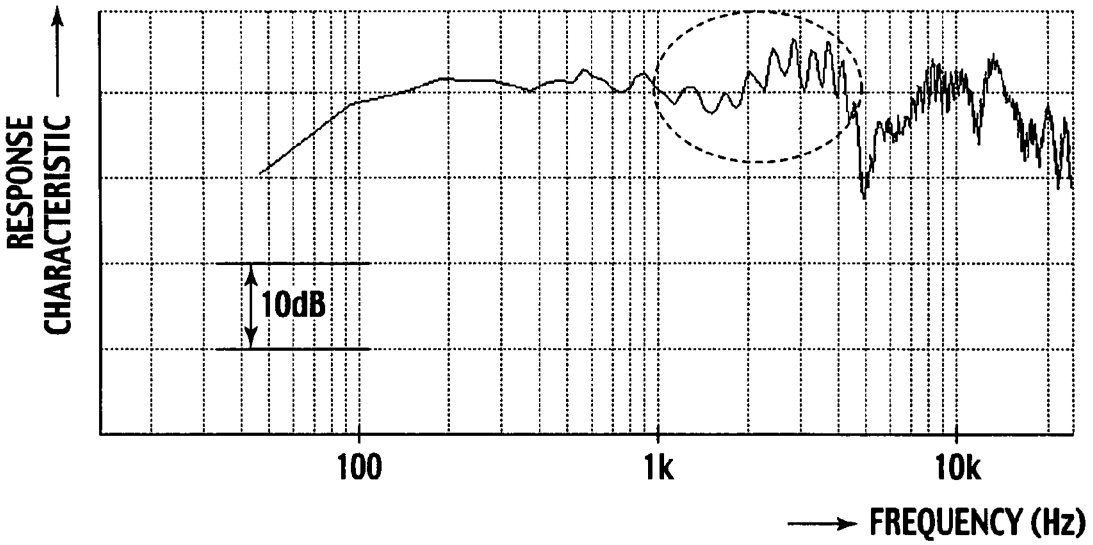
Figure 35:
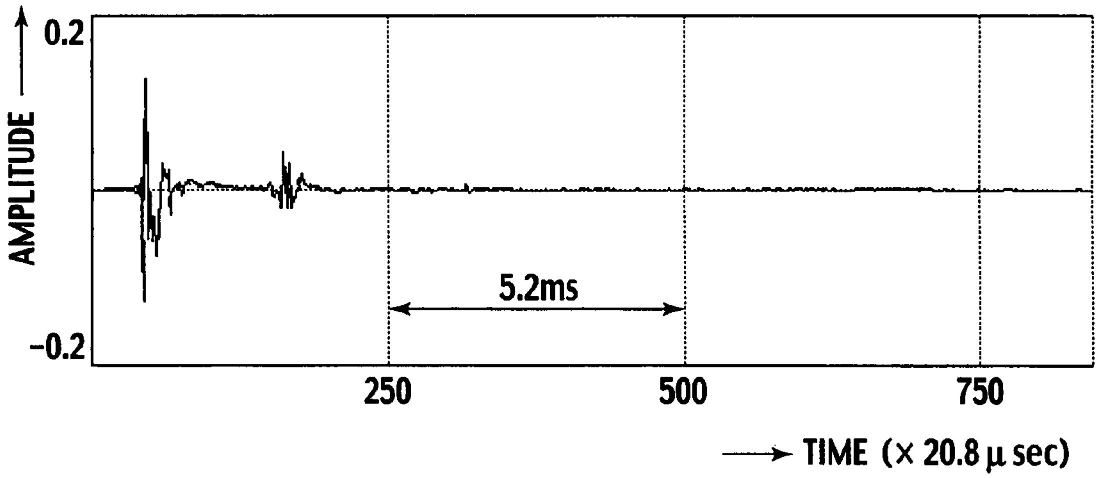
FIG. 35 is a view showing the characteristics of head transfer functions obtained through measurements with the head transfer function measuring apparatus of FIG. 32.
Figure 35:
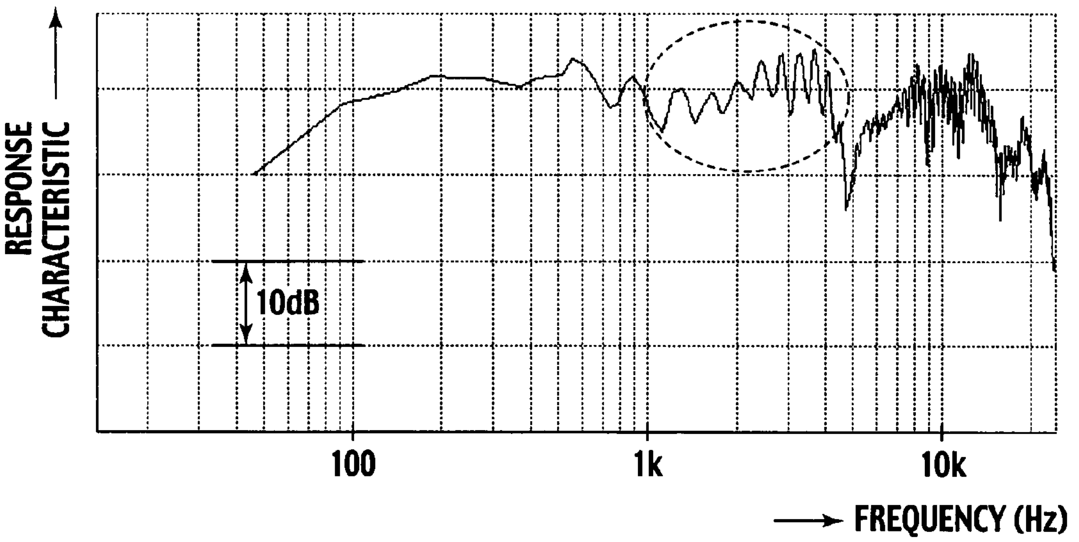
Figure 36:
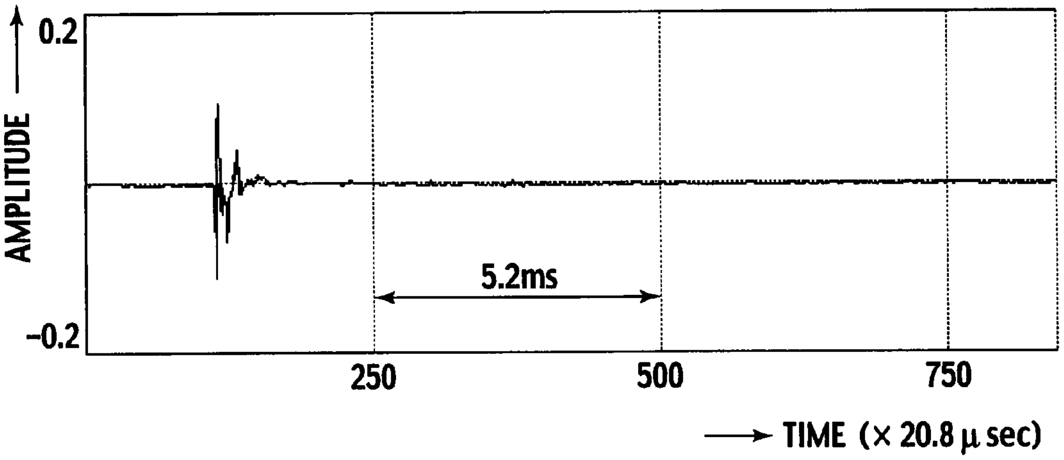
FIG. 36 is a view showing the characteristics of head transfer functions obtained through measurements with the head transfer function measuring apparatus of FIG. 32.
Figure 36:
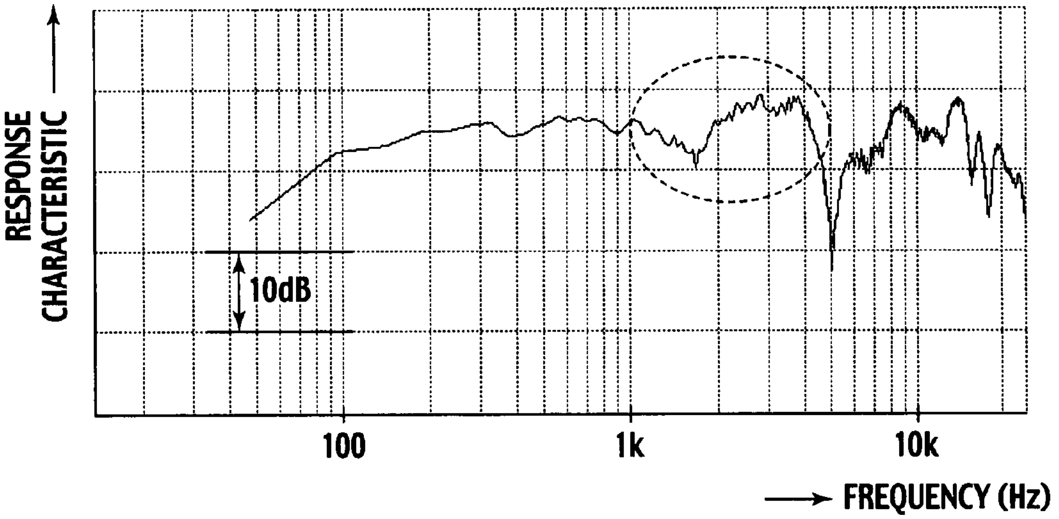
Figure 37:
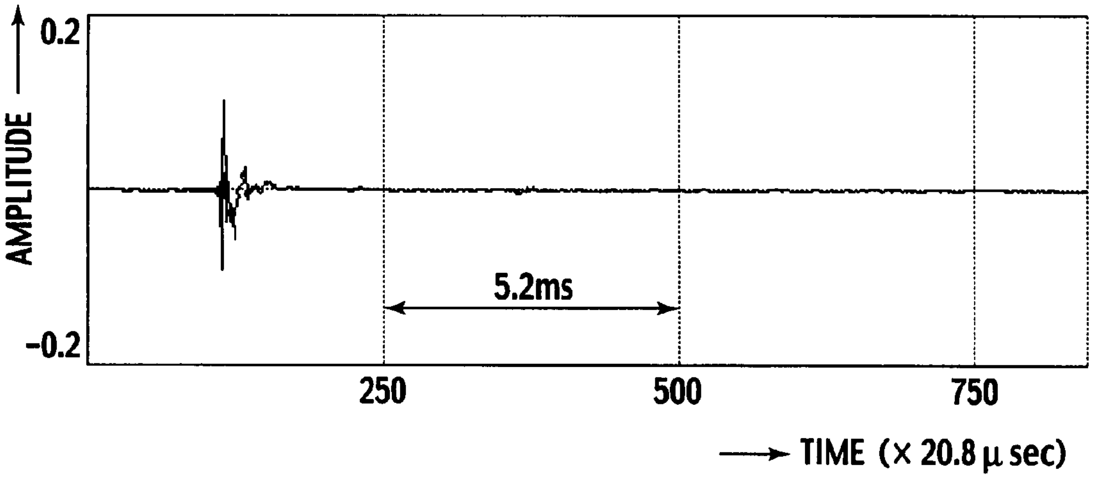
FIG. 37 is a view showing the characteristics of head transfer functions obtained through measurements with the head transfer function measuring apparatus of FIG. 32.
Figure 37:
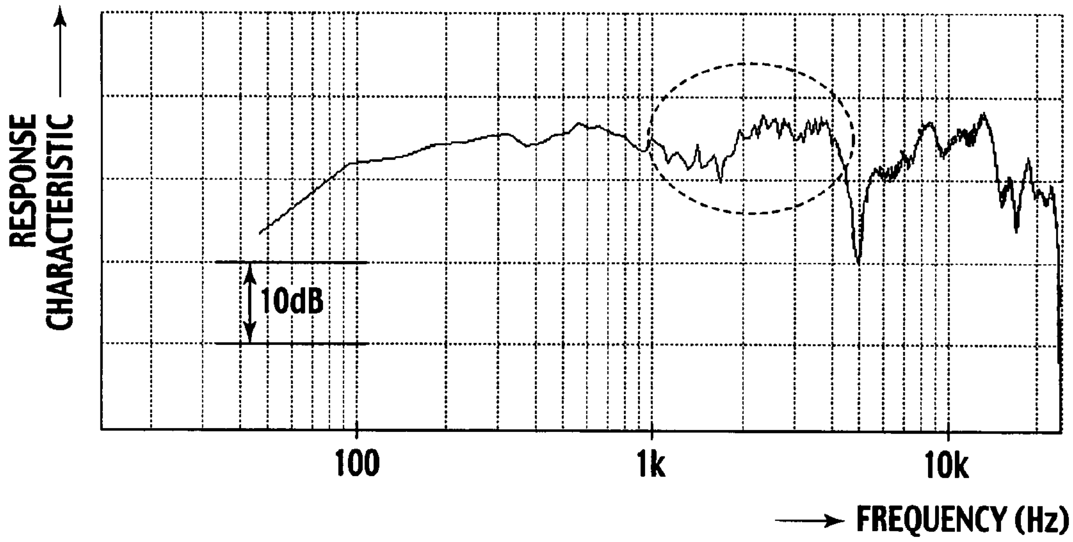
Figure 38:
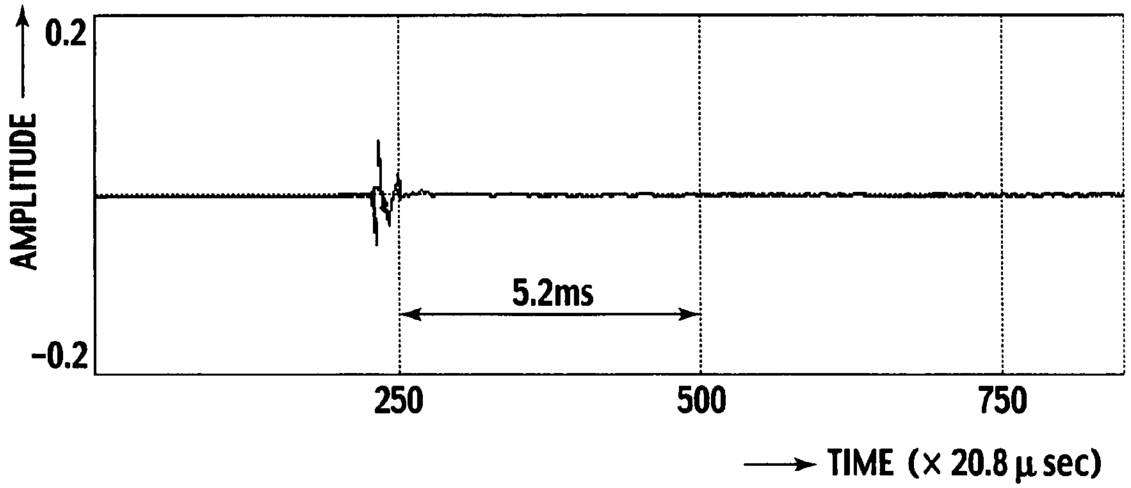
FIG. 38 is a view showing the characteristics of head transfer functions obtained through measurements with the head transfer function measuring apparatus of FIG. 32.
Figure 38:
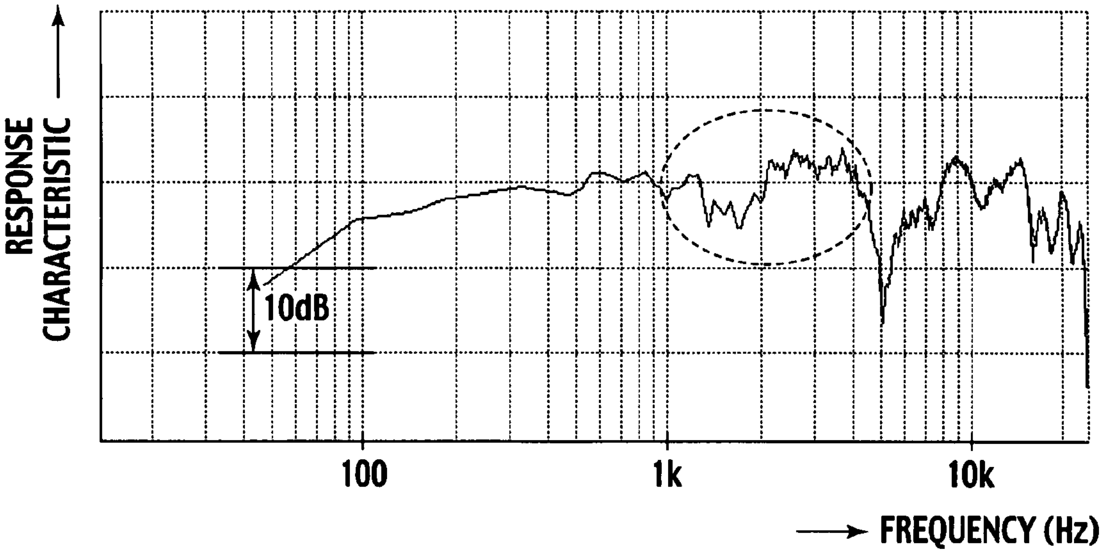
Figure 39:
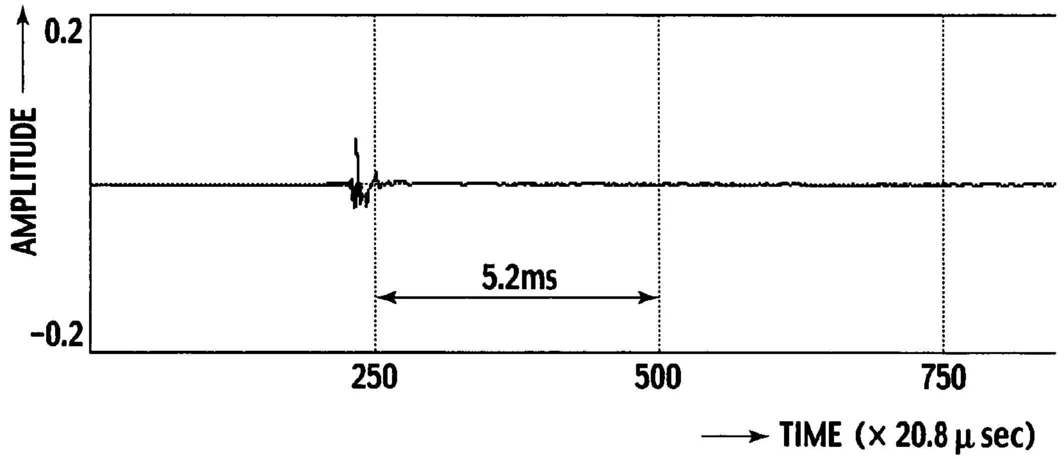
FIG. 39 is a view showing the characteristics of head transfer functions obtained through measurements with the head transfer function measuring apparatus of FIG. 32.
Figure 39:
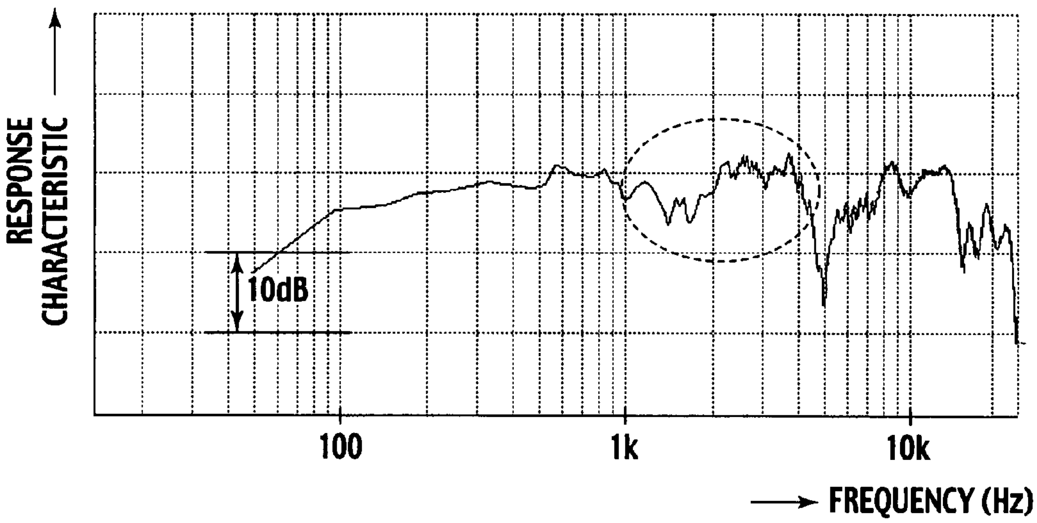

FIG. 33 is a sectional view showing the dummy head microphone 68. In the dummy head microphone 68, the artificial head 681 has auricle members 682*a* and 682*b* and auditory canals 683*a* and 683*b*. In the vicinities of the entrances thereof, there are the microphone units 684*a* and 684*b*. According to the dummy head microphone 69 shown in FIG. 16(C), the microphone units 694*a* and 694*b* are arranged at positions corresponding to human eardrums at the internal ends of the auditory canals 693*a* and 693*b*. The dummy head microphone 68 differs from the dummy head microphone 69 in that it arranges the microphone units 684*a* and 684*b* close to the entrances of the auditory canals 683*a* and 683*b*. It is generally considered that a dummy head microphone is a microphone having microphone units 694*a* and 694*b* at positions corresponding to human eardrums at the inner ends of the auditory canals 693*a* and 693*b* as shown in FIG. 16(C). For the sake of convenience, the unit shown in FIG. 33 that arranges the microphone units 684*a* and 684*b* adjacent to the entrances of the auditory canals 683*a* and 683*b* of the artificial head 681 having the auricle members 682*a* and 682*b* is referred to as the dummy head microphone.

The dummy head microphone 68 can collect a sound from the speaker 63 as a binaural sound that involves no influence of the auditory canals 683*a* and 683*b*.

Returning to FIG. 32, the personal computer 61 generates a measurement signal composed of, for example, an impulse sound. The measurement signal is amplified through the amplifier 62. The measurement signal emitted from the speaker 63 is received by the left and right microphone units 684*a* and 684*b* of the dummy head microphone 68. The received left and right signals are amplified through the amplifiers 66*a* and 66*b* and are supplied to the personal computer 61. The personal computer 61 compares the generated measurement signal with the received signals and finds head transfer functions $h_l(t)$ and $h_r(t)$ of the dummy head microphone 68. The head transfer function $h_l(t)$ is one that is obtained from the signal received by the left microphone unit 684*a*, and the head transfer function $h_r(t)$ is one obtained from the signal received by the right microphone unit 684*b*. A distance D between the speaker 63 and the dummy head microphone 68 is changed to, for example, 0.5 m, 1 m, 2 m, and the like, and head transfer functions at each distance are successively found.

FIGS. 34 to 39 show the characteristics of head transfer functions obtained with the head transfer function measuring apparatus 6*a* shown in FIG. 32.

An impulse response waveform shown in FIG. 34(A) is a waveform received by the left microphone unit 684*a* when the distance D between the speaker 63 and the dummy head microphone 68 is 50 cm. An ordinate indicates a normalized amplitude (voltage). An abscissa indicates time that is expressed with the number of sampling points of a signal at a sampling frequency of 48 kHz. FIG. 34(B) shows a frequency response characteristic obtained by Fourier-analyzing the impulse response waveform shown in FIG. 34(A) in the personal computer 61. An abscissa is frequency (Hz) and an ordinate is the response characteristic.

FIG. 35(A) is an impulse response waveform received by the right microphone unit 684*b* when the distance D is 50 cm. FIG. 35(B) is a frequency response characteristic obtained by Fourier-analyzing the impulse response waveform shown in FIG. 35(A). Measuring conditions are the same as those of FIG. 34.

Similarly, FIG. 36(A) is an impulse response waveform received by the left microphone unit 684*a* when the distance D is 1 m, and FIG. 36(B) is a frequency response characteristic thereof.

FIG. 37(A) is an impulse response waveform received by the right microphone unit 684*b* when the distance D is 1 m, and FIG. 37(B) is a frequency response characteristic thereof.

FIG. 38(A) is an impulse response waveform received by the left microphone unit 684*a* when the distance D is 2 m, and FIG. 38(B) is a frequency response characteristic thereof.

FIG. 39(A) is an impulse response waveform received by the right microphone unit 684*b* when the distance D is 2 m, and FIG. 39(B) is a frequency response characteristic thereof.

Comparison of these characteristics tells that the impulse response waveforms shown in (A) of FIGS. 34 to 39 decrease their amplitudes when the distance D is increased from 0.5 m to 1 m and to 2 m. In connection with the frequency response characteristics shown in (B) of FIGS. 34 to 39, each case with the distance D of 0.5 m has a part involving frequencies of 1 kHz to 4 kHz encircled with a dotted ellipse that shows regular peak-dip characteristics at intervals of about 400 Hz. Each case with the distance D of 1 m shows slightly irregular peak-dip characteristics at the same part. Each case with the distance D of 2 m shows a combination of a plurality of peak-dip characteristics having different frequency intervals. If the distance D is the same, the left and right microphone units provide substantially the same characteristic.

The personal computer 61 compares the generated impulse signal serving as the measurement signal with the waveforms of the impulse response signals from the amplifiers 66*a* and 66*b* and finds a head transfer characteristic for each distance D. The head transfer characteristic found for a given distance D is a characteristic that virtually positions a sound source at the distance D so that audio signals are provided from the virtual sound source for a listener. Although this embodiment sets the distance D to 0.5 m, 1 m, and 2 m, more distances may be set, or intervals of the distances D may be shorter than 0.5 m, to find respective characteristics.

The head transfer characteristics thus obtained are stored in the transfer function memory 334 of FIG. 31. Which of the stored transfer functions is used for a zoom factor detected by the zoom factor detector 331 is determined by a coefficient a that is obtained by dividing a distance to an object measured with an automatic focal point measuring function (not shown) of the camera unit 11 by the zoom factor. For example, if the distance to an object is 10 m and the zoom factor is 5, the coefficient a will be 2. If the distance to an object is 10 m and the zoom factor is 10, the coefficient a will be 1, and if the zoom factor is 20, the coefficient a will be 0.5.

Figure 40:
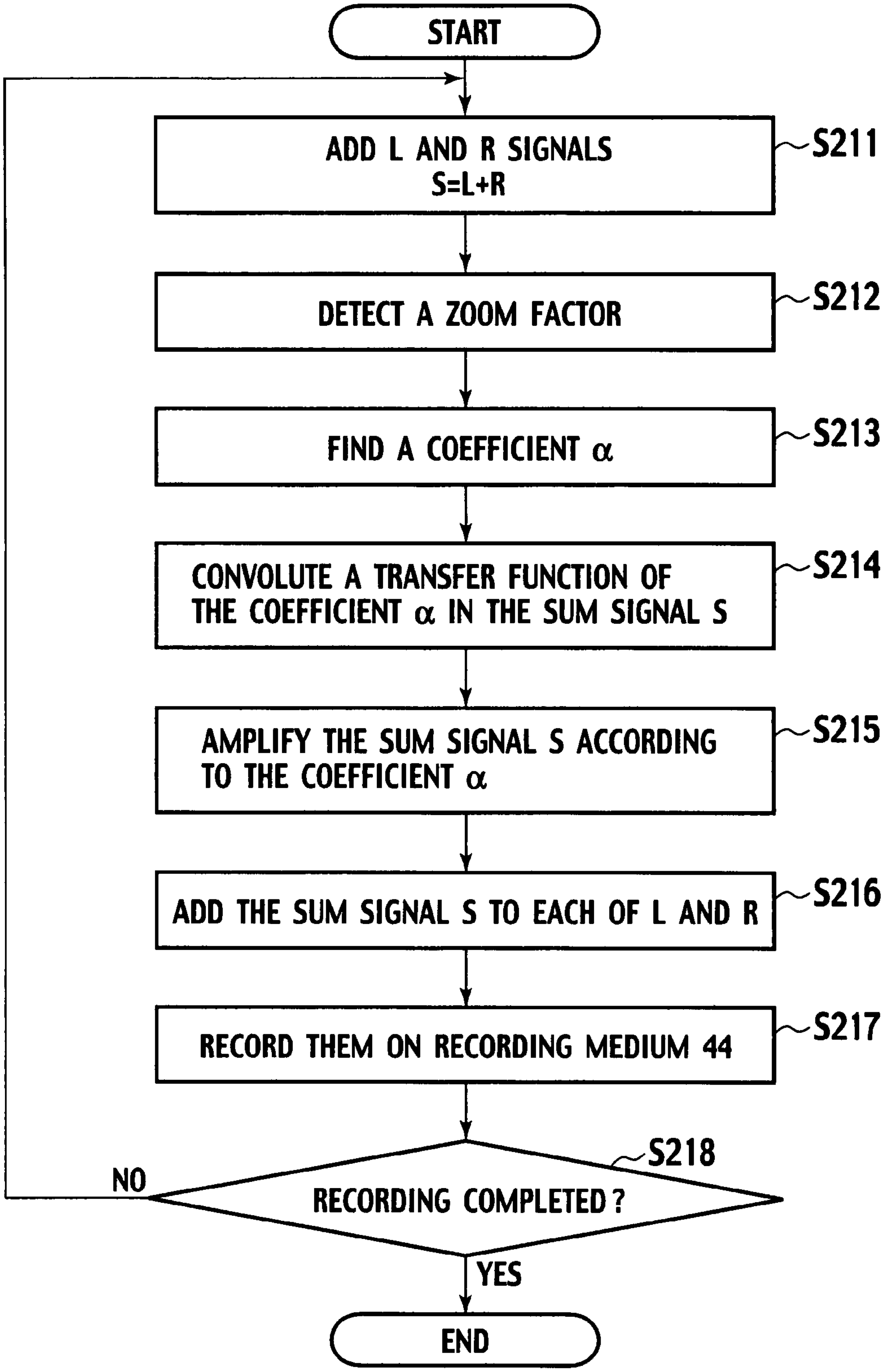
FIG. 40 is a flowchart explaining an audio zoom operation carried out with the audio zoom processor shown in FIG. 31 in the video-audio recording and reproducing apparatus according to the second embodiment of the present invention.

With reference to FIG. 40, operation of the video-audio recording and reproducing apparatus 102 including operation of the audio zoom processor 33*a* will be explained in detail. In step S211 of FIG. 40, the adder 335 adds left- and right-channel binaural audio signals from the binaural microphone 3 to each other and provides a sum signal S. In step S212, the zoom factor detector 331 detects a zoom factor that is obtained by the controller 47 in response to an operation conducted on the operation unit 48. In step S213, the coefficient calculator 332 determines, according to the zoom factor, which of the plurality of transfer functions stored in the transfer function memory 334 must be selected and calculates a coefficient a indicative of an amplification level to be used in the variable amplifier 337. The coefficient a may be a value obtained by dividing the distance to the object by the zoom factor, or a value generated from the value obtained by dividing the distance to the object by the zoom factor.

In step S214, the function selector 333 gets a transfer function from the transfer function memory 334 according to the coefficient a, and the convolution unit 336 convolutes the transfer function into the sum signal provided by the adder 335. In step S215, the variable amplifier 337 amplifies the output signal of the convolution unit 336 by multiplying the same by the coefficient a. In step S216, the adders 338*a* and 338*b* add the left- and right-channel binaural audio signals and the output signal of the variable amplifier 337 to each other. In step S217, the zoomed-up audio signals are recorded on the recording medium 44. In step S218, the controller 47 determines whether or not the recording has finished, and if not finished yet (NO), step S211 is repeated. If step S218 determines that the recording has finished (YES), the process in the audio zoom processor 33*a* ends.

Third Embodiment

Figure 41:
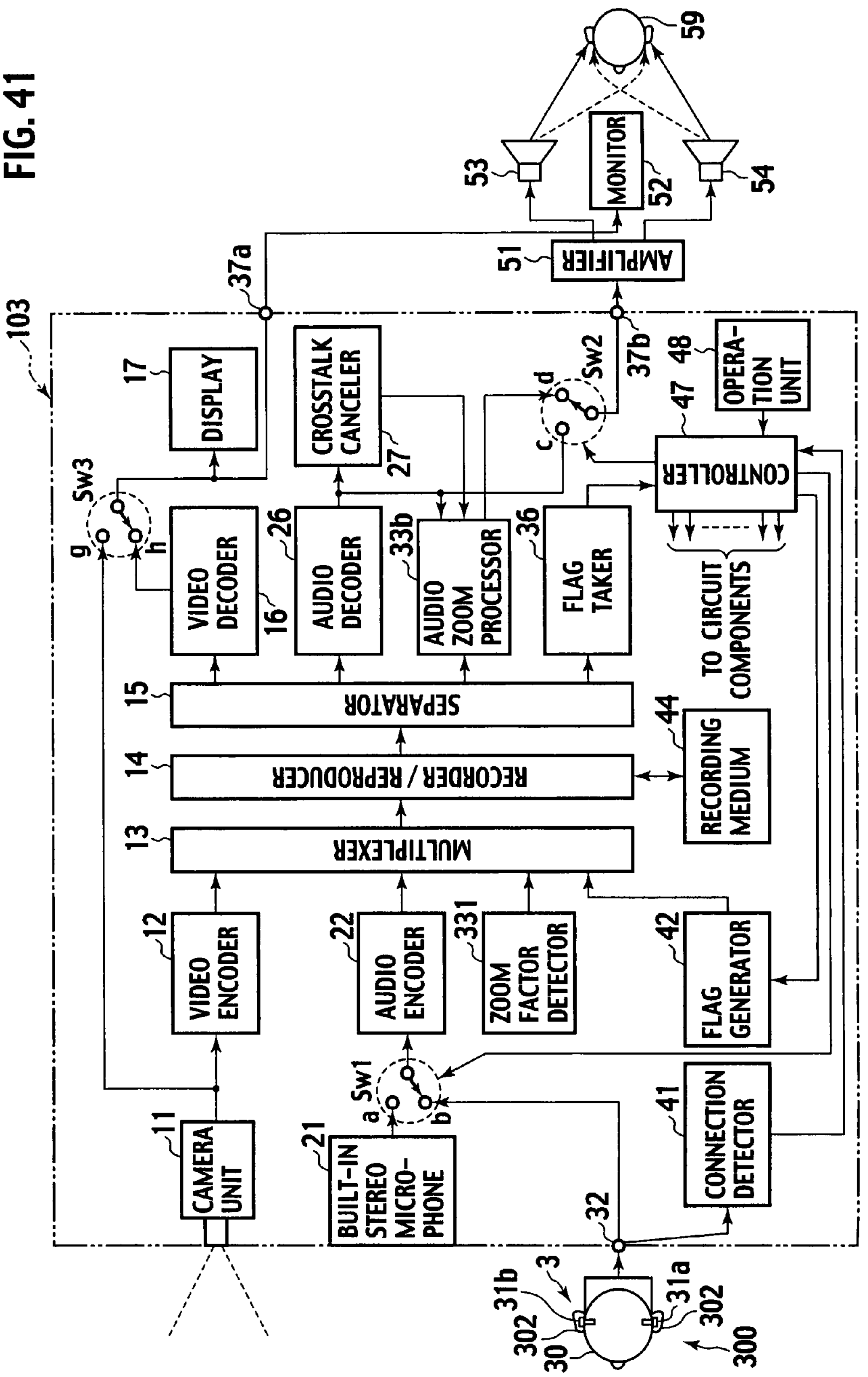
FIG. 41 is a block diagram showing an internal configuration example of a video-audio recording and reproducing apparatus according to a third embodiment of the present invention.

The second embodiment carries out the audio zoom-up process on the recording side, and the third embodiment carries out the audio zoom-up process on the reproducing side. In a video-audio recording and reproducing apparatus 103 according to the third embodiment shown in FIG. 41, components having the same functions as those of the video-audio recording and reproducing apparatus 101 of the first embodiment shown in FIG. 3 are represented with the same marks and the explanations thereof are omitted. The video-audio recording and reproducing apparatus 103 differs from the video-audio recording and reproducing apparatus 101 in that it arranges an audio zoom processor 33*b* after the separator 15 and a zoom factor detector 331 before the multiplexer 13. In FIG. 41, the headphone 55 and the audio output terminal 37*c* serving as a connection terminal for the headphone 55 are omitted.

Operation of the video-audio recording and reproducing apparatus 103 will be explained. The operation unit 48 is operated, and the controller 47 generates a lens driving signal, which is supplied to the camera unit 11 and zoom factor detector 331. The zoom factor detector 331 analyzes the zooming direction, zooming speed, and lens driving time of the lens driving signal and detects a zoom factor. Zoom factor information indicative of the detected zoom factor is supplied to the multiplexer 13. The multiplexer 13 multiplexes an encoded video signal, an encoded audio signal, a binaural flag signal, and the zoom factor information. The recorder/reproducer 14 records the multiplexed signal containing the zoom factor information on the recording medium 44.

The recorder/reproducer 14 reproduces the multiplexed signal recorded on the recording medium 44, and the separator 15 separates the encoded video signal, encoded audio signal, binaural flag signal, and zoom factor information from the multiplexed signal. The zoom factor information is input to the audio zoom processor 33*b*.

Figure 42:
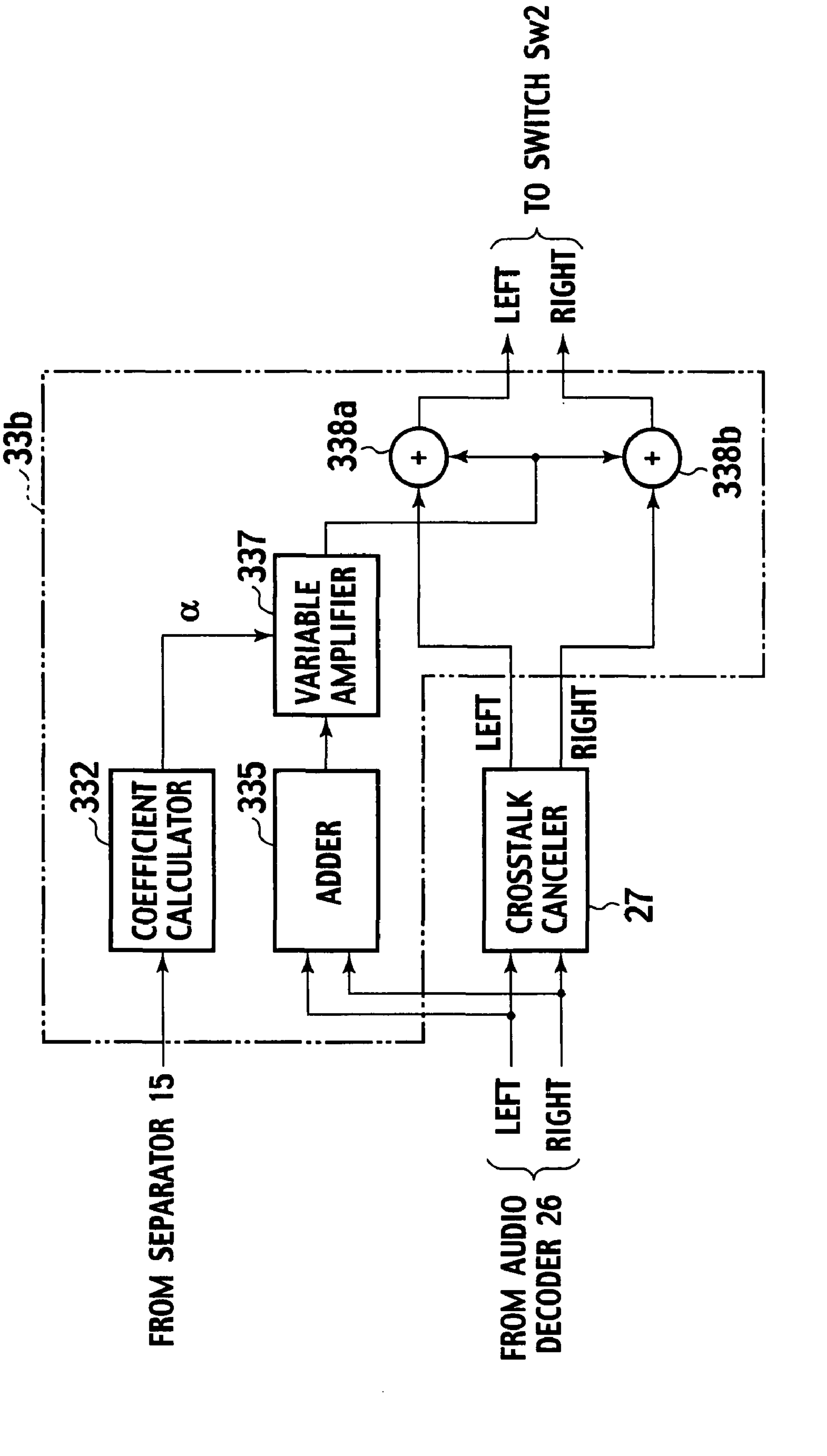
FIG. 42 is a block diagram showing a configuration example of an audio zoom processor in the video-audio recording and reproducing apparatus according to the third embodiment of the present invention.

FIG. 42 shows a concrete configuration example of the audio zoom processor 33*b*. As shown in FIG. 42, the audio zoom processor 33*b* differs from the audio zoom processor 33 of FIG. 29 in that the zoom factor detector 331 is omitted and signals input to the adders 338*a* and 338*b* are output signals from the crosstalk canceler 27.

In FIG. 42, the coefficient calculator 332 uses the zoom factor information separated and provided by the separator 15 and calculates a coefficient a used by the variable amplifier 337 to amplify input signals. The adder 335 adds binaural audio signals input from the audio decoder 26 to each other. The variable amplifier 337 amplifies the output signal of the adder 335 according to the coefficient a provided by the coefficient calculator 332. The adders 338*a* and 338*b* add output signals of the crosstalk canceler 27 to the amplified signal from the variable amplifier 337.

A zoom operation in the camera unit 11 may be carried out with the use of a DSP and operational software. When an audio zoom process is carried out during reproduction, there is no need of securing a signal processing time for the DSP for the zoom process. Accordingly, the DSP can sufficiently carry out, at the time of recording, signal processes such as the optimizing of photographed video signals, the encoding of video signals, and the controlling of recording. Carrying out the audio zoom process during reproduction enables the number of operations of the DSP to be allocated for the zoom operation, thereby preventing a shortage of operation time for recording.

Figure 43:
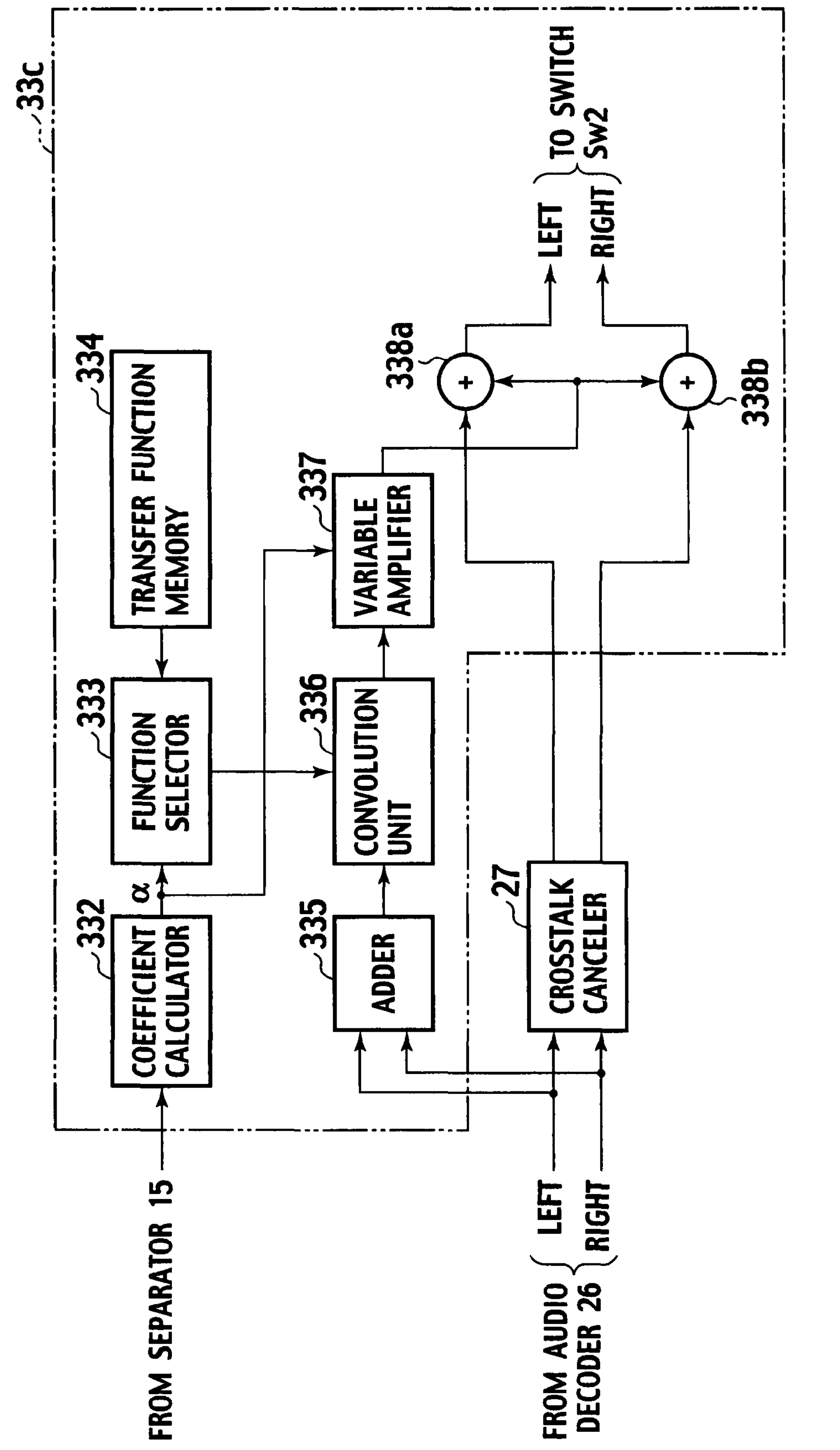
FIG. 43 is a block diagram showing another configuration example of an audio zoom processor in the video-audio recording and reproducing apparatus according to the third embodiment of the present invention.

FIG. 43 shows an audio zoom processor 33*c*. Unlike the audio zoom processor 33*b* of FIG. 42, the audio zoom processor 33*c* convolutes a head transfer function for providing an approaching effect into audio signals from a median plain, similar to FIG. 31. The audio zoom processor 33*c* differs from the audio zoom processor 33*b* in that it additionally has a function selector 333, a transfer function memory 334, and a convolution unit 336. Operations of the function selector 333, transfer function memory 334, and convolution unit 336 are the same as those of FIG. 31, and therefore, the explanations thereof are omitted.

Fourth Embodiment

Figure 44:
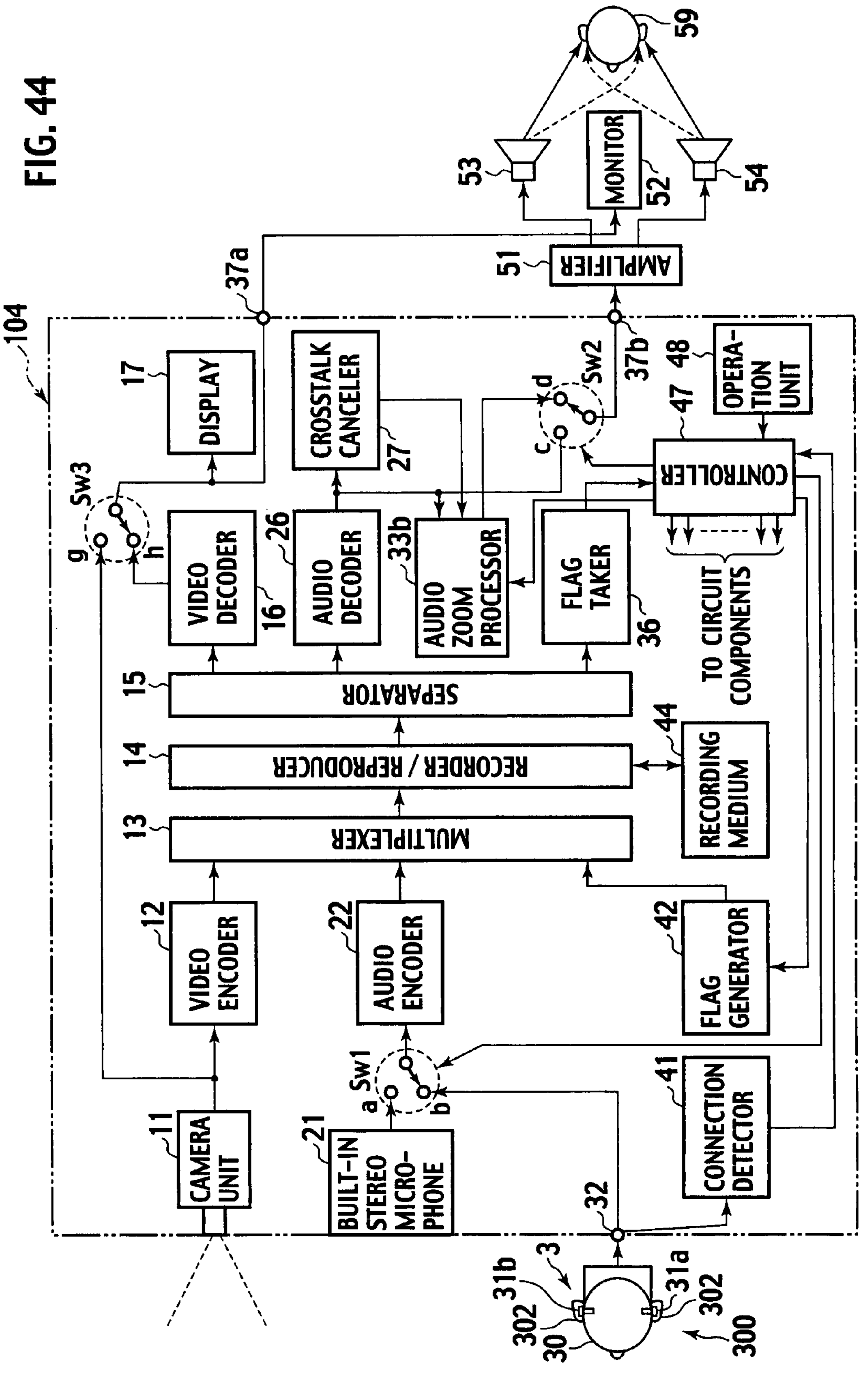
FIG. 44 is a block diagram showing an internal configuration example of a video-audio recording and reproducing apparatus according to a fourth embodiment of the present invention.

A video-audio recording and reproducing apparatus 104 of the fourth embodiment shown in FIG. 44 is configured to manually carry out from the outside an audio zoom-up process during the reproducing of the recording medium 44. Namely, if no zoom factor information is recorded on the recording medium 44, the viewer 59 carries out an audio zoom-up process while watching video signals reproduced on the monitor 52. The zoom-up process manually executed by the viewer 59 is referred to as a manual audio zoom process.

The video-audio recording and reproducing apparatus 104 shown in FIG. 44 differs from the video-audio recording and reproducing apparatus 103 in that the zoom factor detector 331 is omitted and an audio zoom processor 33*d* is employed instead of the audio zoom processor 33*b*.

When the viewer 59 manipulates the operation unit 48 to instruct a manual audio zoom operation, the controller 47 issues a zoom-up control signal to the audio zoom processor 33*d*. According to the zoom-up control signal, the audio zoom processor 33*d* carries out a zoom-up process with respect to binaural audio signals decoded by the audio decoder 26.

Figure 45:
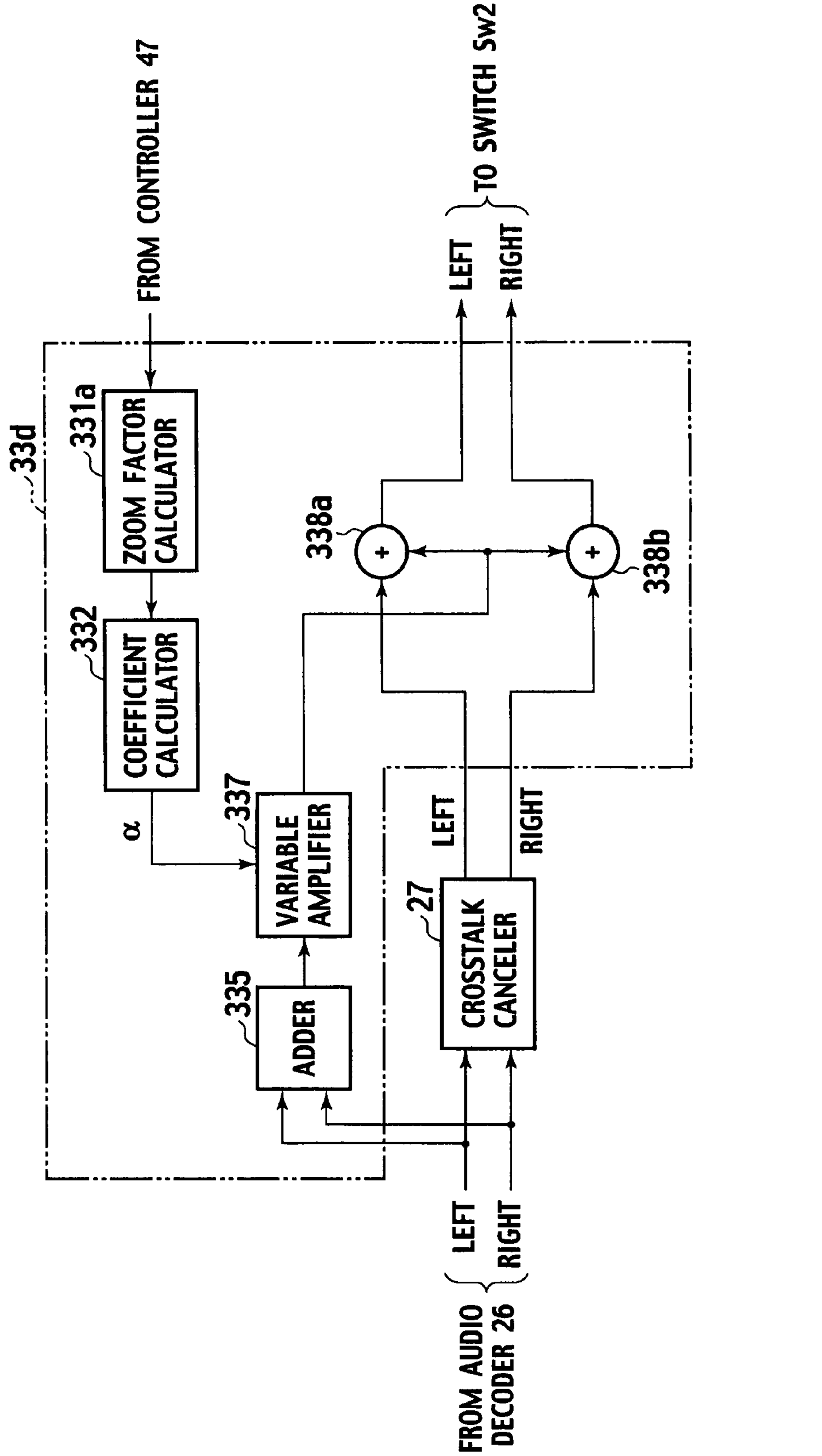
FIG. 45 is a block diagram showing a configuration example of an audio zoom processor in the video-audio recording and reproducing apparatus according to the fourth embodiment of the present invention.

FIG. 45 shows a concrete configuration example of the audio zoom processor 33*d*. As shown in FIG. 45, the audio zoom processor 33*d* differs from the zoom processor 33*b* of FIG. 42 in that it has a zoom factor detector 331*a* to receive the zoom-up control signal from the controller 47 and the coefficient calculator 332 receives zoom factor information generated by the zoom factor detector 331*a* instead of zoom factor information from the separator 15. The other parts operate like the zoom processor 33*b*, and therefore, the explanations thereof are omitted.

Figure 46:
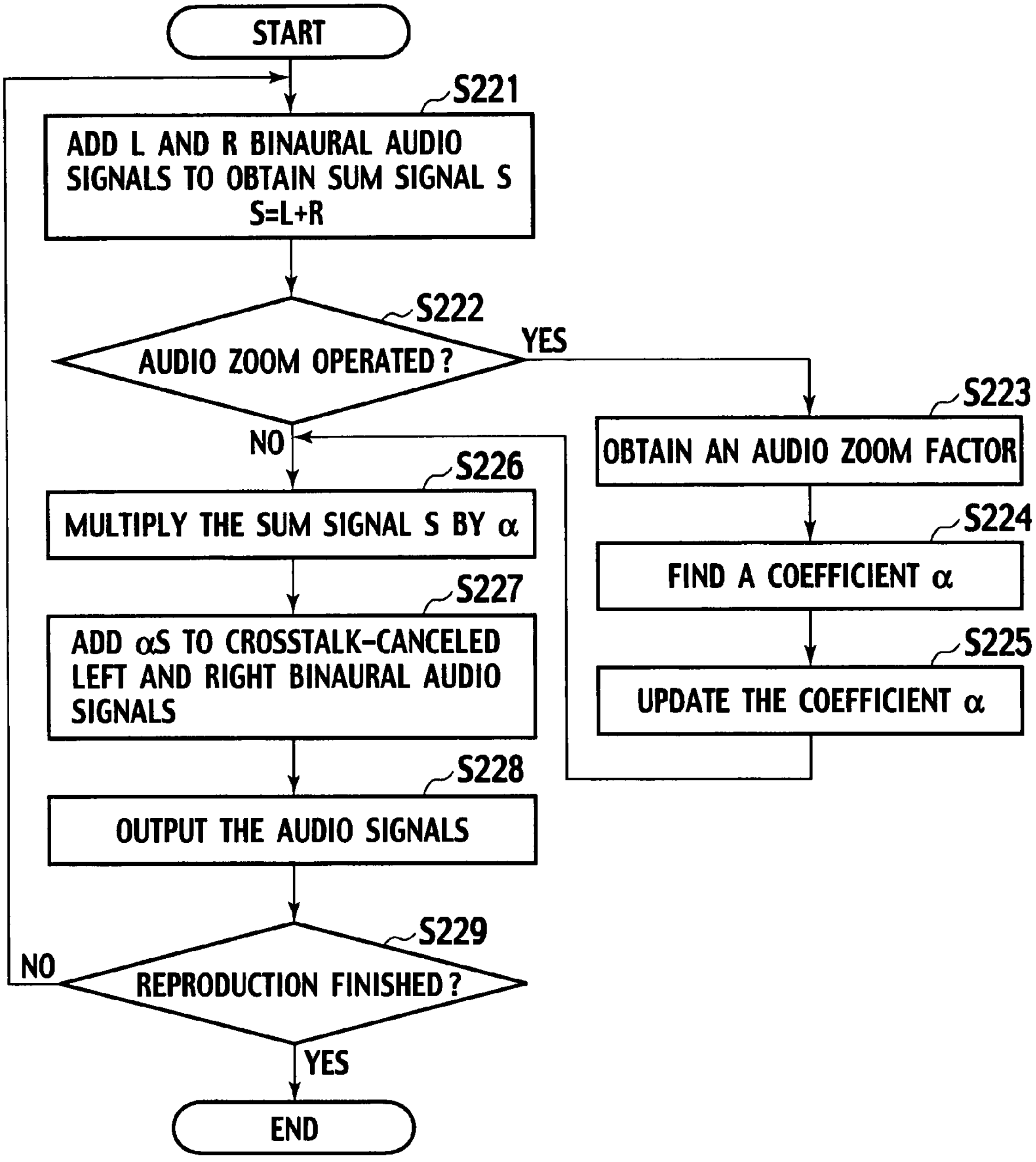
FIG. 46 is a flowchart explaining a manual audio zoom process in the video-audio recording and reproducing apparatus according to the fourth embodiment of the present invention.

With reference to FIG. 46, the manual audio zoom process of the fourth embodiment will be explained in detail. In step S221 of FIG. 46, the adder 335 adds reproduced left and right binaural audio signals to each other and provides a sum signal S. In step S222, the controller 47 determines whether or not the operation unit 48 has changed an audio zoom factor. If step S222 determines that the audio zoom factor has been changed (YES), step S223 is carried out, and if not changed (NO), step S226 is carried out.

If the audio zoom factor has been changed, the zoom factor detector 331*a* calculates, in step S223, a zoom factor according to a zoom-up control signal. In step S224, the coefficient calculator 332 calculates a coefficient a according to the zoom factor provided by the zoom factor detector 331*a*. The coefficient a may contain the characteristic of a head transfer function to position a sound source in front of the viewer. In step S225, the coefficient a is updated to the newly calculated value.

In step S226, the variable amplifier 337 multiplies the sum signal S by the coefficient a to provide aS. If steps S223 to S225 are bypassed, the coefficient a is a value before the audio zoom factor has been changed. In step S227, the adders 338*a* and 338*b* add the signal aS to binaural audio signals on which a crosstalk canceling process has been carried out by the crosstalk canceler 27. In step S228, the audio signals obtained in step S227 are output through the switch Sw2 and audio output terminal 37*b*. In step S229, the controller 47 determines whether or not the reproduction has been completed. If it has not been completed (NO), step S221 is repeated, and if completed (YES), the process ends.

Fifth Embodiment

Figure 47:
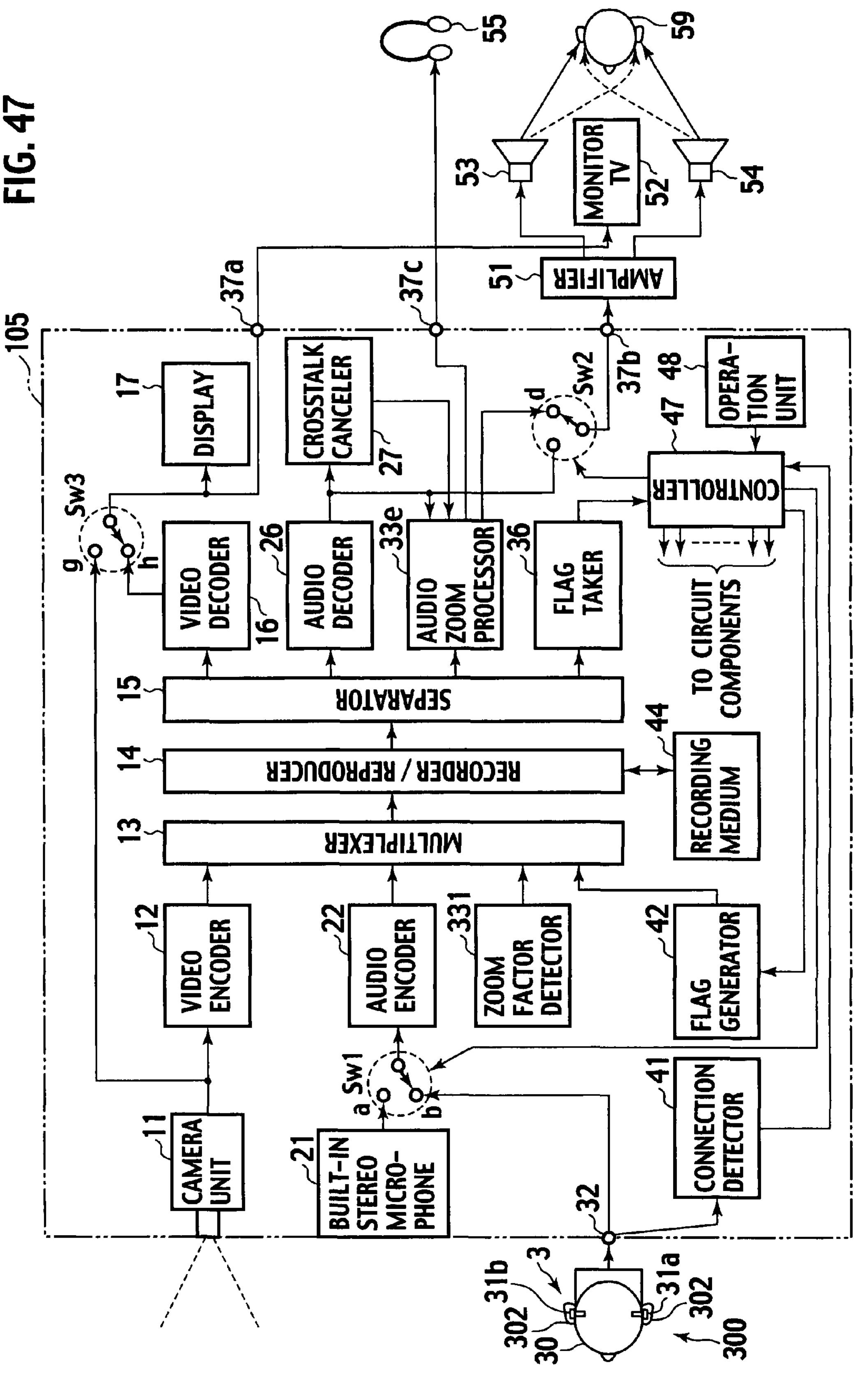
FIG. 47 is a block diagram showing an internal configuration example of a video-audio recording and reproducing apparatus according to a fifth embodiment of the present invention.

A video-audio recording and reproducing apparatus 105 according to the fifth embodiment shown in FIG. 47 is appropriate for hearing zoomed-up audio signals with the headphone 55. The video-audio recording and reproducing apparatus 105 shown in FIG. 47 differs from the video-audio recording and reproducing apparatus 103 of FIG. 41 in that it has an audio zoom processor 33*e* instead of the audio zoom processor 33*b* so that audio signals from the audio zoom processor 33*e* are supplied through the audio output terminal 37*c* to the headphone 55. The headphone 55 is not subjected to the crosstalk canceling process by the crosstalk canceller 27 and receives binaural audio signals processed by the zoom-up process of the audio zoom processor 33*e*.

Figure 48:
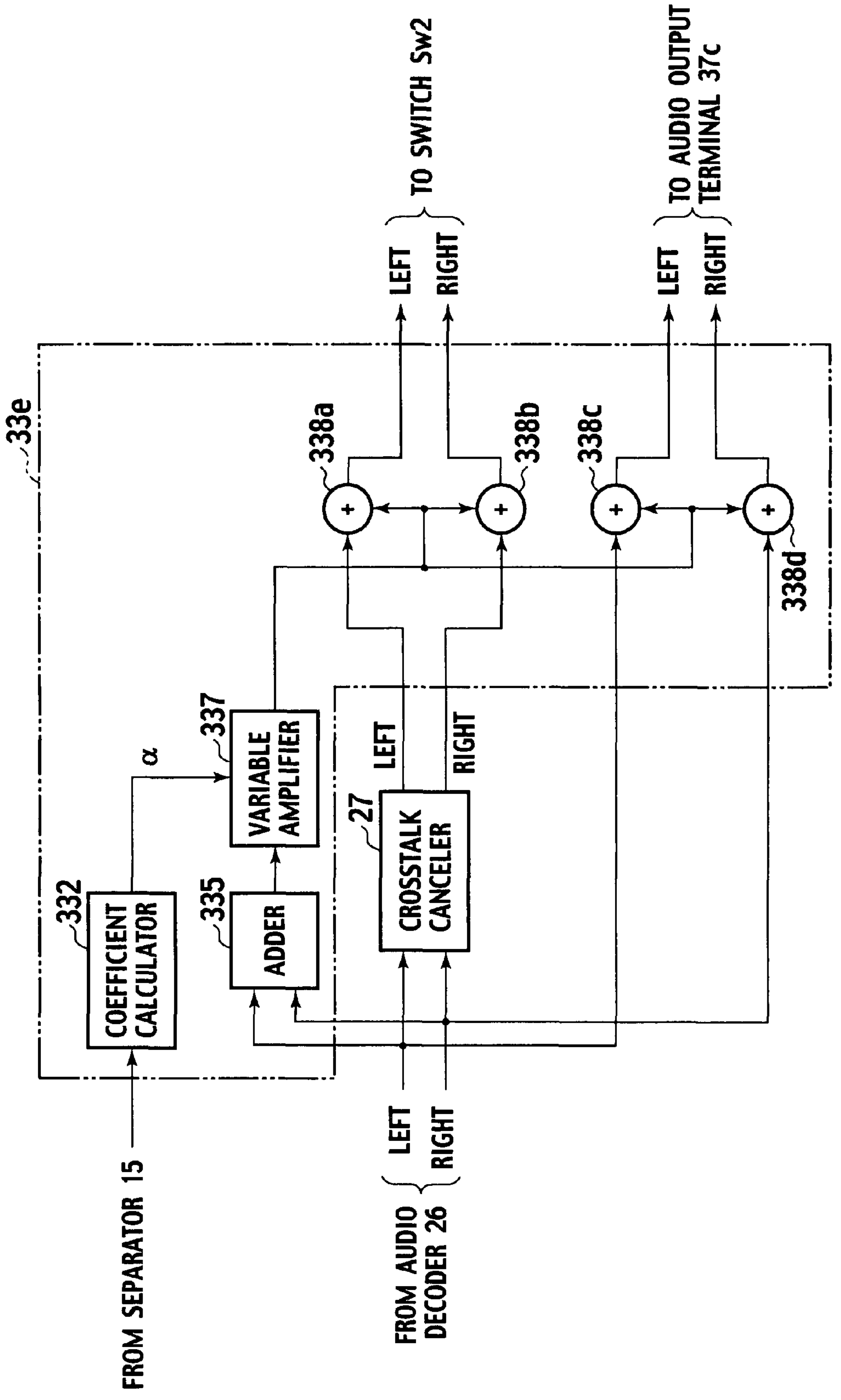
FIG. 48 is a block diagram showing a configuration example of an audio zoom processor in the video-audio recording and reproducing apparatus according to the fifth embodiment of the present invention.

FIG. 48 shows a concrete configuration example of the audio zoom processor 33*e*. The audio zoom processor 33*e* differs from the audio zoom processor 33*b* of FIG. 42 in that it additionally has adders 338*c* and 338*d*. The adders 338*c* and 338*d* add binaural audio signals decoded by the audio decoder 26 and a zoomed-up audio signal provided by the variable amplifier 337 to each other. The sum signals provided by the adders 338_c_ and 338_d_ are headphone listening audio signals that are supplied through the audio output terminal 37_c_ to the headphone 55.

The zoomed-up audio signals according to the above-mentioned second to fifth embodiments provide reproduction effects mentioned below.

If the camera unit 11 is set to a wide view angle with a small zoom factor, a sum signal from the adder 335 is not amplified by the variable amplifier 337. As a result, the viewer 59 sees video signals displayed on the monitor 52 and hears realistic 360-degree audio signals surrounding the photographer 300 through the speakers 53 and 54. At the wide view angle setting, the view angle is about 60 degrees. Due to a difference between the image view angle and a range of angles in which audio signals have been collected, the viewer 59 sometimes senses medium-range-dropped sounds, i.e., lack of sounds from an object displayed on the monitor 52. On the other hand, zoomed-up audio signals are formed by enhancing signal components from the median plane of the photographer 300 and by adding the enhanced signal components to binaural audio signals. Accordingly, the resultant audio signals are compensated for the dropped medium range. As a result, the viewer 59 senses no medium-range-dropped sounds. Namely, the viewer 59 can hear more realistic sounds without an odd feeling than the first embodiment.

Sixth Embodiment

Figure 49:
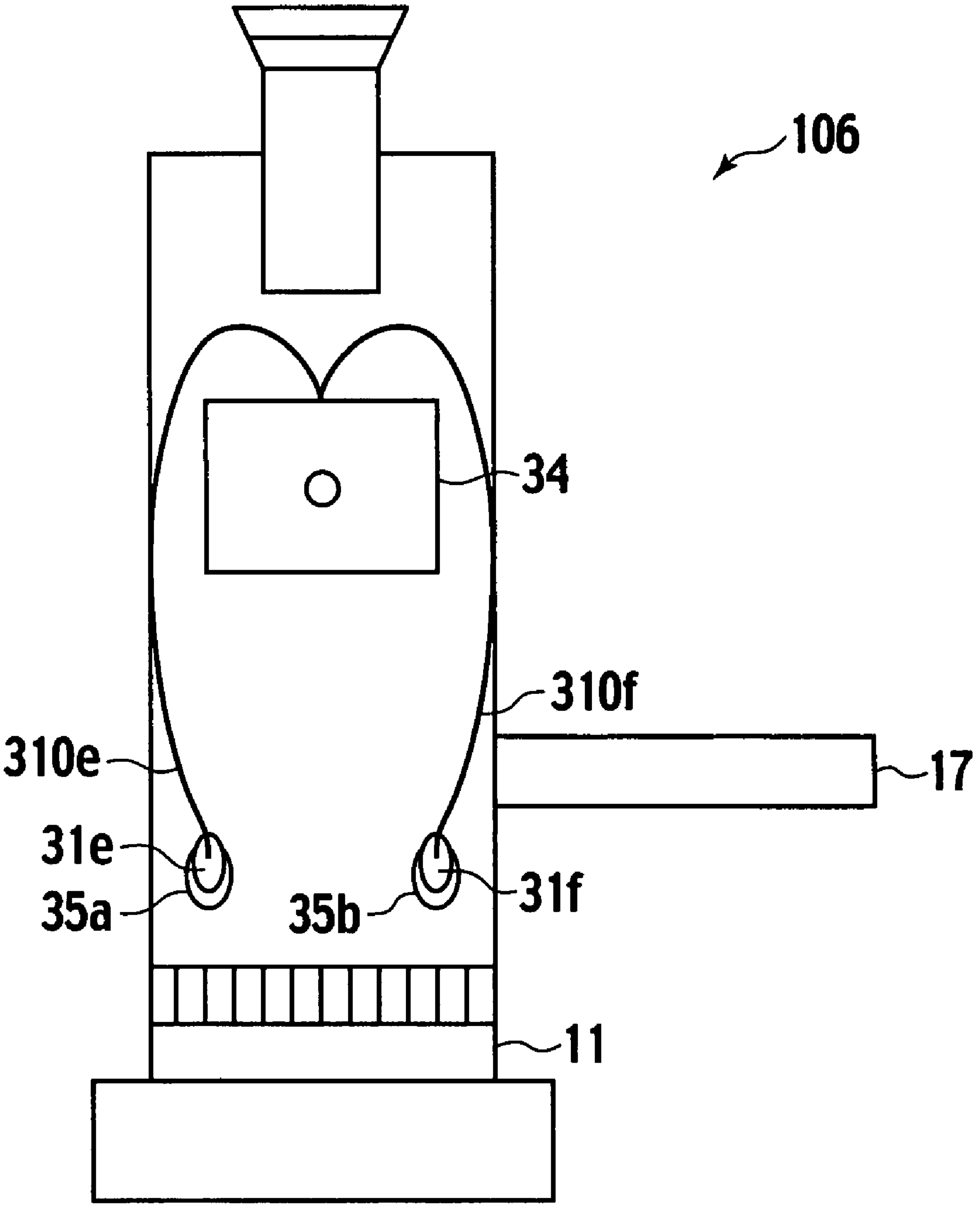
FIG. 49 is an external perspective view showing a video-audio recording and reproducing apparatus according to a sixth embodiment of the present invention.
Figure 50:
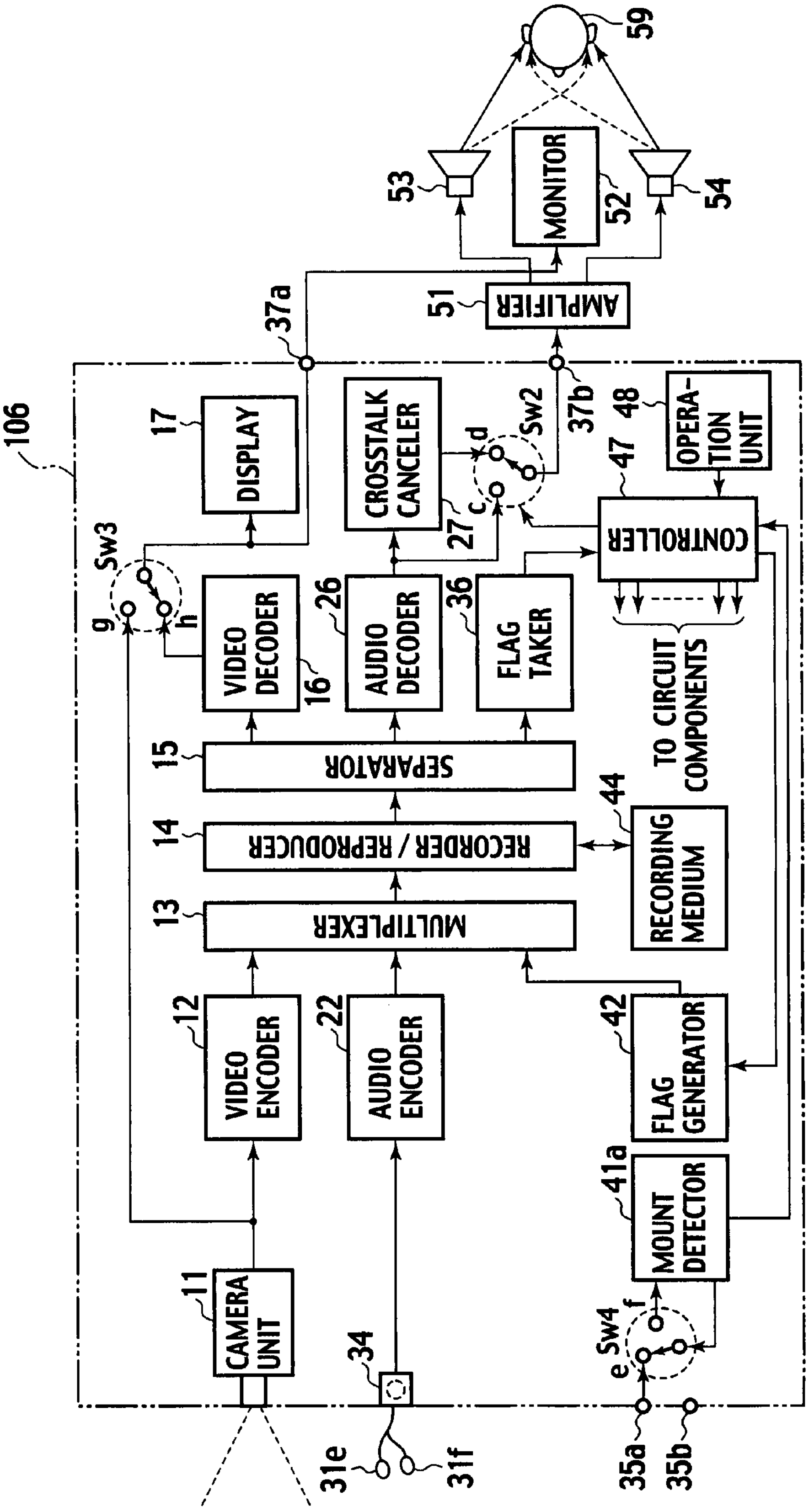
FIG. 50 is a block diagram showing an internal configuration example of the video-audio recording and reproducing apparatus according to the sixth embodiment of the present invention.

Unlike the first to fifth embodiments that separately arrange the built-in microphone 21 and binaural microphone 3, a video-audio recording and reproducing apparatus 106 according to the sixth embodiment shown in FIGS. 49 and 50 employs a standard stereo microphone serving as a binaural microphone. FIG. 49 is a plan view showing an external arrangement of the video-audio recording and reproducing apparatus 106 according to the sixth embodiment, and FIG. 50 is a block diagram showing a concrete internal configuration example of the video-audio recording and reproducing apparatus 106. In FIGS. 49 and 50, components having the same functions as those of FIGS. 1 and 3 are represented with the same marks and the explanations thereof are omitted.

As shown in FIG. 49, the video-audio recording and reproducing apparatus 106 has microphone mounts 35_a_ and 35_b_ on which microphones 31_e_ and 31_f_ are placed and a cord housing 34 for accommodating microphone cords 310_e_ and 310_f_ connected to the microphones 31_e_ and 31_f_.

In FIG. 49, to collect usual stereo sounds with the microphones 31_e_ and 31_f_, the photographer 300 places the microphones 31_e_ and 31_f_ on the microphone mounts 35_a_ and 35_b_. To collect binaural sounds, the photographer 300 pulls the microphone cords 310_e_ and 310_f_ out of the cord housing 34 and puts the microphones 31_e_ and 31_f_ on the ears 302 of the photographer. The video-audio recording and reproducing apparatus 106 has a projecting detector (not shown) to detect the microphones 31_e_ and 31_f_ placed on the microphone mounts 35_a_ and 35_b_. In response to an ON/OFF operation of a switch (corresponding to a switch Sw4 of FIG. 50) that is interlocked with the projecting detector, the video-audio recording and reproducing apparatus 106 detects whether or not the microphones 31_e_ and 31_f_ are on the microphone mounts 35_a_ and 35_b_. Detecting whether or not the microphones are on the microphone mounts 35_a_ and 35_b_ is not limited to this. For example, magnetic fields generated by permanent magnets incorporated in the microphones 31_e_ and 31_f_ may be detected with the use of Hall elements or magnetic resistance elements.

The switch Sw4 in FIG. 50 connects a terminal e to establish an OFF state if the microphones 31_e_ and 31_f_ are not on the microphone mounts 35_a_ and 35_b_, and if the microphones 31_e_ and 31_f_ are on the mounts, connects a terminal f to establish an ON state. A mount detector 41_a_ detects whether or not the microphones 31_e_ and 31_f_ are on the microphone mounts 35_a_ and 35_b_ by checking to see if the switch Sw4 connects the terminal e or f. A detection signal from the mount detector 41_a_ is supplied to the controller 47.

If the mount detector 41_a_ detects that the microphones 31_e_ and 31_f_ are present, the microphones 31_e_ and 31_f_ collect usual stereo sounds, and the controller 47 controls circuit components so that the video-audio recording and reproducing apparatus 106 may conduct a recording operation for normal-mode photographing. In this case, the roles of the microphones 31_e_ and 31_f_ are equivalent to those of the built-in stereo microphone 31 of FIG. 3. Accordingly, the flag generator 42 does not generate a binaural flag signal indicative of a binaural mode. On the other hand, if the mount detector detects that the microphones 31_e_ and 31_f_ are not present on the mounts, the controller 47 determines that it is the binaural mode in which the photographer 300 puts the microphones 31_e_ and 31_f_ on his or her ears 302. Then, the controller 47 controls the circuit components so that the video-audio recording and reproducing apparatus 106 carries out a recording operation for binaural-mode photographing. In this case, the flag generator 42 generates a binaural flag signal under the control of the controller 47.

According to the sixth embodiment, the microphones 31_e_ and 31_f_, microphone mounts 35_a_ and 35_b_, mount detector 41_a_, and controller 47 serve as a whole a switching unit to select, as a microphone for collecting ambient sounds, the binaural microphone to be attached to the ears of the photographer or a microphone other than the binaural microphone.

Figure 51:
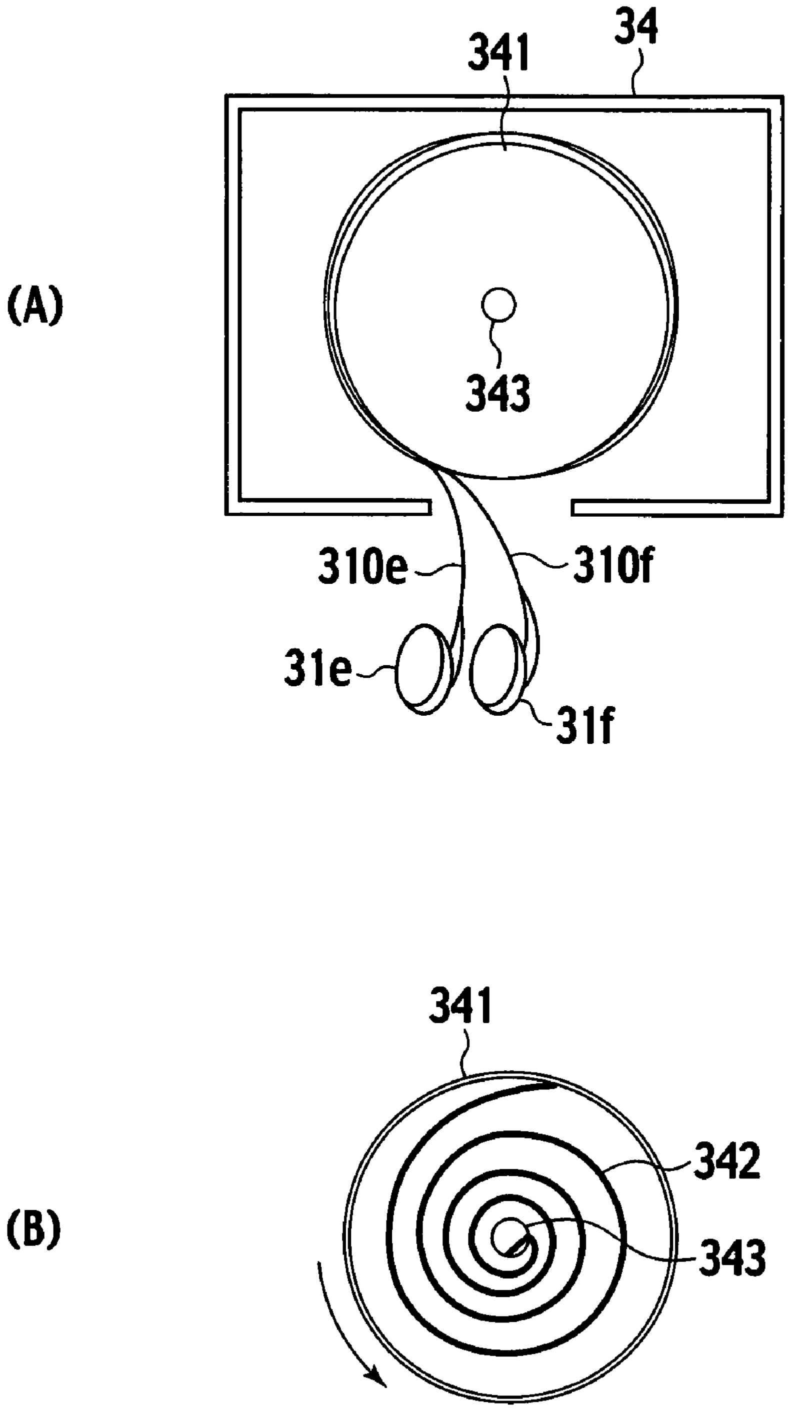
FIG. 51 is a plan view showing a cord housing in the video-audio recording and reproducing apparatus according to the sixth embodiment of the present invention.

With reference to FIG. 51, an example structure of the cord housing 34 will be explained. FIG. 51(A) is a top view showing an internal structure of the cord housing 34 with the microphone cords 310_e_ and 310_f_ are wound around a reel 341 having a rotary shaft 343. FIG. 51(B) is a bottom view showing the internal structure of the cord housing 34. The reel 341 incorporates a spiral spring 342. Instead of or in addition to detecting whether or not the microphones 31_e_ and 31_f_ are placed on the microphone mounts 35_a_ and 35_b_, it is possible to detect a turn angle of the reel 341 and determine whether or not it is the binaural mode.

Seventh Embodiment

Figure 52:
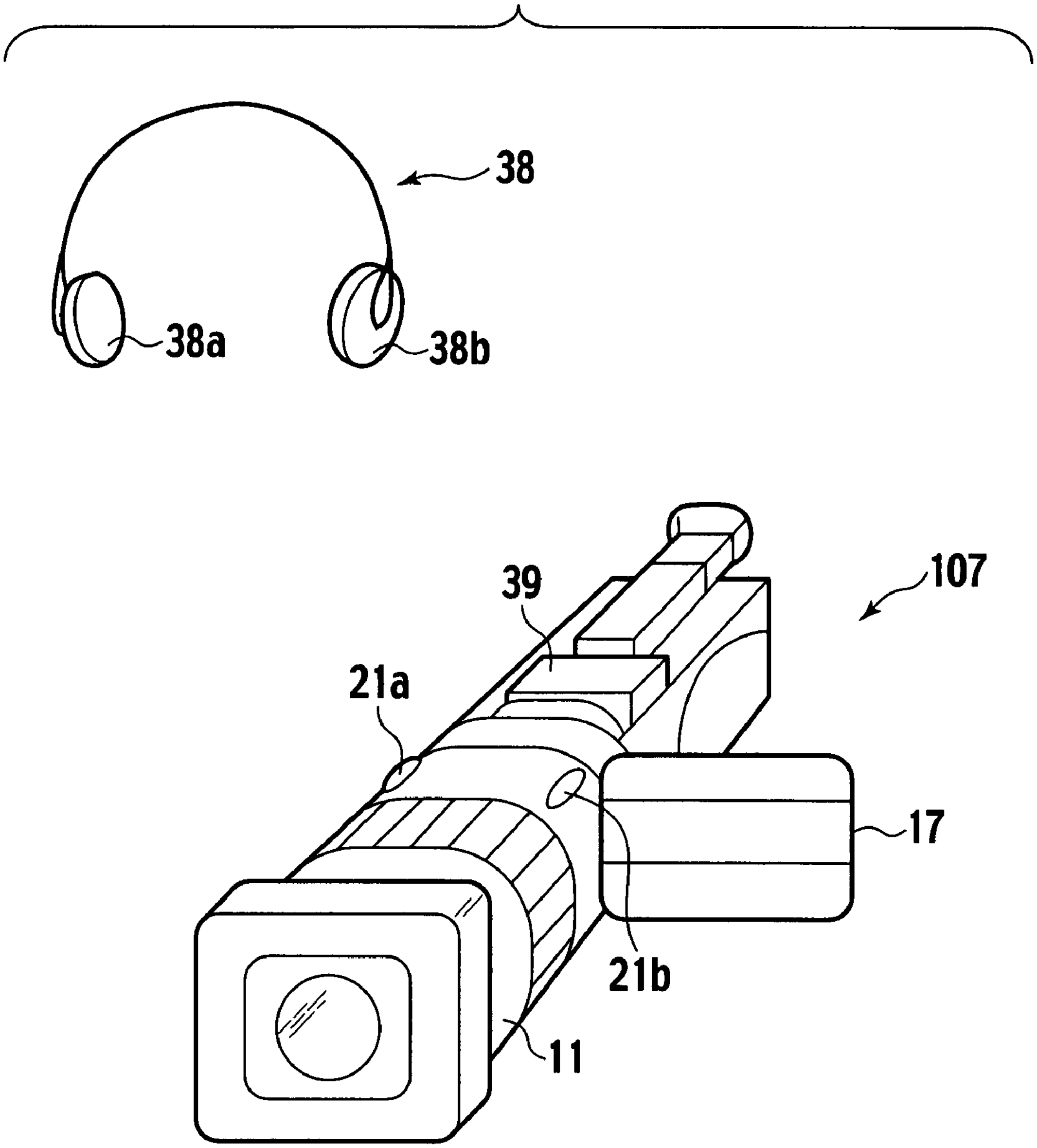
FIG. 52 is an external perspective view showing a video-audio recording and reproducing apparatus according to a seventh embodiment of the present invention.

A video-audio recording and reproducing apparatus 107 according to the seventh embodiment shown in FIG. 52 employs a wireless binaural microphone that wirelessly transmits collected audio signals to the apparatus proper. In FIG. 52, components having the same functions as those of FIG. 1 are represented with the same marks and the explanations thereof are omitted.

In FIG. 52, the video-audio recording and reproducing apparatus 107 has a wireless transceiver 39 instead of the external microphone connection terminal 32 of FIG. 1 and uses the wireless binaural microphone 38 instead of the binaural microphone 3 to collect and record sounds. The photographer 300 wears the wireless binaural microphone 38 wirelessly connected to the apparatus proper on his or her head and inserts left and right microphones 38_a_ and 38_b_ in his or her ears 302 to collect sounds. As a result, the photographer can photograph an object without bothered with microphone cords. It is also possible to photograph an object by two persons including the photographer 300 and a sound collector (not shown).

Figure 53:
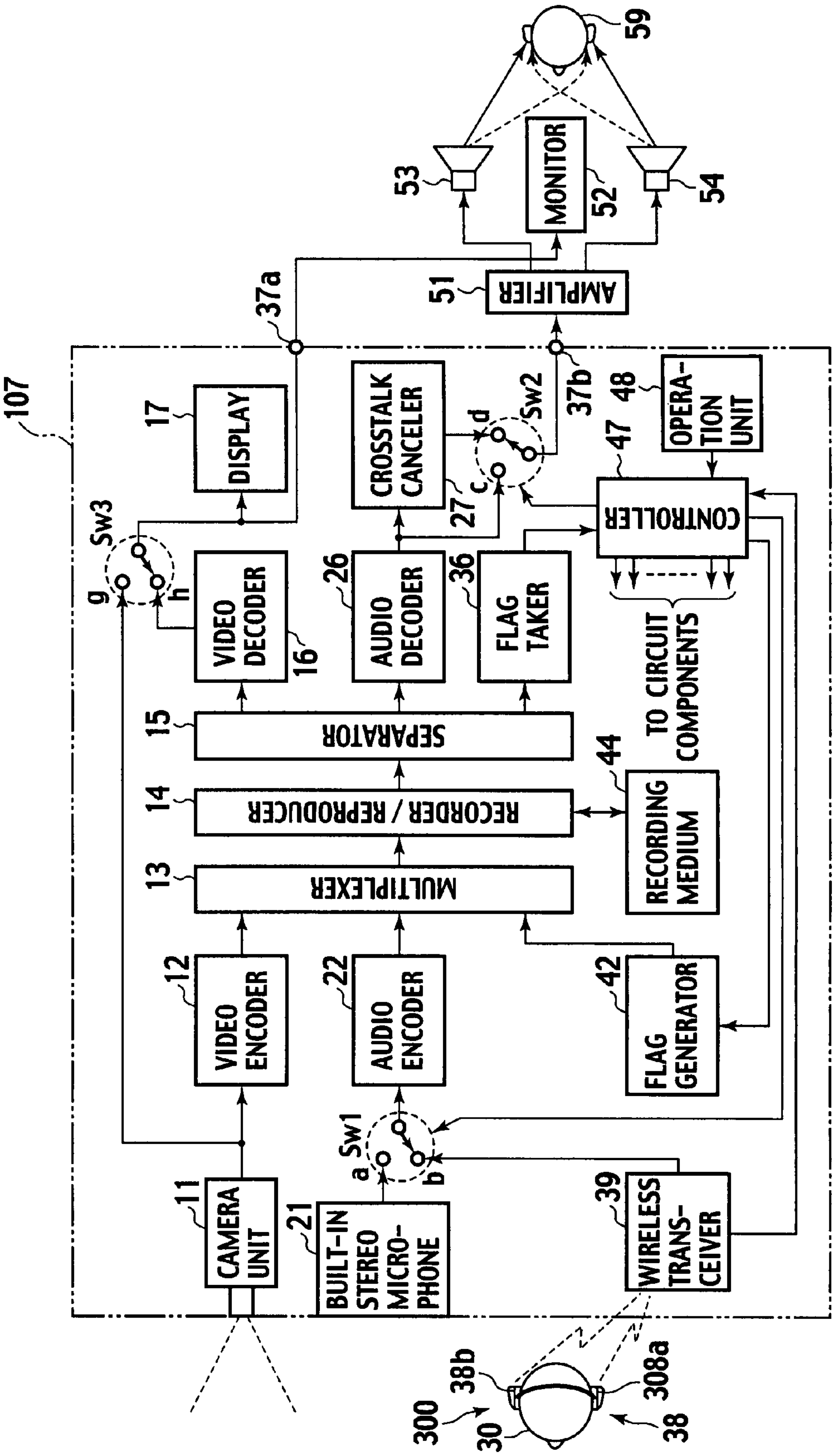
FIG. 53 is a block diagram showing an internal configuration example of the video-audio recording and reproducing apparatus according to the seventh embodiment of the present invention.

With reference to FIG. 53, an internal structure of the video-audio recording and reproducing apparatus 107 will be explained. In FIG. 53, components having the same functions as those of FIG. 3 are represented with the same marks and the explanations thereof are omitted. The video-audio recording and reproducing apparatus 107 shown in FIG. 53 differs from the video-audio recording and reproducing apparatus 101 in that it has the wireless transceiver 39 instead of the external microphone connection terminal 32 and connection detector 41.

If it is determined that the wireless binaural microphone 38 is within a predetermined distance from the apparatus proper and if the wireless transceiver 39 receives binaural audio signals from the wireless binaural microphone 38, the controller 47 connects the switch Sw1 to the terminal b so that the binaural audio signals from the wireless binaural microphone 38 are supplied to the audio encoder 22. At this time, the controller 47 controls the flag generator 42 to generate a binaural flag signal. If it is determined that the wireless binaural microphone 38 is out of the predetermined distance from the apparatus proper, the controller 47 connects the switch Sw1 to the terminal a so that stereo audio signals from the built-in stereo microphone 21 are supplied to the audio encoder 22. At this time, the flag generator 42 generates no binaural flag signal.

Figure 54:
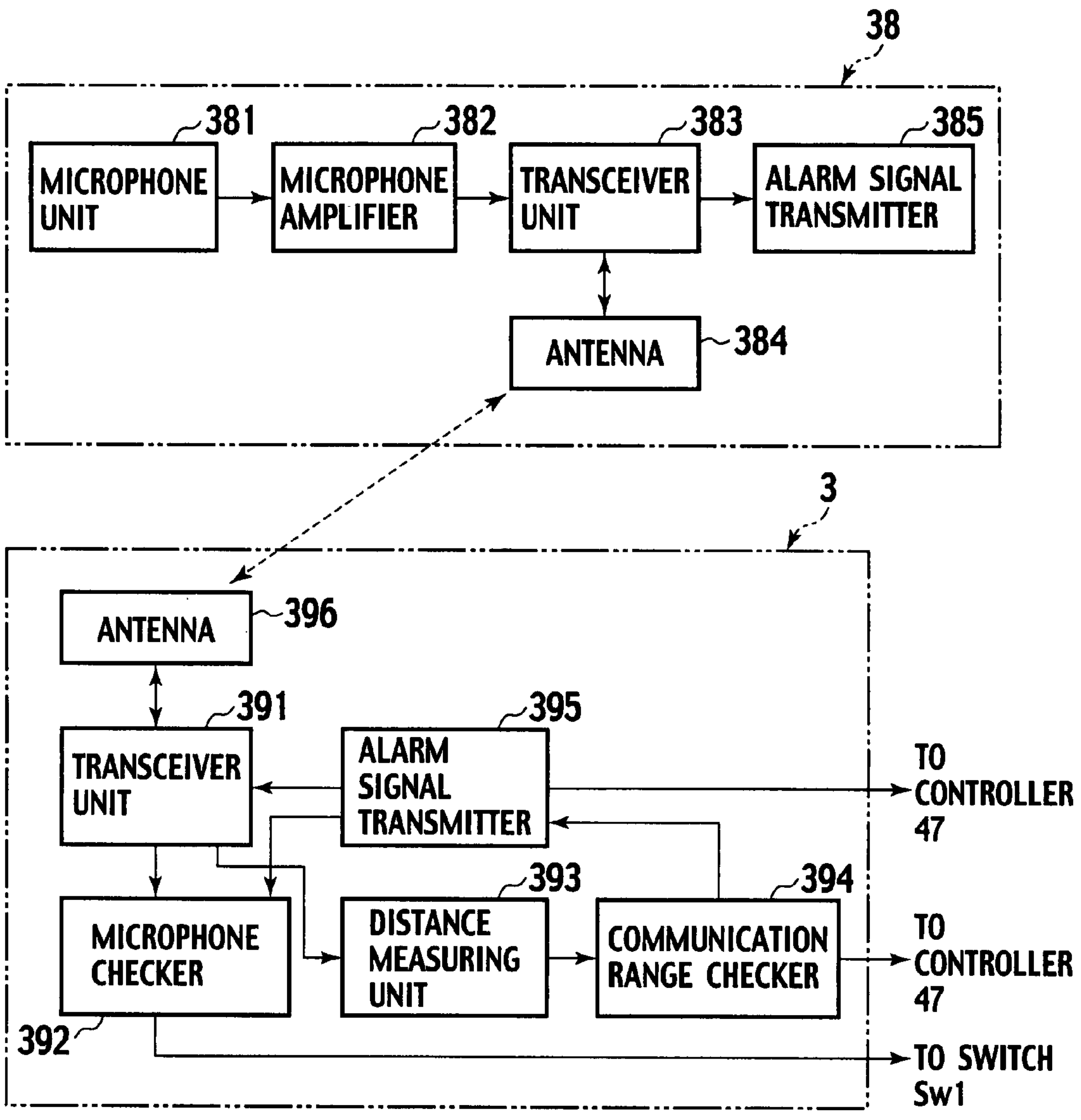
FIG. 54 is a block diagram showing concrete configuration examples of a wireless binaural microphone and wireless transceiver in the video-audio recording and reproducing apparatus according to the seventh embodiment of the present invention.

FIG. 54 shows internal configuration examples of the wireless binaural microphone 38 and wireless transceiver 39. Operations thereof will be explained.

As shown in FIG. 54, the microphone 38*a* of the wireless binaural microphone 38 has a microphone unit 381, a microphone amplifier 382, a transceiver unit 383, an antenna 384, and an alarm signal transmitter 385. Although not shown in the drawing, the microphone 38*b* has the same configuration as the microphone 38*a* except that it is not provided with the alarm signal transmitter 385. The wireless transceiver 39 has a transceiver unit 391, a microphone checker 392, a distance measuring unit 393, a communication range checker 394, an alarm signal transmitter 395, and an antenna 396.

The microphone unit 381 of the microphone 38*a* (38*b*) generates a binaural audio signal. The microphone amplifier 382 amplifies the binaural audio signal from the microphone unit 381. The transceiver unit 383 modulates the amplified binaural audio signal from the microphone amplifier 382 according to a predetermined modulation method and transmits the same through the antenna 384. The alarm signal transmitter 385 generates an alarm signal based on an alarm signal that is generated by the alarm signal transmitter 395 of the wireless transceiver 39, which will be explained later, and is transmitted through the transceiver unit 391 and transceiver unit 383.

The antenna 396 of the wireless transceiver 39 receives modulated signals transmitted from the left and right microphones 38*a* and 38*b*. The transceiver unit 391 demodulates the received modulated signals into binaural audio signals and measures reception power of the modulated signals. Based on the measured reception power, the distance measuring unit 393 estimates a distance from the wireless transceiver 39 to the wireless binaural microphone 38. The communication range checker 394 determines whether or not the estimated distance is within a predetermined communication range. The determination result of the communication range checker 394 is supplied to the controller 47. If the estimated distance is within the predetermined communication range, the controller 47 connects the switch Sw1 to the terminal b and controls the flag generator 42 to generate a binaural flag signal. If the estimated distance exceeds the predetermined communication range, the controller 47 connects the switch Sw1 to the terminal a.

If the communication range checker 394 determines that the estimated distance exceeds the predetermined communication range, the alarm signal transmitter 395 generates an alarm signal. The alarm signal is supplied to the controller 47. The controller 47 prepares an alarm mark and supplies the same to the display 17 so that the display 17 may display the alarm mark. If the alarm signal transmitter 395 generates no alarm signal, the microphone checker 392 determines that binaural audio signals are normally obtained and supplies the binaural audio signals demodulated by the transceiver unit 391 to the audio encoder 22 through the switch Sw1.

Figure 55:
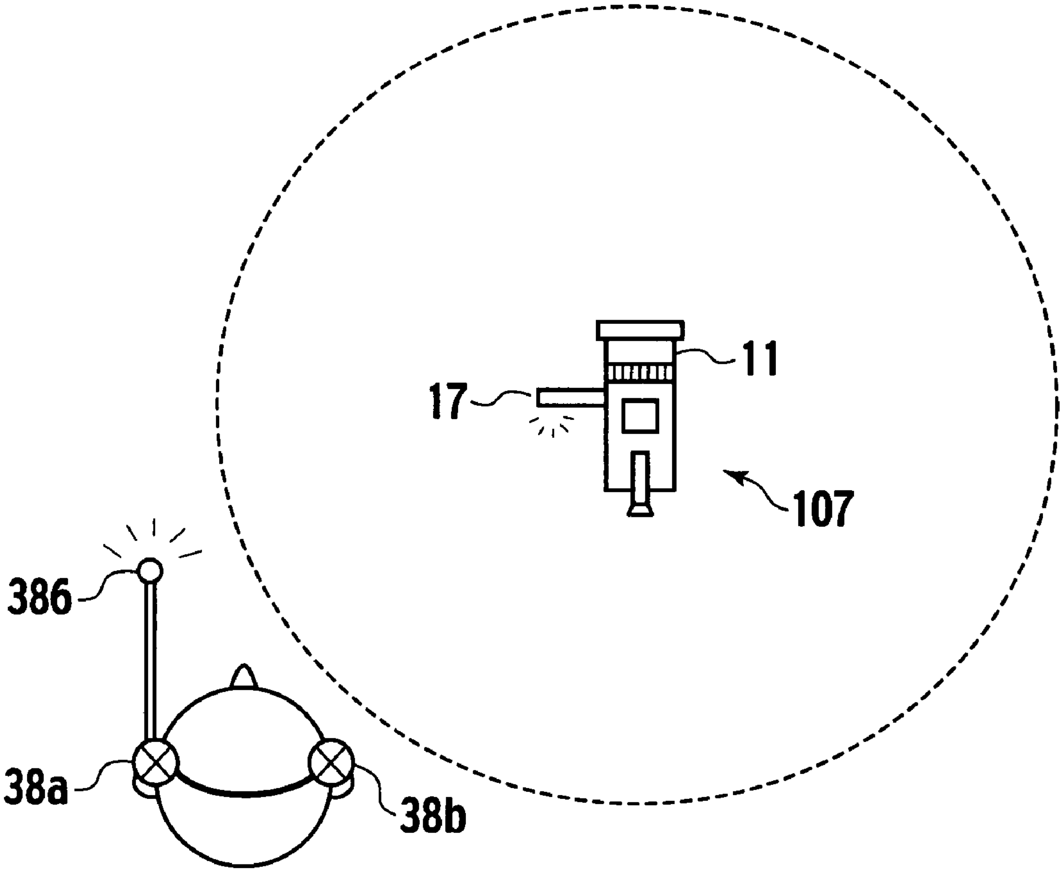
FIG. 55 is a view explaining an alarm to be made when the wireless binaural microphone of the video-audio recording and reproducing apparatus according to the seventh embodiment of the present invention is out of a communication range.

FIG. 55 shows examples of alarm indications on the wireless binaural microphone 38 and video-audio recording and reproducing apparatus 107. The microphone 38*a* is provided with a bar-like member whose top is provided with a light emitting diode (LED) 386. The LED 386 receives an alarm signal generated by the alarm signal transmitter 385, and according to the alarm signal, turns on and off (or turns on). In addition to or instead of the turning on/off of the LED 386, an alarm sound may be generated. In this case, it is preferable to reduce the level of the alarm sound or make the frequency of the alarm sound lower than, for example, several tens of hertz so that the alarm sound may not be caught (or may hardly be caught) by the microphone unit 381.

The alarm signal transmitter 395 generates an alarm signal if it determines that the wireless binaural microphone 38 is out of the communication range indicated with a dotted circle. As shown in FIG. 55, if the wireless binaural microphone 38 is out of the communication range, a predetermined alarm mark is displayed on the display 17.

Figure 56:
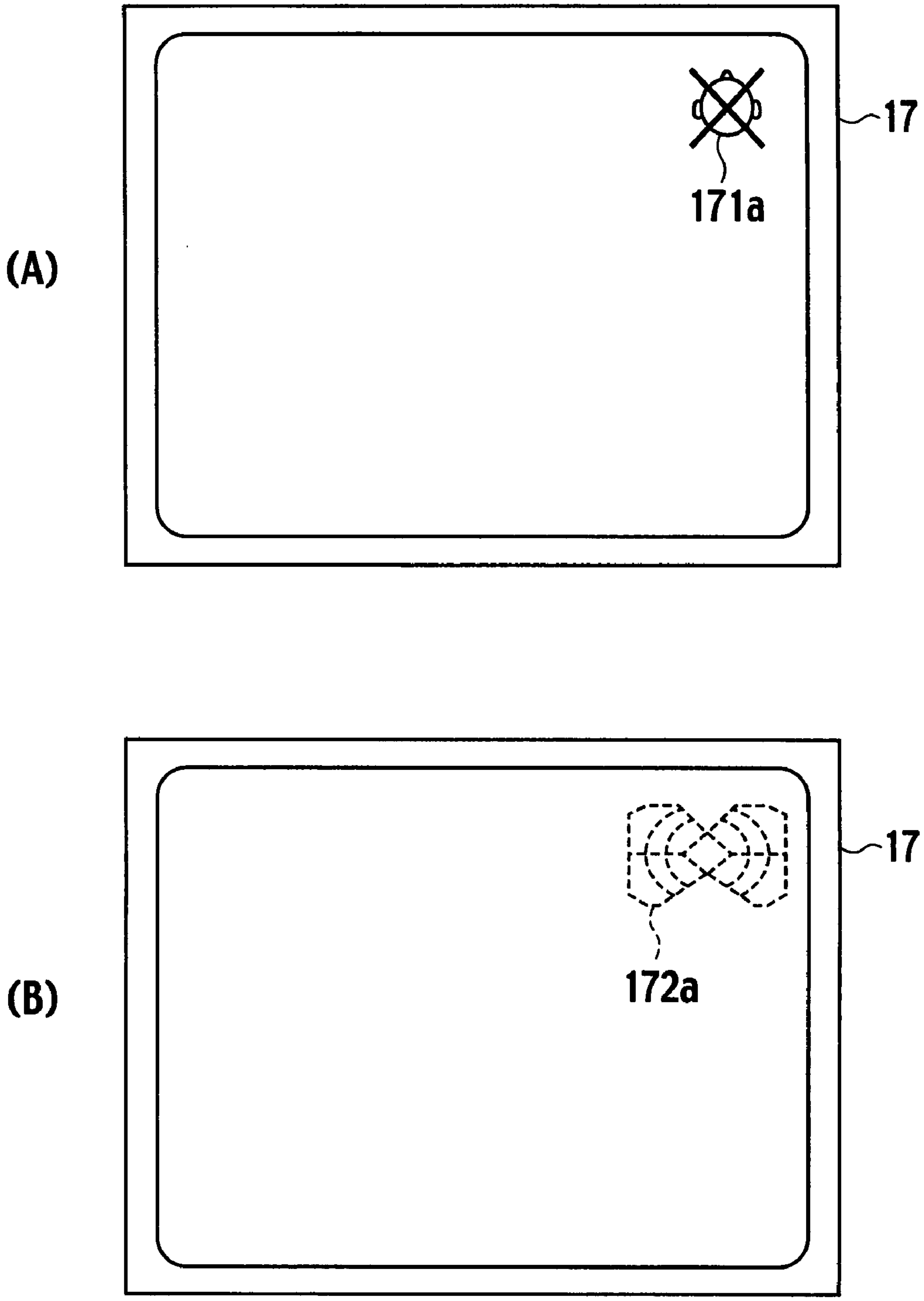
FIG. 56 is a view showing examples of alarm marks to be displayed on a display when the wireless binaural microphone of the video-audio recording and reproducing apparatus according to the seventh embodiment of the present invention is out of a communication range.

FIG. 56 shows examples of alarm marks displayed on the display 17. The alarm mark 171*a* shown in FIG. 56(A) displays an X mark over the binaural mark 171 shown in FIG. 5(A). The alarm mark 172*a* shown in FIG. 56(B) is a dimmed image of the mark 172 shown in FIG. 5(B). Any one of the marks of FIGS. 56(A) and (B) is usable as an alarm mark, or any other mark is employable. If reception power at the wireless transceiver 39 is expected to be lower than the reception threshold even after displaying the alarm, the controller 47 switches the wireless binaural microphone 38 to the built-in stereo microphone 21.

Figure 57:
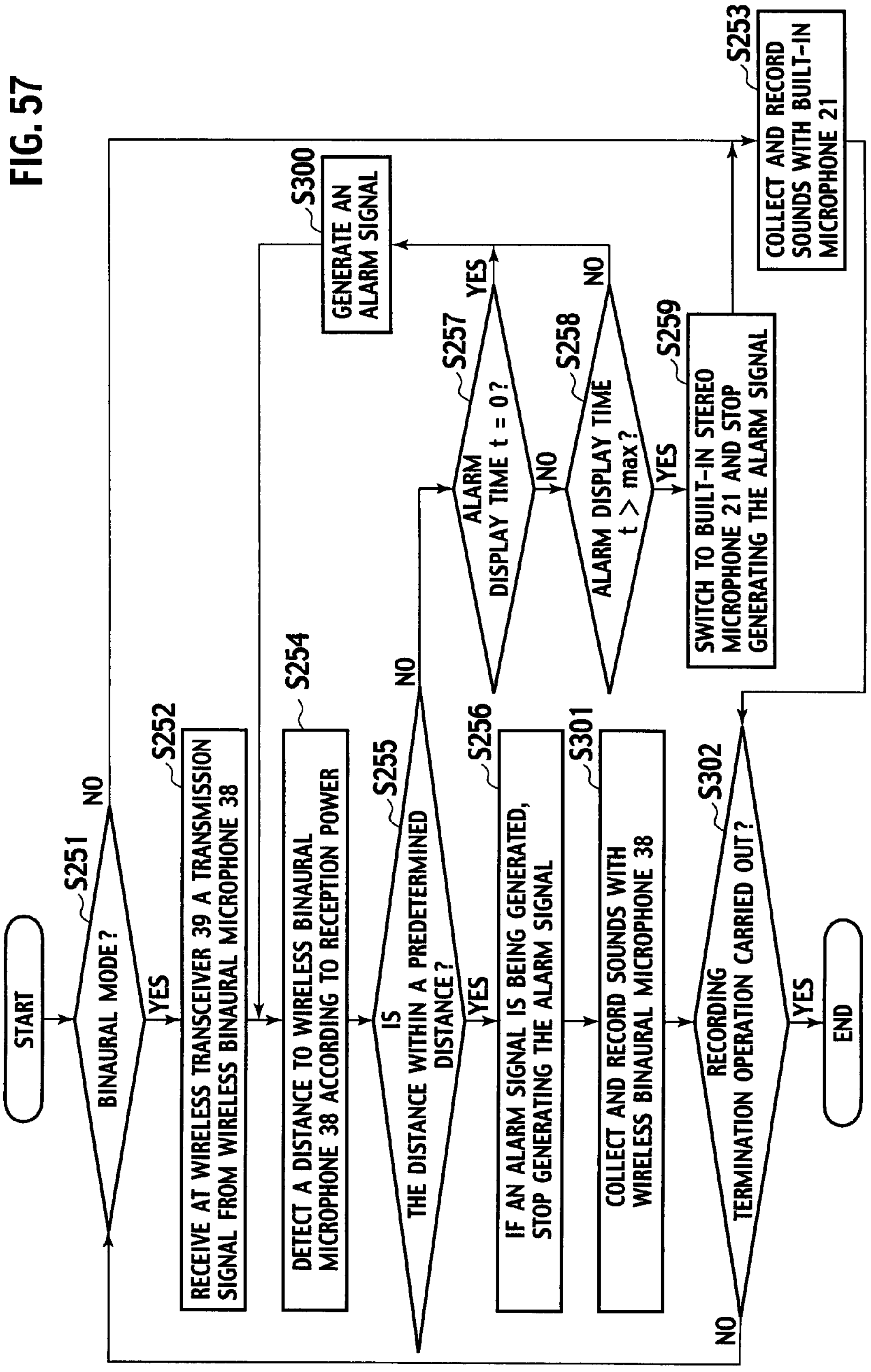
FIG. 57 is a flowchart explaining operation of the video-audio recording and reproducing apparatus according to the seventh embodiment of the present invention.

With reference to FIG. 57, operation of the video-audio recording and reproducing apparatus 107 will be explained in detail. In step 251 of FIG. 57, the controller 47 determines whether or not it is the binaural mode. If step S251 determines that it is not the binaural mode (NO), it advances to step S253 in which the recorder/reproducer 14 collects sounds through the built-in stereo microphone 21 and records usual stereo audio signals on the recording medium 44. If step S251 determines that it is the binaural mode (YES), it advances to step S252 in which the wireless transceiver 39 receives transmission signals from the wireless binaural microphone 38. In step S254, the distance measuring unit 393 detects, according to strength (reception power), a distance from the wireless transceiver 39 to the wireless binaural microphone 38. In step S255, the communication range checker 394 determines whether or not the detected distance is within a predetermined distance.

If step S255 determines that it is not within the predetermined distance (NO), it advances to step S257 in which the controller 47 determines whether or not an alarm display time t is 0 (no presentation). If the alarm display time t is 0, the controller 47 controls in step S300 the alarm signal transmitter 395 to generate an alarm signal. After generating the alarm signal, step S254 is repeated. If step S257 determines that the alarm display time t is not 0 (NO), it advances to step S258 in which the controller 47 determines whether or not the alarm display time t is larger than a predetermined maximum time tmax. If it is smaller than the maximum time tmax (NO), step S300 is carried out to return to step S254. If it is greater than the maximum time tmax (YES), step S259 is carried out in which the controller 47 controls the switch Sw1 to switch the wireless binaural microphone 38 to the built-in stereo microphone 21, as well as controlling the alarm signal transmitter 395 to stop generating the alarm signal. Thereafter, step S253 is carried out.

If step S255 determines that it is within the predetermined distance (YES), step S256 is carried out in which the controller 47 controls, if the alarm signal transmitter 395 is generating an alarm signal, the alarm signal transmitter 395 to stop generating the alarm signal. In step S301, the recorder/reproducer 14 collects sounds through the binaural microphone 38 and records binaural audio signals on the recording medium 44. In step S302, the controller 47 determines whether or not a recording termination operation has been carried out. If no recording termination operation is carried out (NO), step S251 is repeated. If the recording termination operation has been carried out (YES), the process ends.

INDUSTRIAL APPLICABILITY

The video-audio recording and reproducing apparatuses according to the present invention are applicable not only as consumer video cameras but also as professional video cameras that need to reproduce photographed images with lifelike sounds. The present invention is also applicable to digital cameras and cellular phones having a video shooting function. Although the present invention is preferably applicable to video-audio recording and reproducing apparatuses for recording and reproducing video and audio signals, it is sufficiently applicable to audio recording and reproducing apparatuses for recording and reproducing only audio signals.

The invention claimed is:

1. A video-audio recording apparatus (101, 102, 103, 104, 105, 107) for recording a video signal obtained by photographing an object and an audio signal obtained by collecting ambient sounds around a photographer (300) including a sound from the object, comprising:

a camera unit (11) to photograph the object;

a switching unit (Sw1) to switch a binaural microphone (3) attached to the ears of the photographer (300) and a microphone other than the binaural microphone (3) from one to the other as a microphone to collect the ambient sounds;

a video processor (12) to process the video signal provided by the camera unit (11);

an audio processor (22) to process the audio signal provided by the microphone that collects the ambient sounds;

a flag generator (42) to generate, when the switching unit (Sw1) chooses the binaural microphone (3) as a microphone to collect the ambient sounds, a binaural flag signal indicating that an ambient sound collecting mode is a binaural mode; and a recorder (14) to record, on a recording medium, the video signal processed in the video processor (12), the audio signal processed in the audio processor (22), and the binaural flag signal.

2. The video-audio recording apparatus (101, 102, 103, 104, 105, 107) as set forth in claim 1, comprising:

a built-in microphone (21) incorporated in the video-audio recording apparatus (101, 102, 103, 104, 105, 107);

an external microphone connection terminal (32);

a setting unit (48, 47) to set, as an external microphone connected to the external microphone connection terminal (32), the binaural microphone (3) or a microphone other than the binaural microphone;

a connection detector (41) to detect whether or not the external microphone is connected to the external microphone connection terminal (32);

a switch (Sw1) to switch an audio signal provided by the built-in microphone (21) and an audio signal provided by the external microphone from one to the other as an audio signal supplied to the audio processor (22); and a controller (47) to establish the binaural mode when the setting unit (47, 48) sets the binaural microphone (3) as the external microphone and when the connection detector (41) detects that the external microphone is connected to the external microphone connection terminal (32), in the binaural mode, the controller (47) controlling the switch (Sw1) so that an audio signal from the external microphone is supplied through the switch (Sw1) to the audio processor (22), as well as controlling the flag generator (42) so that the flag generator (42) generates the binaural flag signal.

3. The video-audio recording apparatus (101, 102, 103, 104, 105, 107) as set forth in claim 1, comprising:

a display (17) to display the video signal provided by the camera unit (11); and a display controller (47) to display, in the binaural mode, a binaural mark indicative of the binaural mode on the display (17).

4. The video-audio recording apparatus (102) as set forth in claim 1, wherein:

the camera unit (11) has a zoom function to photograph an enlarged image of the object; and the apparatus comprises an audio zoom processor (33) to amplify an audio signal provided by the binaural microphone (3) according to an enlargement factor of the camera unit (11).

5. The video-audio recording apparatus (102, 103) as set forth in claim 1, wherein:

the camera unit (101) has a zoom function to photograph an enlarged image of the object; and the apparatus comprises an audio zoom processor (33*a*, 33*c*) having a transfer function memory (334) to store head transfer functions for a plurality of distances between a virtual sound source and a listener, each head transfer function being used to form, in the vicinity of the listener, a virtual sound source representative of the sound source of an audio signal collected with the binaural microphone (3), a function selector (333) to select one of the plurality of head transfer functions stored in the transfer function memory (334) according to an enlargement factor of the camera unit (11), and a convolution unit (336) to carry out a convolution operation on the audio signal collected with the binaural microphone (3) according to the head transfer function selected by the function selector (333).

6. A video-audio recording method of recording a video signal obtained by photographing an object and an audio signal obtained by collecting ambient sounds around a photographer (300) including a sound from the object, comprising:

a photographing step (S155) of photographing the object;

a switching step (S151) of switching a binaural microphone (3) attached to the ears of the photographer (300) and a microphone other than the binaural microphone (3) from one to the other as a microphone to collect the ambient sounds;

a video processing step (S156) of processing the video signal from the object;

an audio processing step (S156) of processing the audio signal provided by the microphone that collects the ambient sounds;

a flag generating step (S158) of generating, when the switching step (S151) chooses the binaural microphone (3) as a microphone to collect the ambient sounds, a binaural flag signal indicating that an ambient sound collecting mode is a binaural mode; and a recording step (S161) of recording, on a recording medium (44), the video signal processed in the video processing step (S156), the audio signal processed in the audio processing step (S156), and the binaural flag signal.

7. A video-audio reproducing apparatus (101, 102, 103, 104, 105, 106, 107) for reproducing a recording medium (44) that stores a video signal obtained by photographing an object and an audio signal obtained by collecting ambient sounds around a photographer (300) including a sound from the object, comprising:

a reproducer (14) to reproduce a record signal recorded on the recording medium;

a separator (15) to separate the video signal and audio signal from the record signal reproduced by the reproducer (14);

a video processor (16) to process the video signal separated by the separator (15);

an audio processor (26) to process the audio signal separated by the separator (15);

a flag taker (36) to take a binaural flag signal from the recording medium (44) if the recording medium (44) has the binaural flag signal indicating that a binaural microphone attached to the ears of the photographer (300) has been used as a microphone to collect the ambient sounds; and a crosstalk canceler (27) to process, if the flag taker (36) takes the binaural flag signal, the audio signal so as to cancel a crosstalk signal that may occur when the audio signal processed in the audio processor (26) is output through a speaker (53, 54), the crosstalk canceler (27) having a filter (272*a* to 272*d*) to carry out a convolution operation on the audio signal according to a predetermined filter characteristic that is based on a head transfer function measured from an audio signal produced by collecting a calibration signal with a pair of microphones attached to a cylindrical structure.

8. A video-audio reproducing method of reproducing a recording medium (44) that stores a video signal obtained by photographing an object and an audio signal obtained by collecting ambient sounds around a photographer (300) including a sound from the object, comprising:

a reproducing step (S181) of reproducing a record signal recorded on the recording medium (44);

a separating step (S183) of separating the video signal and audio signal from the record signal reproduced in the reproducing step;

a video processing step (S184) of processing the video signal separated in the separating step (S183);

an audio processing step (S184) of processing the audio signal separated in the separating step (S183);

a flag taking step (S186) of taking a binaural flag signal from the recording medium (44) if the recording medium (44) has the binaural flag signal indicating that a binaural microphone attached to the ears of the photographer (300) has been used as a microphone to collect the ambient sounds; and a crosstalk canceling step (S188) of processing, if the flag taking step (S186) takes the binaural flag signal, the audio signal so as to cancel a crosstalk signal that may occur when the audio signal processed in the audio processing step (S184) is output through a speaker (53, 54), the crosstalk canceling step (S188) being a step of carrying out a convolution operation on the audio signal according to a predetermined filter characteristic that is based on a head transfer function measured from an audio signal produced by collecting a calibration signal with a pair of microphones attached to a cylindrical structure.

9. A video-audio recording and reproducing apparatus (101, 102, 103, 104, 105, 107) for recording and reproducing a video signal obtained by photographing an object and an audio signal obtained by collecting ambient sounds around a photographer (300) including a sound from the object, comprising:

a camera unit (11) to photograph the object;

a switching unit (Sw1) to switch a binaural microphone (3) attached to the ears of the photographer (300) and a microphone other than the binaural microphone (3) from one to the other as a microphone to collect the ambient sounds;

a first video processor (12) to process the video signal provided by the camera unit (11);

a first audio processor (22) to process the audio signal provided by the microphone that collects the ambient sounds;

a flag generator (42) to generate, when the switching unit (Sw1) chooses the binaural microphone (3) as a microphone to collect the ambient sounds, a binaural flag signal indicating that an ambient sound collecting mode is a binaural mode;

a recorder (14) to record, on a recording medium, the video signal processed in the first video processor (12), the audio signal processed in the first audio processor (22) and output from the binaural microphone (3) that collects the ambient sounds having a binaural audio characteristic determined by a positional relationship between the head (30) of the photographer (300) and the binaural microphone (3), and the binaural flag signal when the switching unit (Sw1) switches to the binaural microphone (3) attached to the ears of the photographer (300) as the microphone to collect the ambient sounds;

a reproducer (14) to reproduce a record signal recorded on the recording medium;

a separator (15) to separate the video signal and audio signal from the record signal reproduced by the reproducer (14);

a second video processor (16) to process the video signal separated by the separator (15);

a second audio processor (26) to process the audio signal separated by the separator (15);

a flag taker (36) to take a binaural flag signal from the recording medium (44) if the recording medium (44) has the binaural flag signal indicating that a binaural microphone attached to the ears of the photographer (300) has been used as a microphone to collect the ambient sounds; and a crosstalk canceler (27) to process, if the flag taker (36) takes the binaural flag signal, the audio signal so as to cancel a crosstalk signal that may occur when the audio signal processed in the second audio processor (26) is output through a speaker (53, 54), the crosstalk canceler (27) having a filter (272*a* to 272*d*) to carry out a convolution operation on the audio signal according to a predetermined filter characteristic that is based on a head transfer function measured from an audio signal produced by collecting a calibration signal with a pair of microphones attached to a surface of a cylindrical structure.

10. A video-audio recording and reproducing method of recording and reproducing a video signal obtained by photographing an object and an audio signal obtained by collecting ambient sounds around a photographer (300) including a sound from the object, comprising:

a photographing step (S155) of photographing the object;

a switching step (S151) of switching a binaural microphone (3) attached to the ears of the photographer (300) and a microphone other than the binaural microphone (3) from one to the other as a microphone to collect the ambient sounds;

a first video processing step (S156) of processing the video signal from the object;

a first audio processing step (S156) of processing the audio signal provided by the microphone that collects the ambient sounds;

a flag generating step (S158) of generating, when the switching step (S151) chooses the binaural microphone (3) as a microphone to collect the ambient sounds, a binaural flag signal indicating that an ambient sound collecting mode is a binaural mode;

a recording step (S161) of recording, on a recording medium (44), the video signal processed in the video processing step (S156), the audio signal processed in the audio processing step (S156) and output from the binaural microphone (3) that collects the ambient sounds having a binaural audio characteristic determined by a positional relationship between the head (30) of the photographer (300) and the binaural microphone (3), and the binaural flag signal when the switching step (S151) switches to the binaural microphone (3) attached to the ears of the photographer (300) as the microphone to collect the ambient sounds;

a reproducing step (S181) of reproducing a record signal recorded on the recording medium (44);

a separating step (S183) of separating the video signal and audio signal from the record signal reproduced in the reproducing step;

a second video processing step (S184) of processing the video signal separated in the separating step (S183);

a second audio processing step (S184) of processing the audio signal separated in the separating step (S183);

a flag taking step (S186) of taking a binaural flag signal from the recording medium (44) if the recording medium (44) has the binaural flag signal indicating that a binaural microphone attached to the ears of the photographer (300) has been used as a microphone to collect the ambient sounds; and a crosstalk canceling step (S188) of processing, if the flag taking step (S186) takes the binaural flag signal, the audio signal so as to cancel a crosstalk signal that may occur when the audio signal processed in the second audio processing step (S184) is output through a speaker (53, 54), the crosstalk canceling step (S188) being a step of carrying out a convolution operation on the audio signal according to a predetermined filter characteristic that is based on a head transfer function measured from an audio signal produced by collecting a calibration signal with a pair of microphones attached to a surface of a cylindrical structure.

* * * * *